F. L. FULLER.
CASH REGISTER.
APPLICATION FILED APR. 24, 1918.

1,394,256.

Patented Oct. 18, 1921.
28 SHEETS—SHEET 1.

Inventor
FREDERICK L. FULLER
by Earl Beust
Attorney

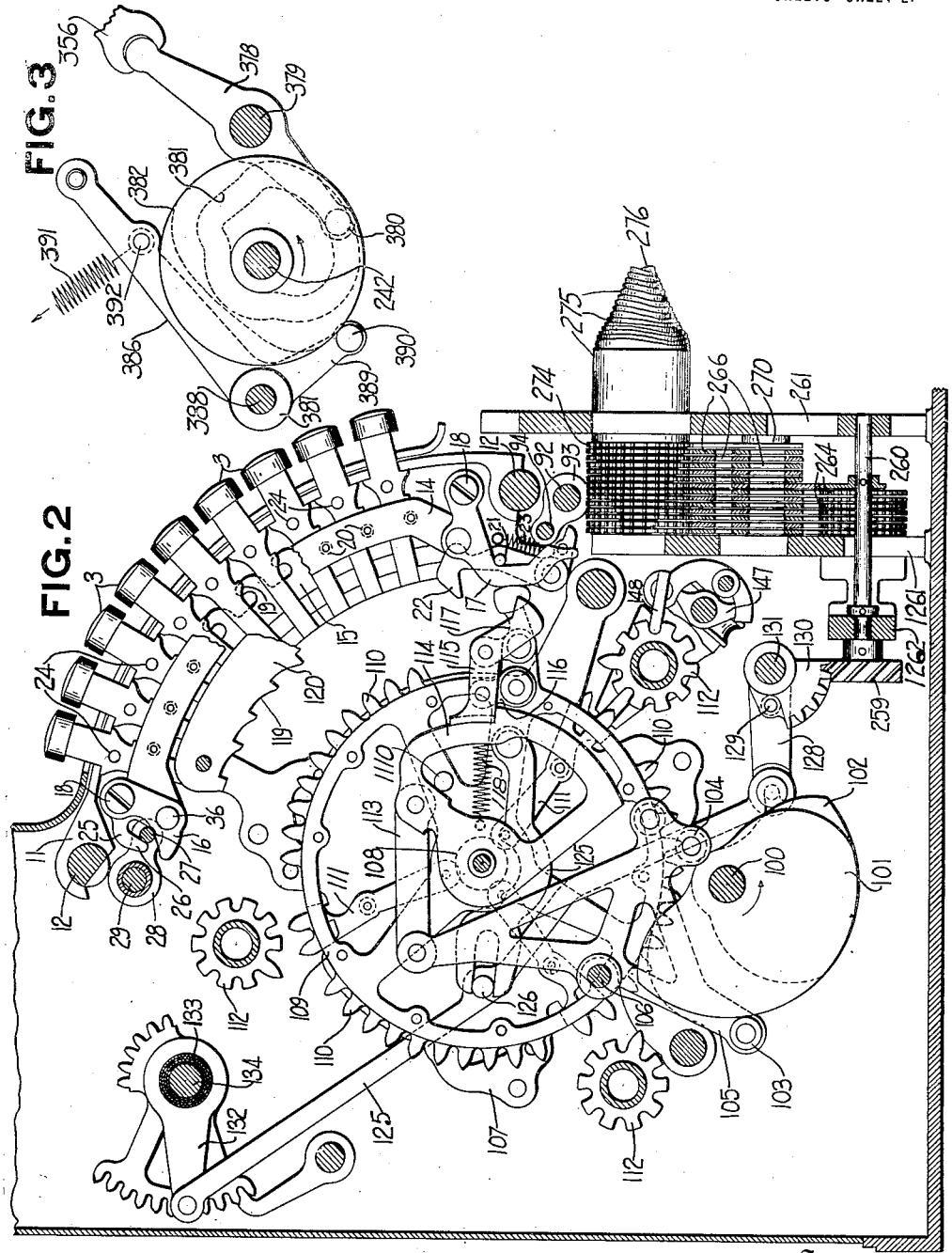

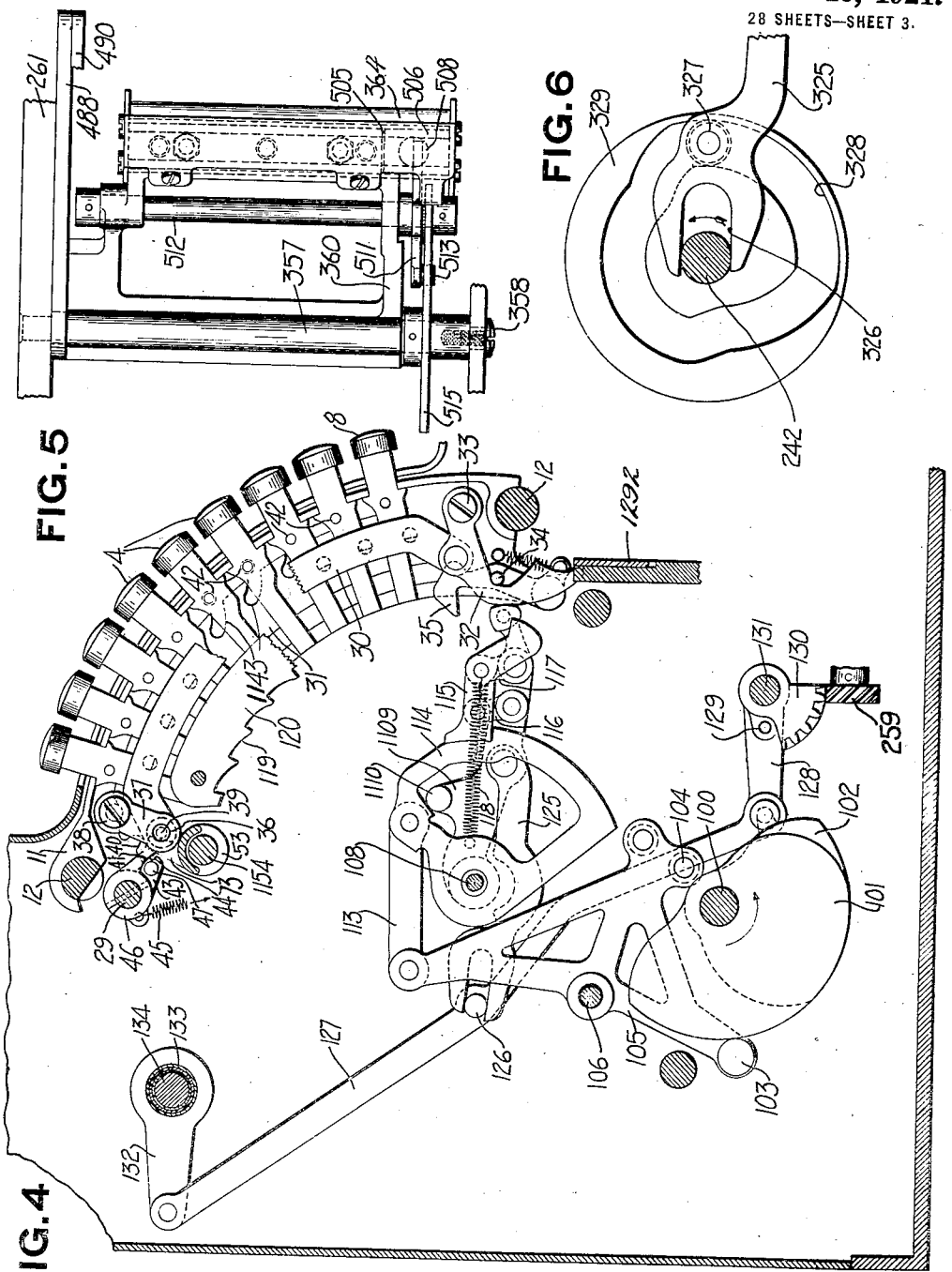

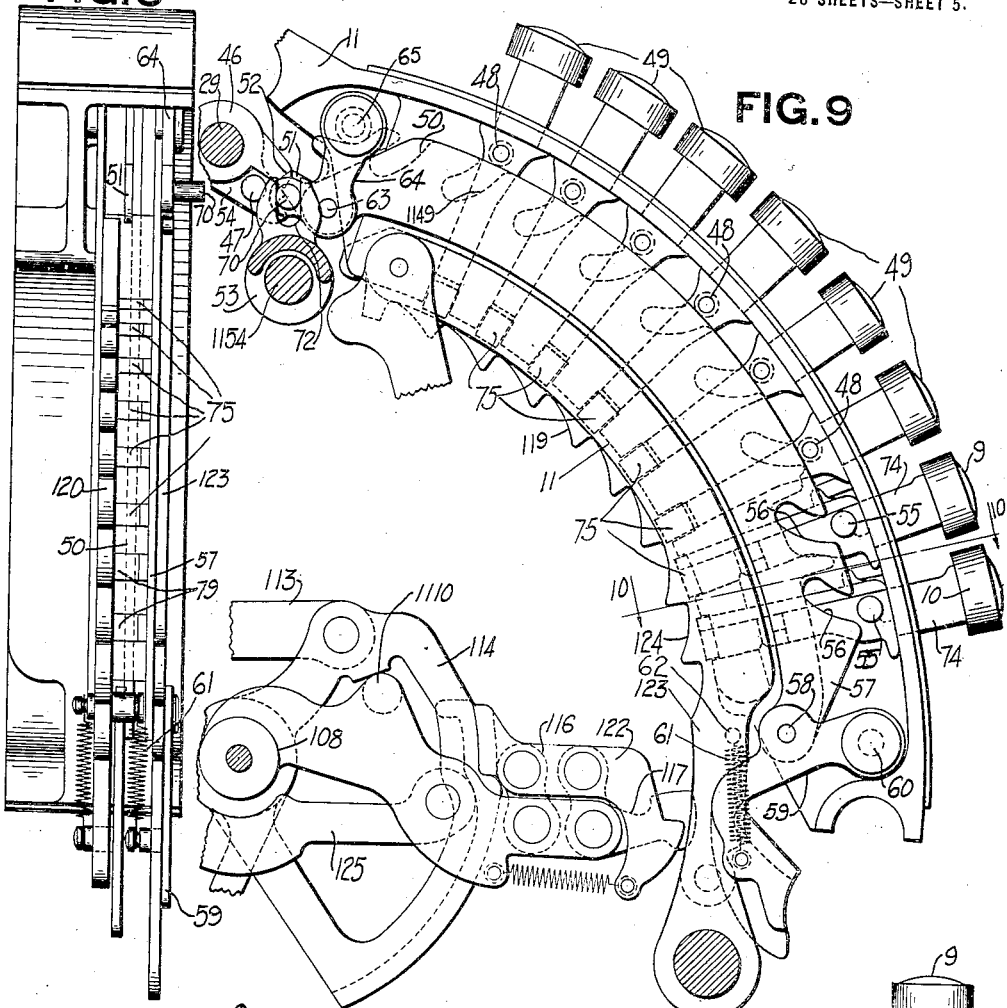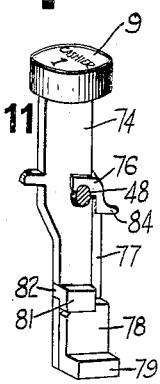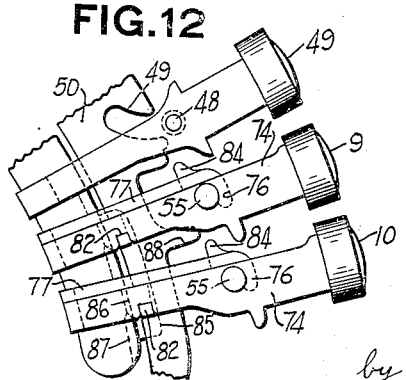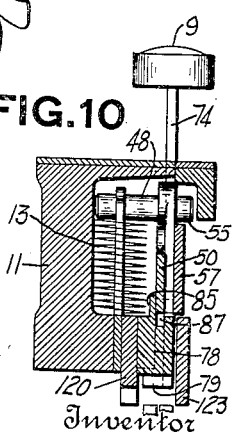

F. L. FULLER.
CASH REGISTER.
APPLICATION FILED APR. 24, 1918.

1,394,256.

Patented Oct. 18, 1921.
28 SHEETS—SHEET 6.

Inventor
FREDERICK L. FULLER
by Carl Beust
Attorney

F. L. FULLER.
CASH REGISTER.
APPLICATION FILED APR. 24, 1918.

1,394,256.

Patented Oct. 18, 1921.
28 SHEETS—SHEET 7.

Inventor
FREDERICK L. FULLER
by Carl Beust
Attorney.

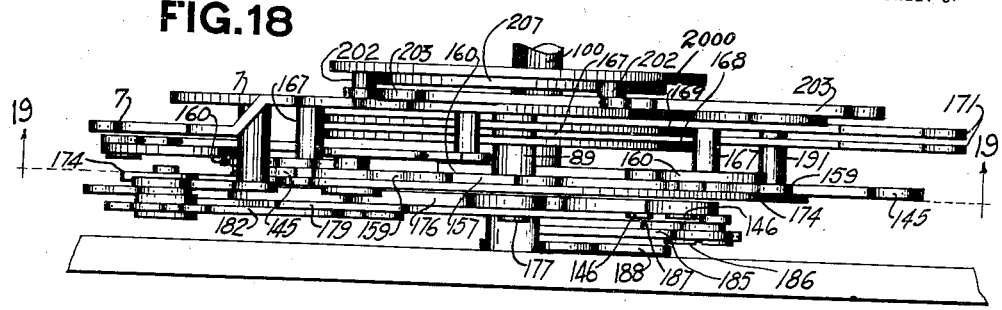
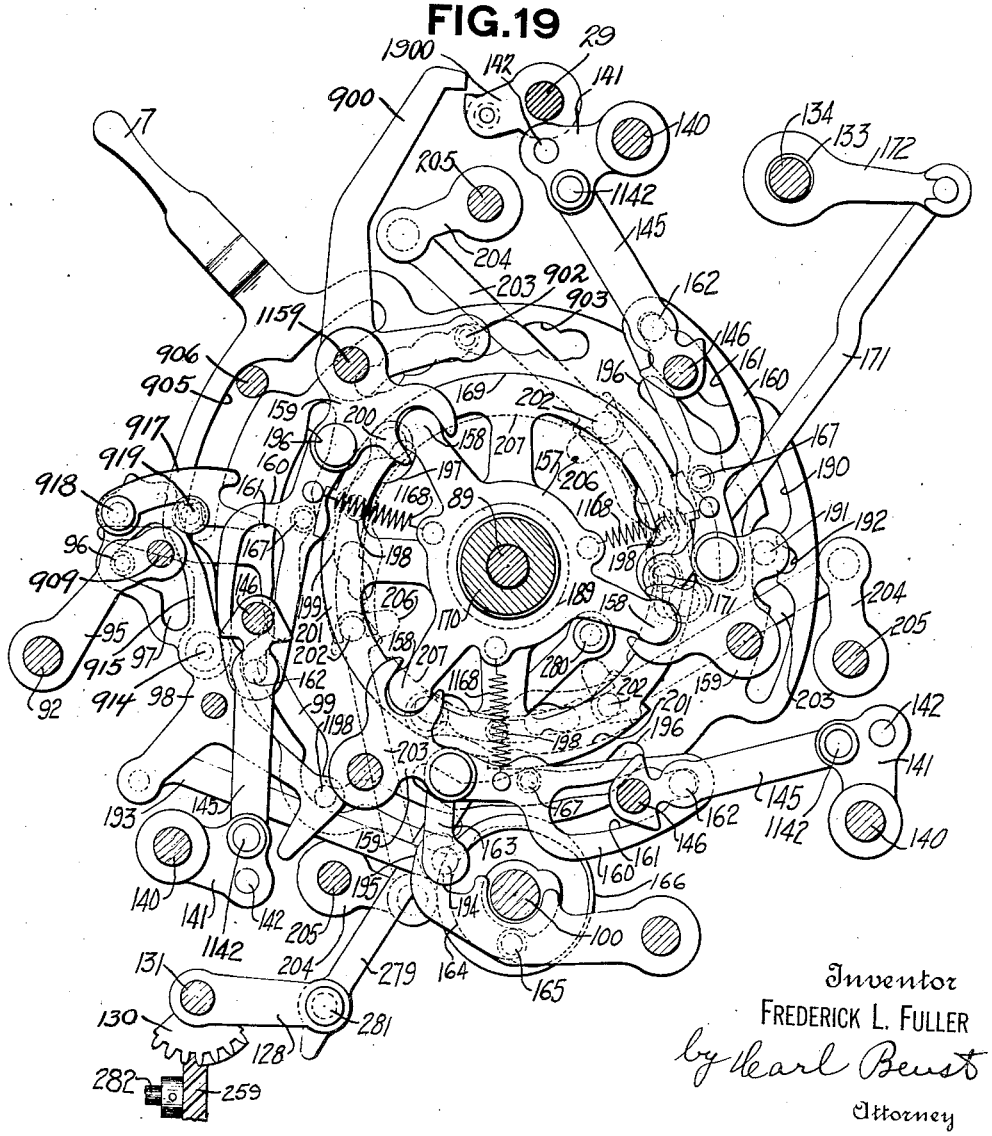

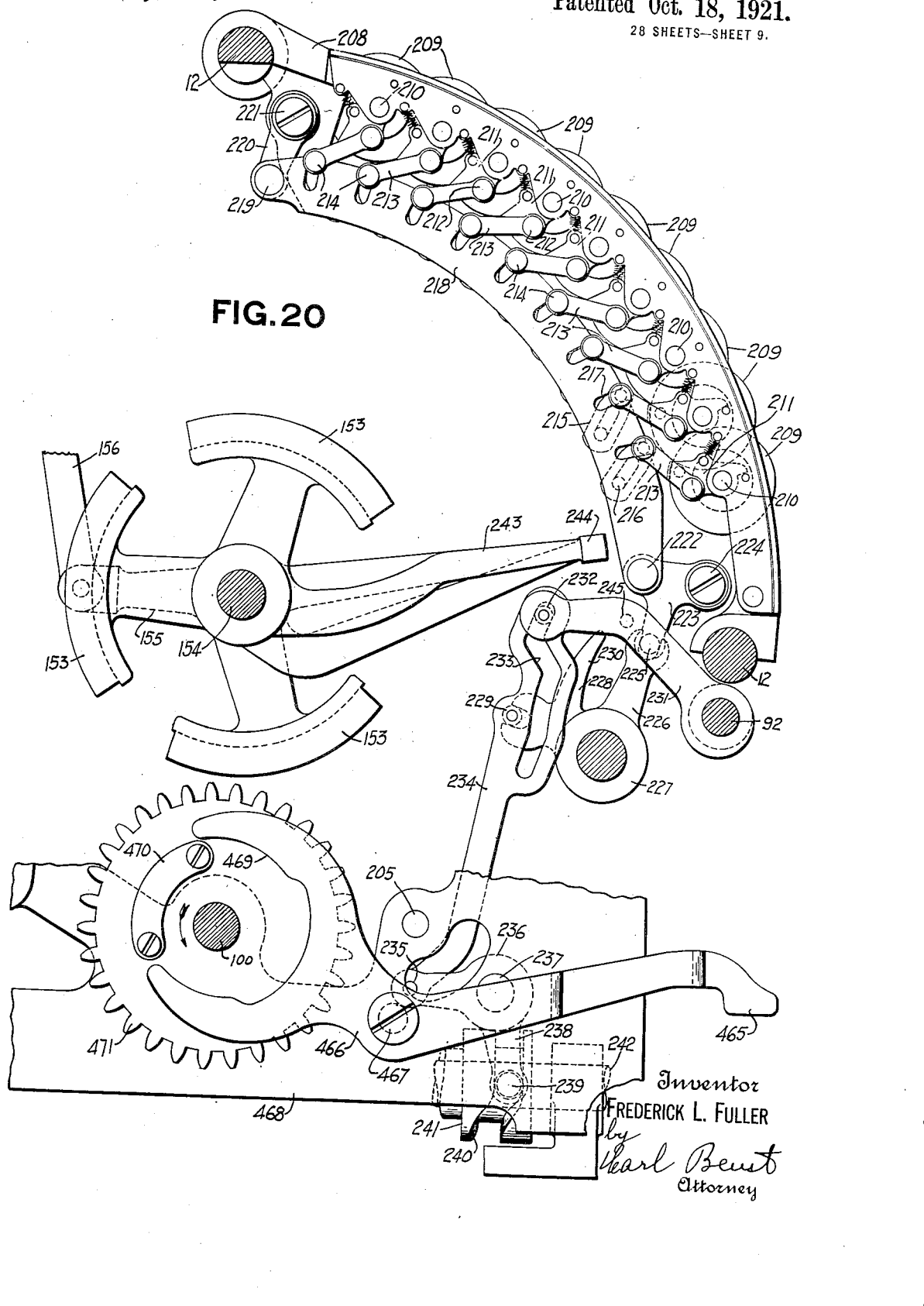

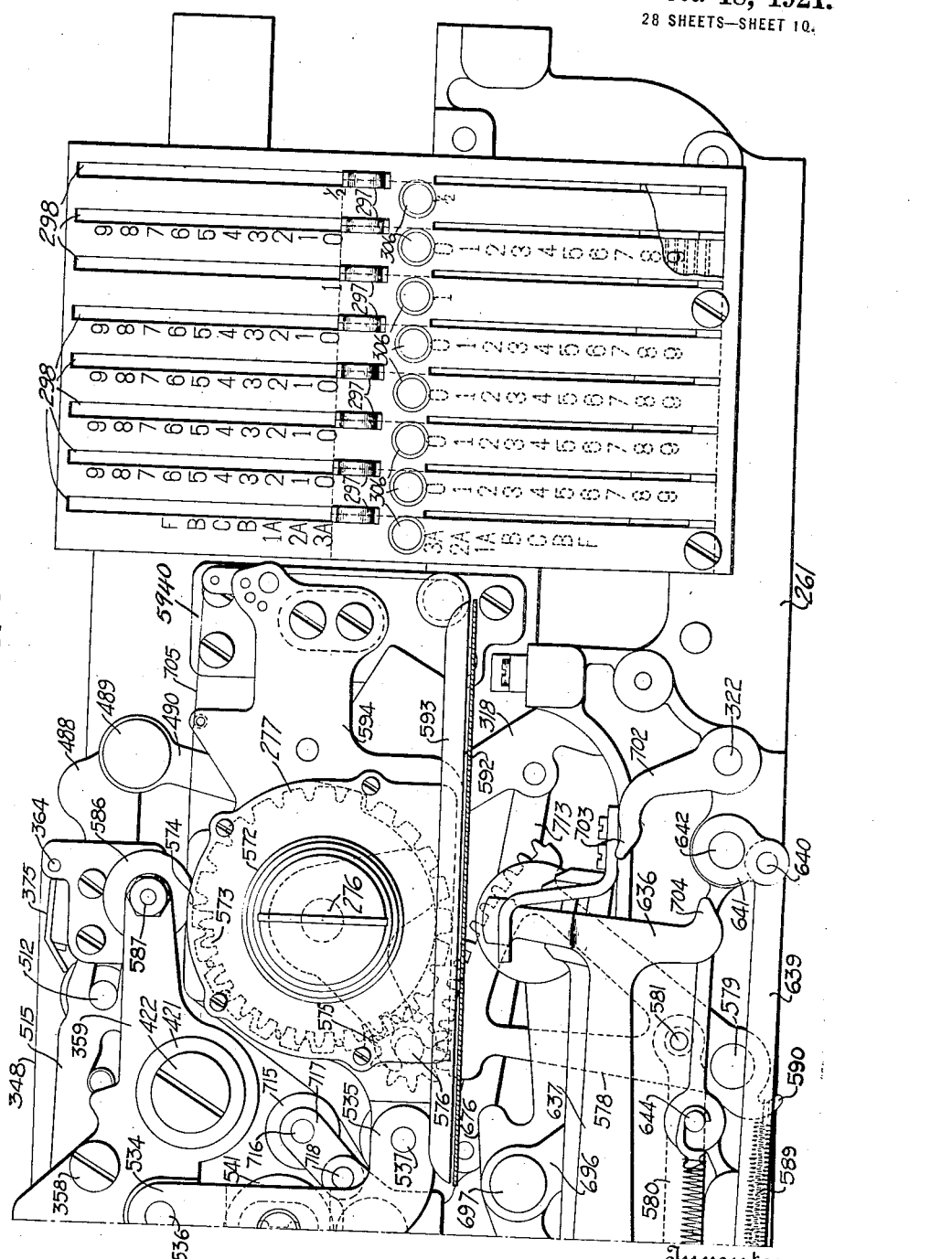

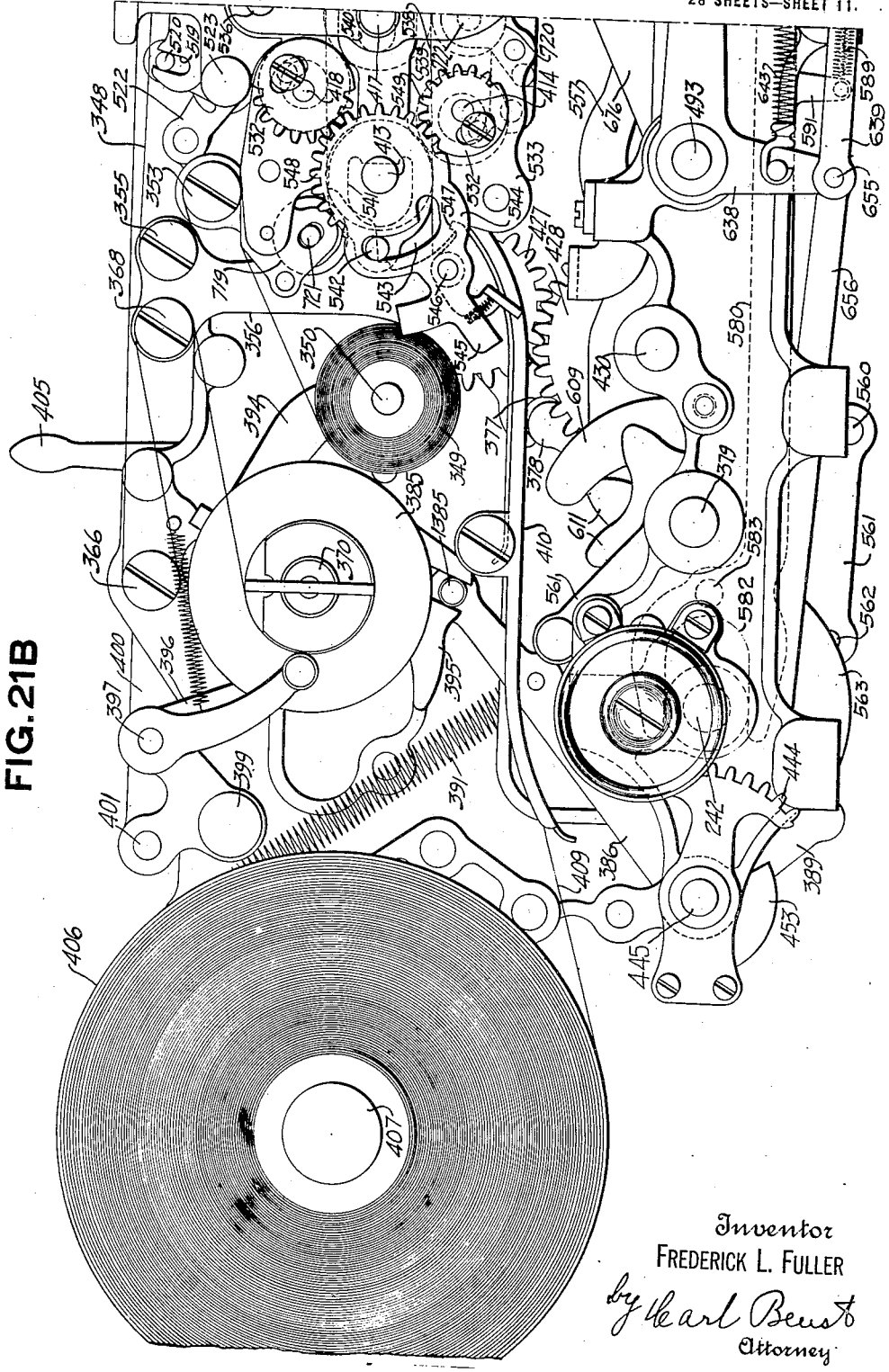

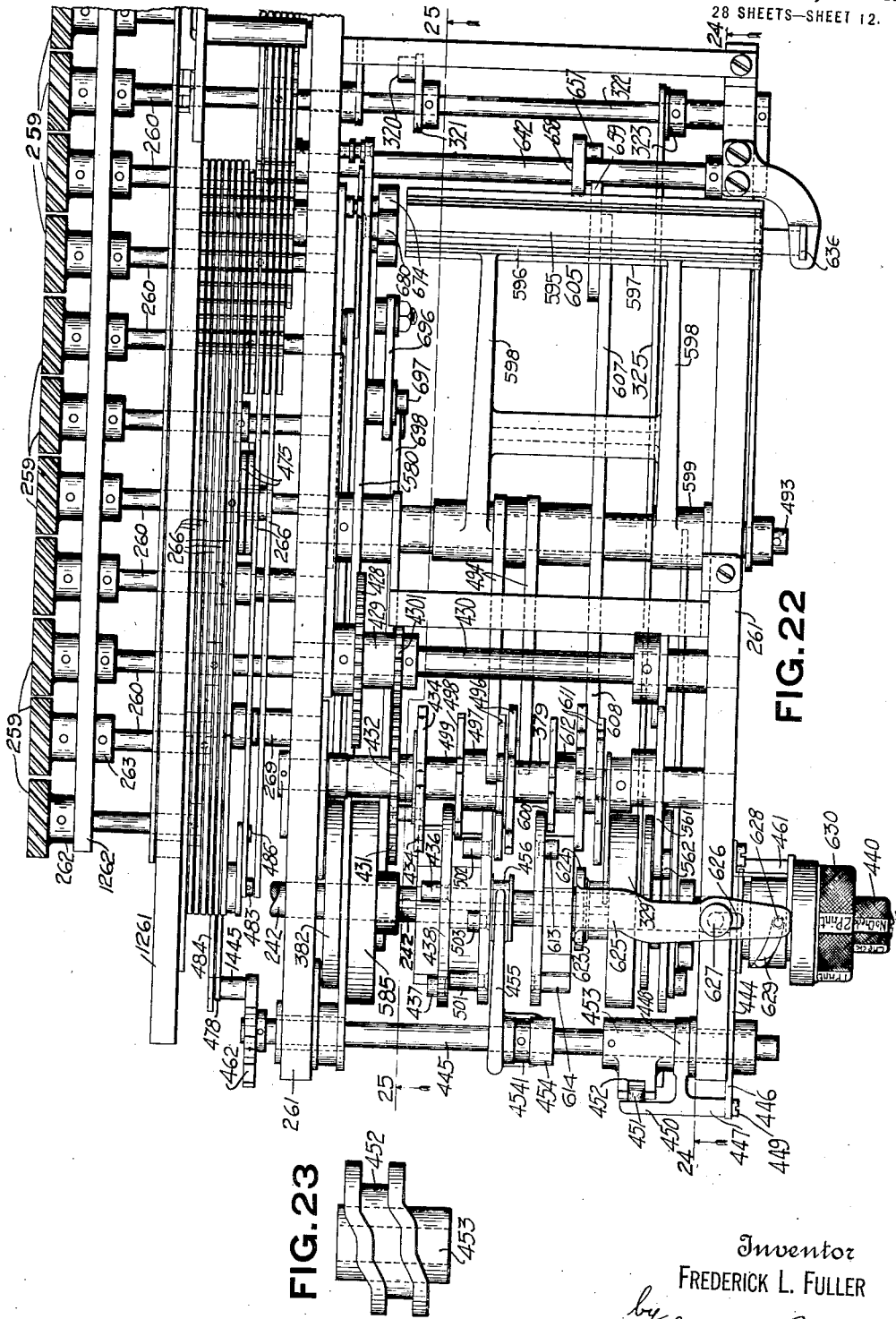

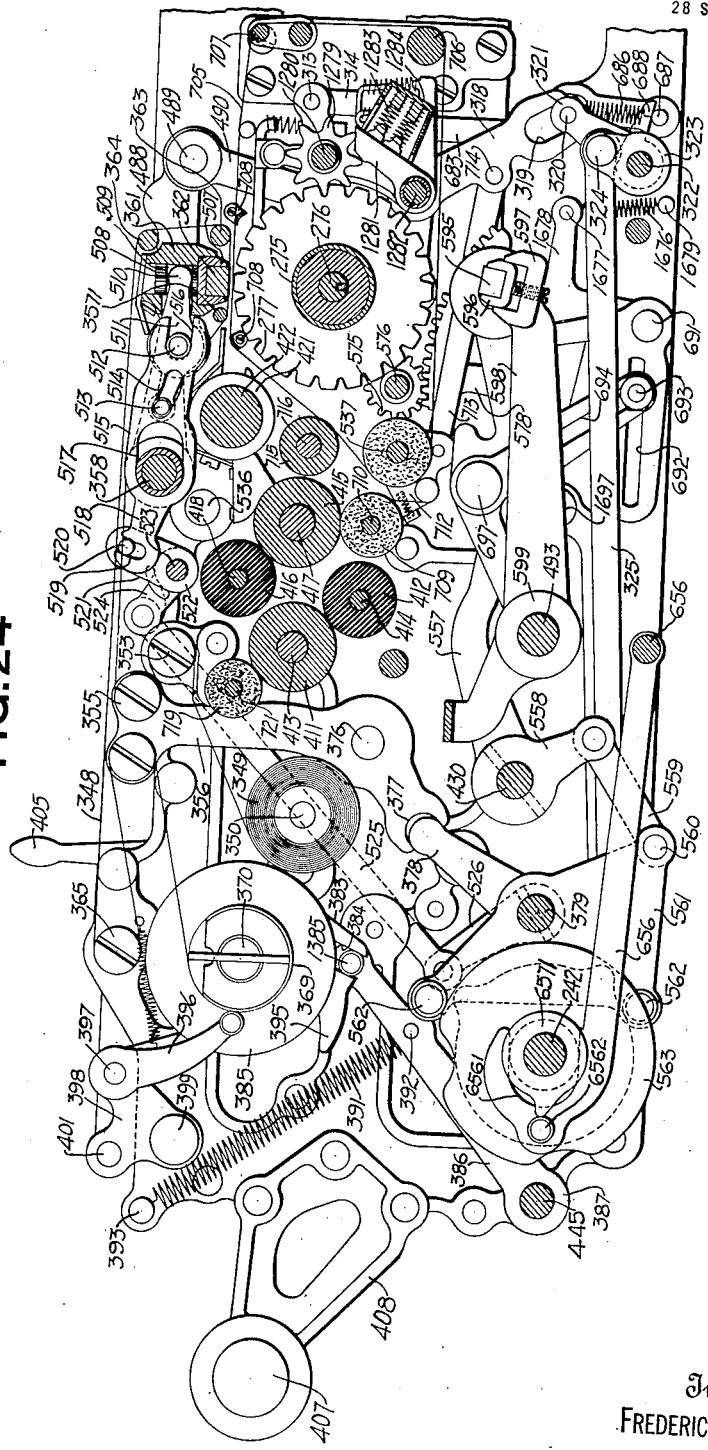

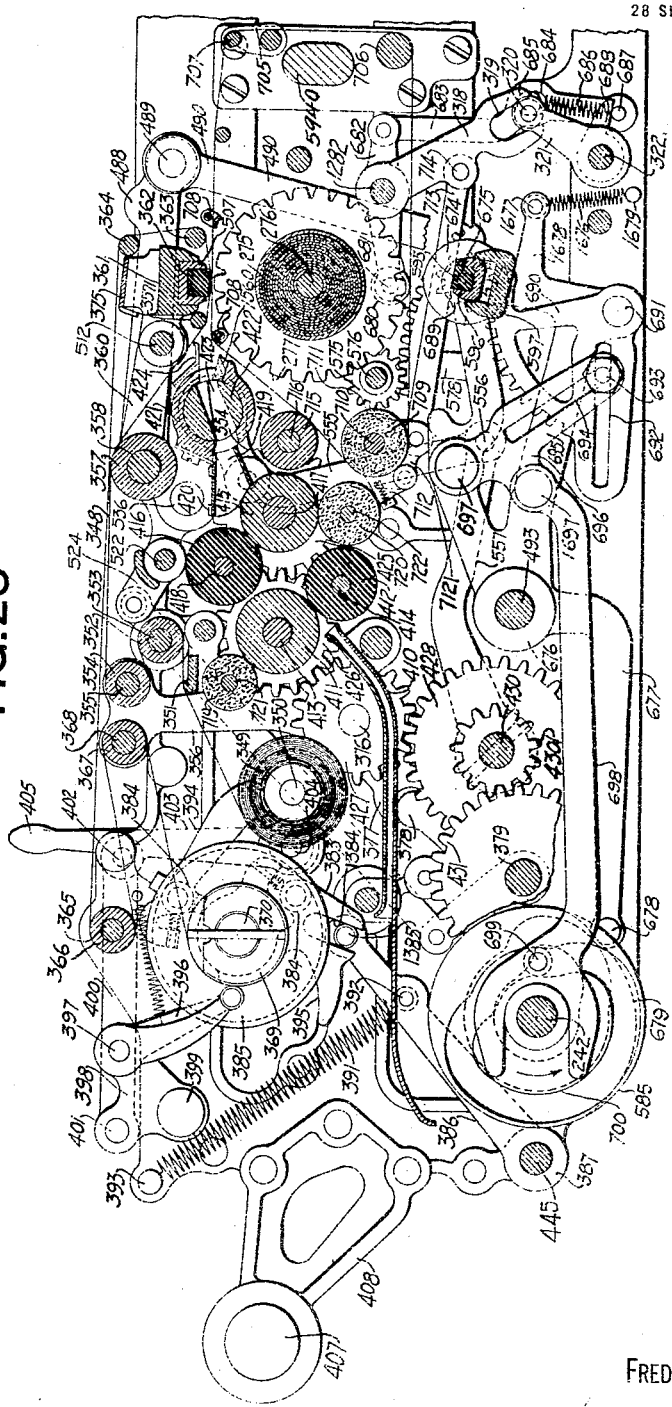

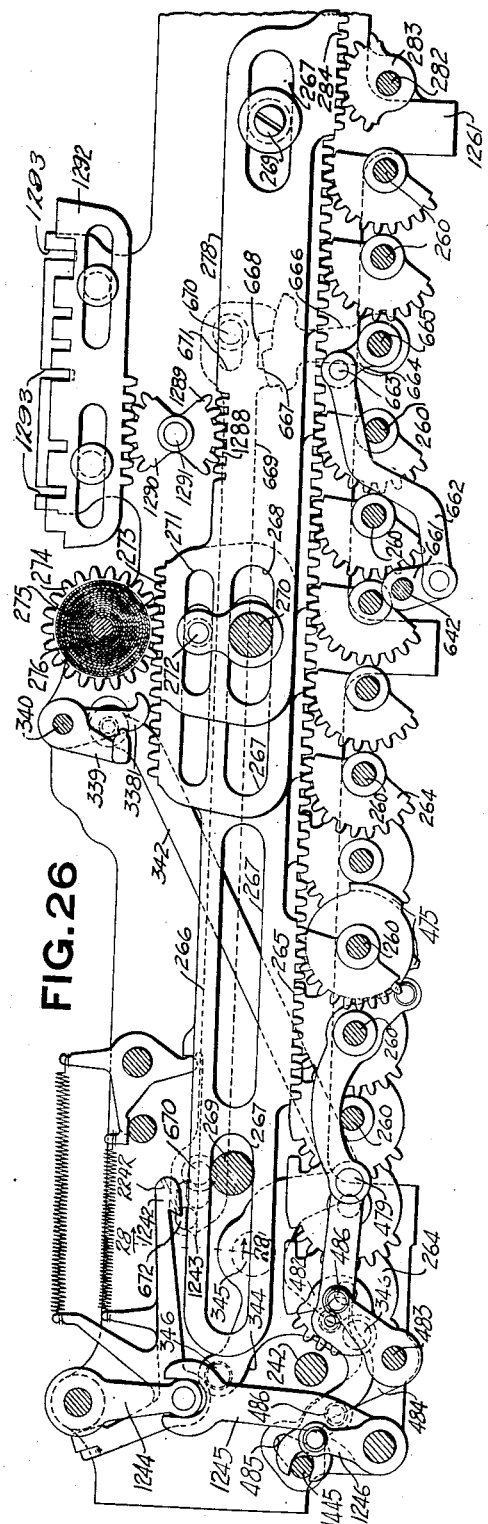
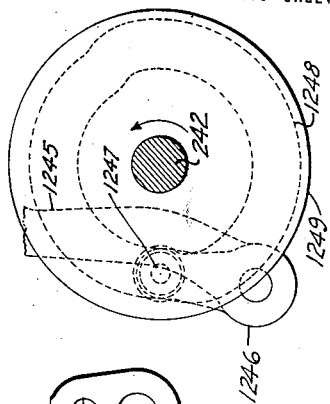
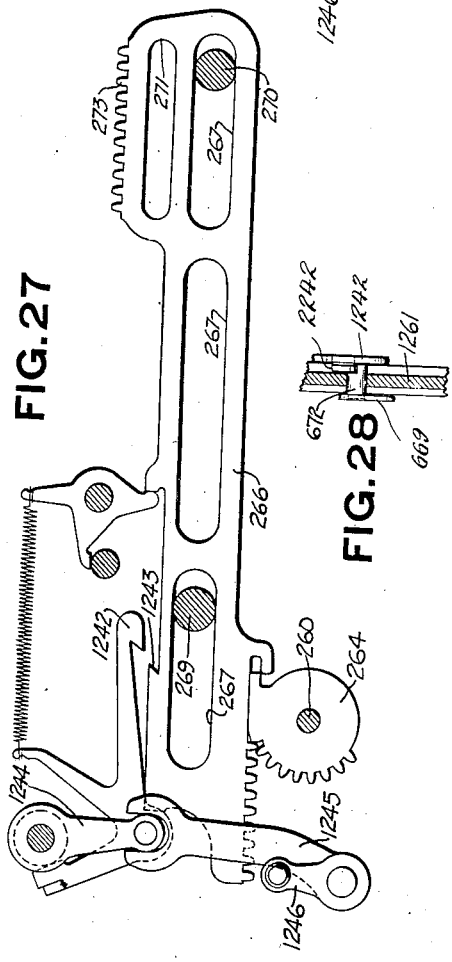

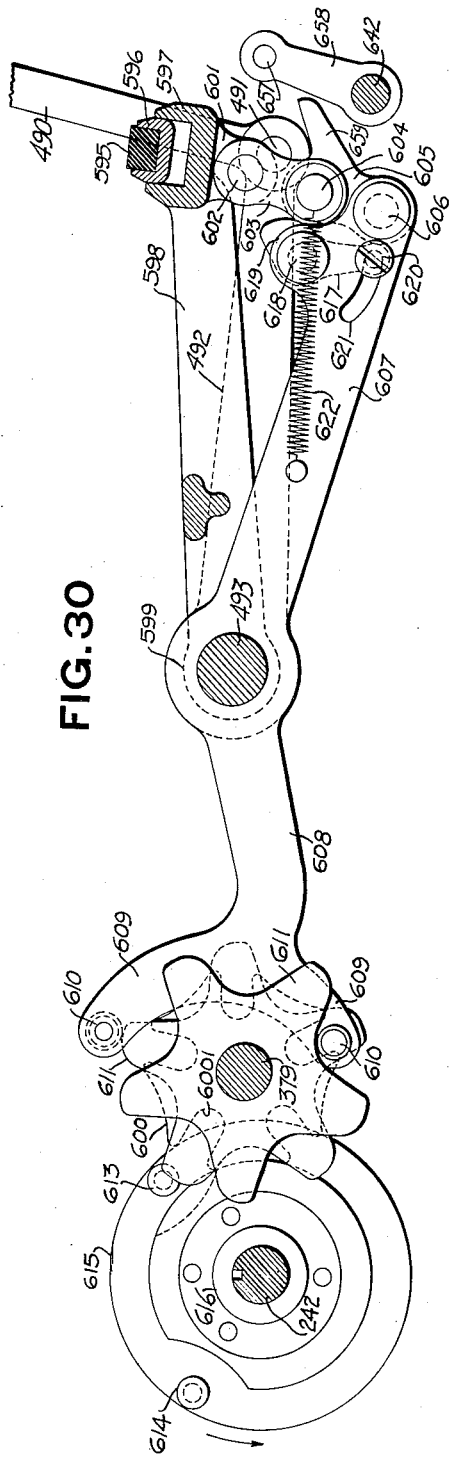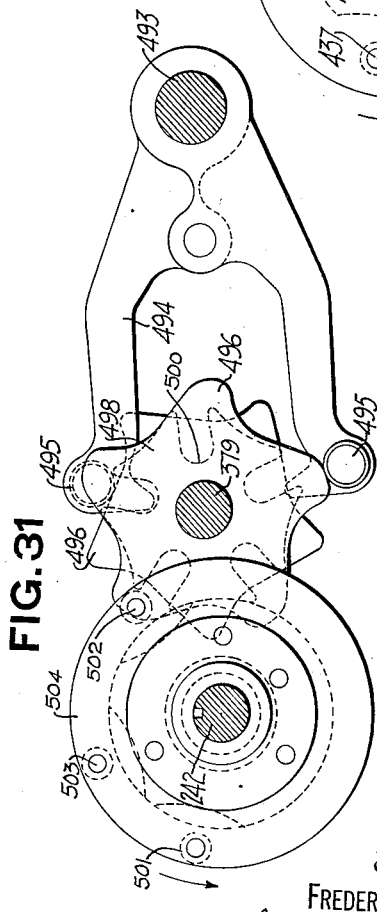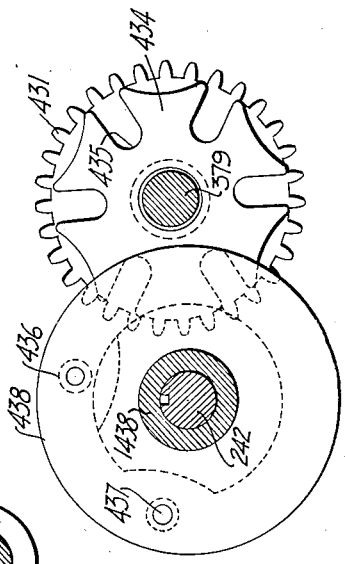

F. L. FULLER.
CASH REGISTER.
APPLICATION FILED APR. 24, 1918.
1,394,256.
Patented Oct. 18, 1921.
28 SHEETS—SHEET 17.
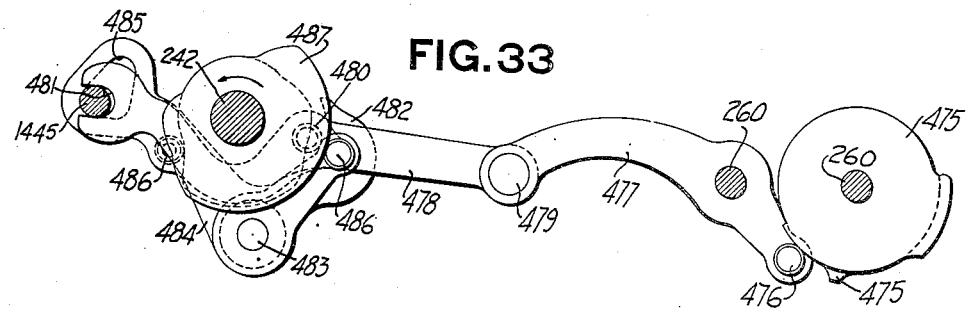
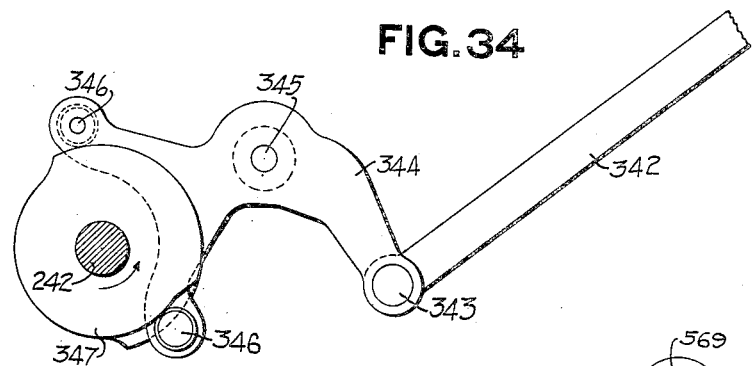
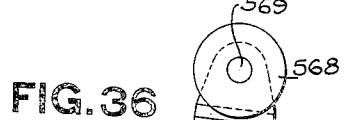
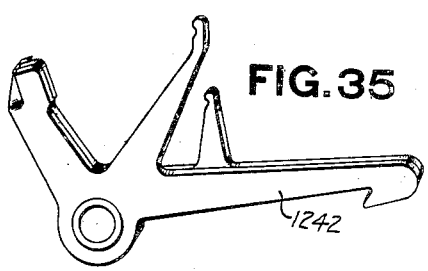
Inventor
FREDERICK L. FULLER
by Earl Beust
Attorney F. L. FULLER.
CASH REGISTER.
APPLICATION FILED APR. 24, 1918.
1,394,256.
Patented Oct. 18, 1921.
28 SHEETS—SHEET 18.
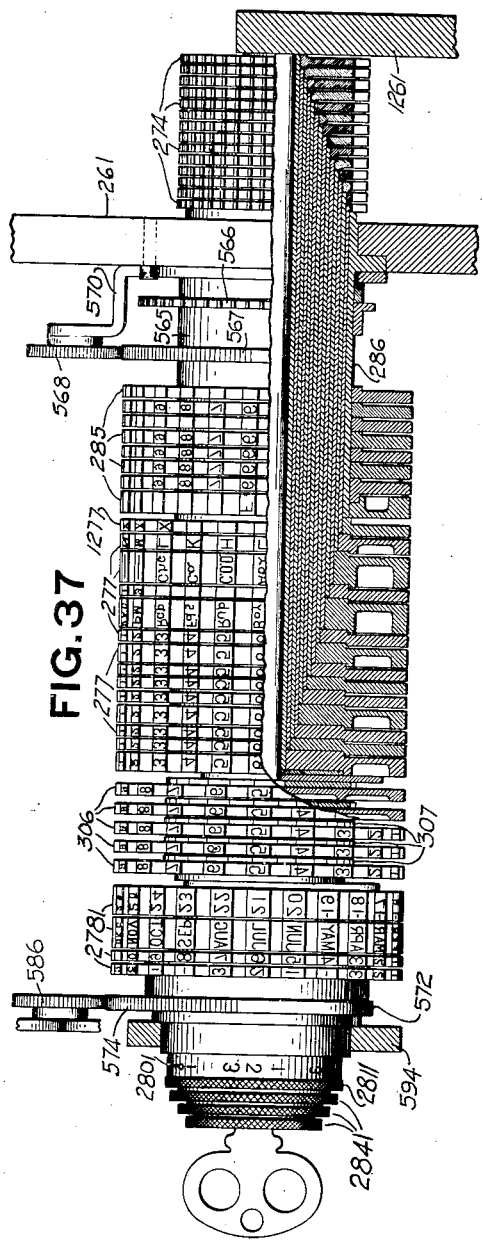
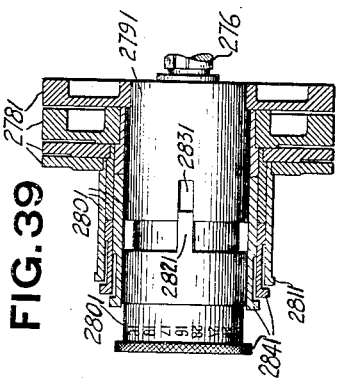
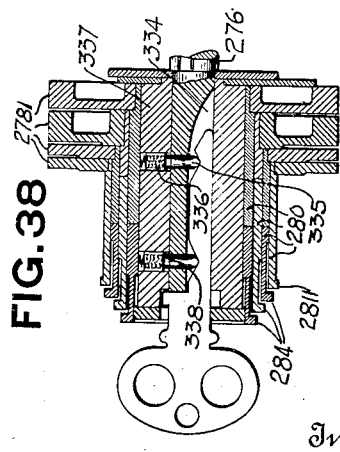
Inventor
FREDERICK L. FULLER
by Carl Beust
Attorney

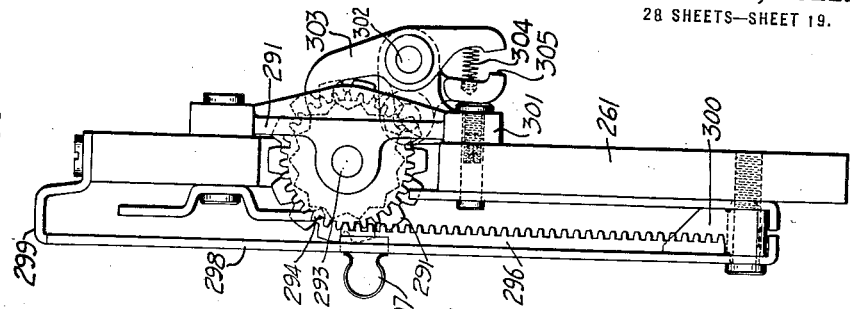
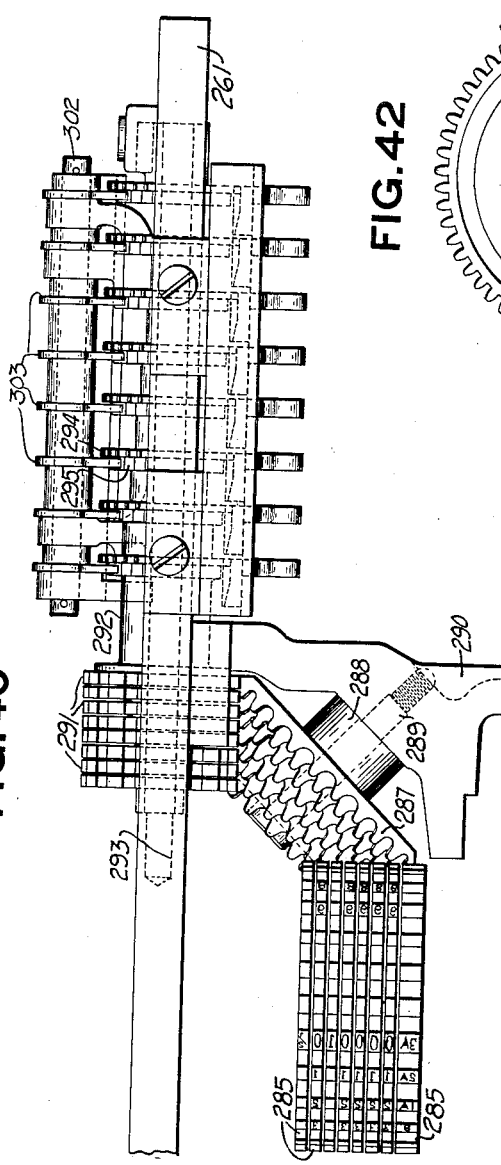
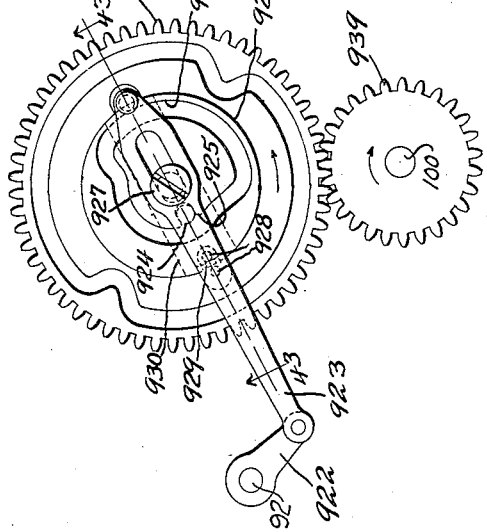
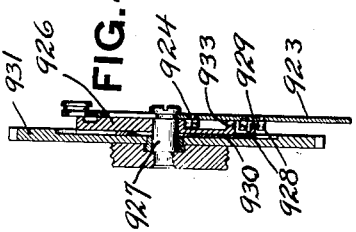

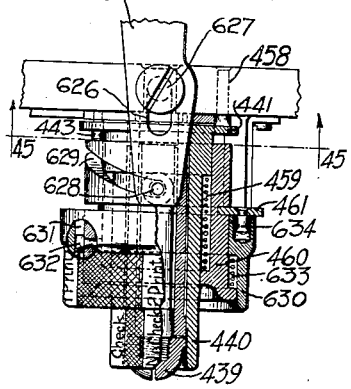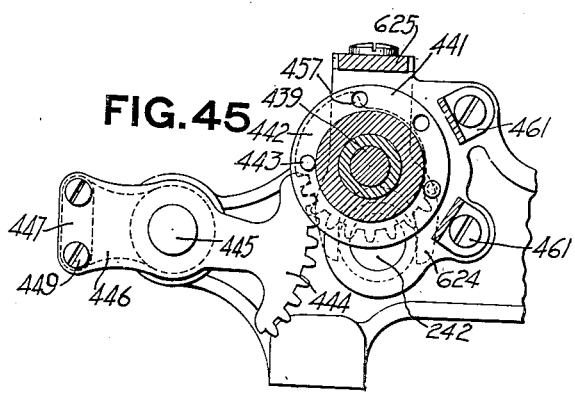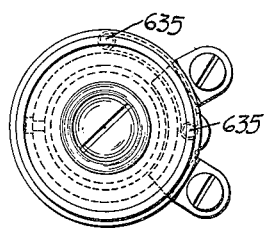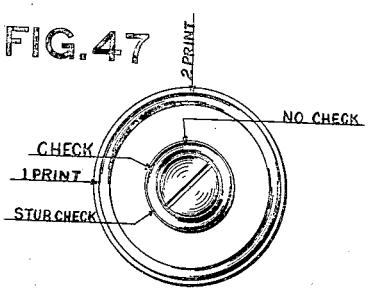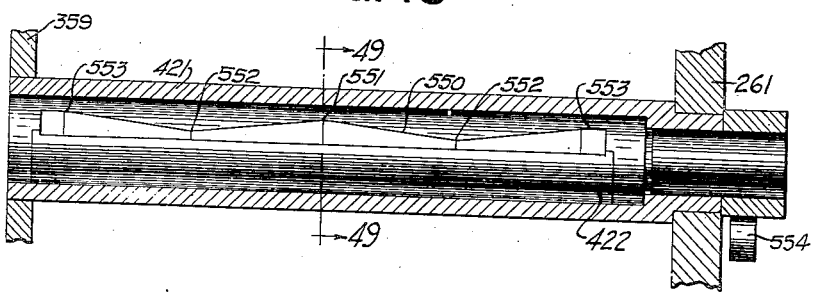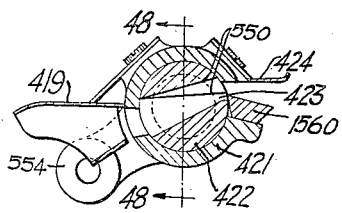

F. L. FULLER.
CASH REGISTER.
APPLICATION FILED APR. 24, 1918.
1,394,256.
Patented Oct. 18, 1921.
28 SHEETS—SHEET 21.
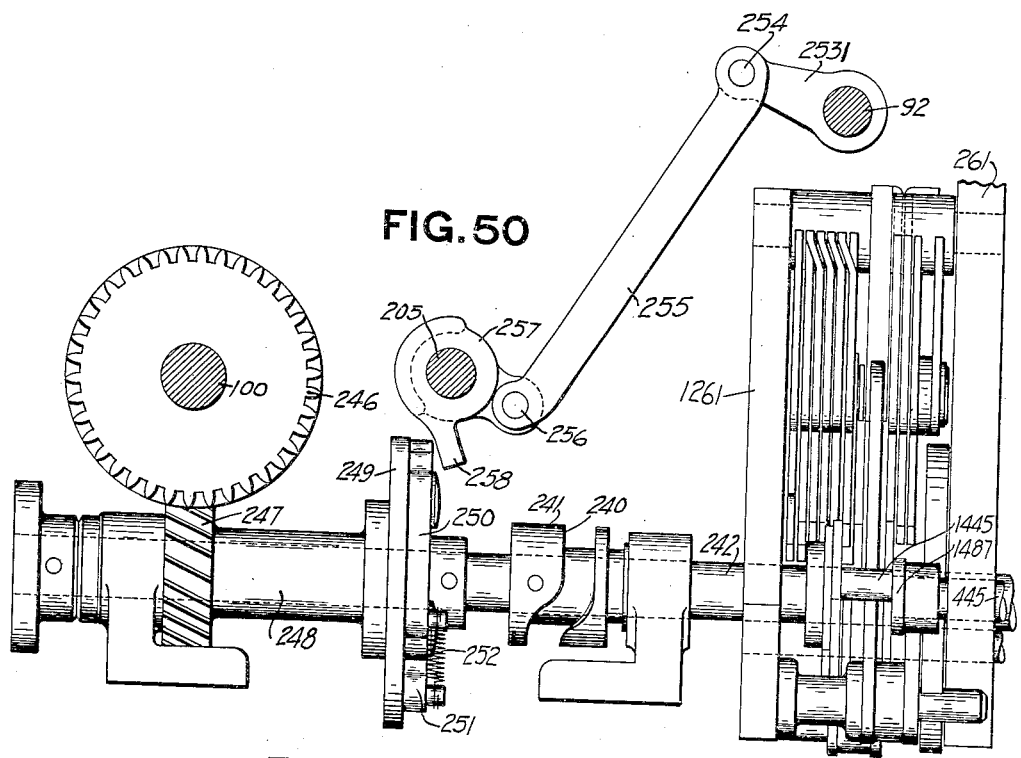
FIG. 50
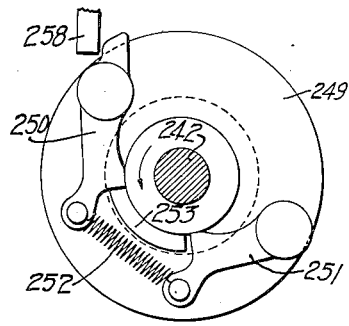
FIG. 51
FIG. 52
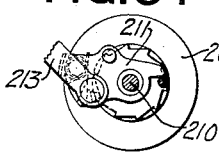
FIG. 54
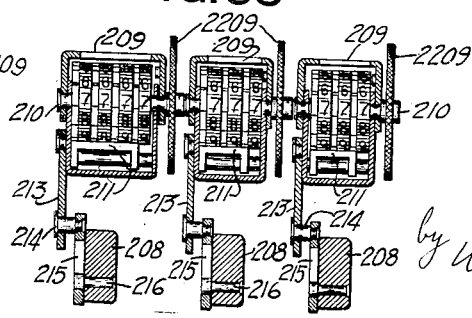
FIG. 53
Inventor
FREDERICK L. FULLER
by Carl Burst
Attorney

F. L. FULLER.
CASH REGISTER.
APPLICATION FILED APR. 24, 1918.

1,394,256.

Patented Oct. 18, 1921.
28 SHEETS—SHEET 22.

Inventor
FREDERICK L. FULLER
by Earl Beust
Attorney

F. L. FULLER.
CASH REGISTER.
APPLICATION FILED APR. 24, 1918.
1,394,256.
Patented Oct. 18, 1921.
28 SHEETS—SHEET 23.
FIG. 61
FIG. 62
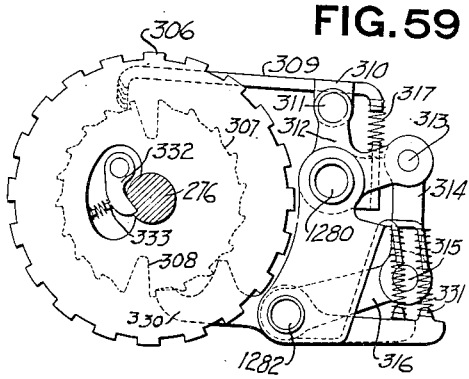
FIG. 59
FIG. 63
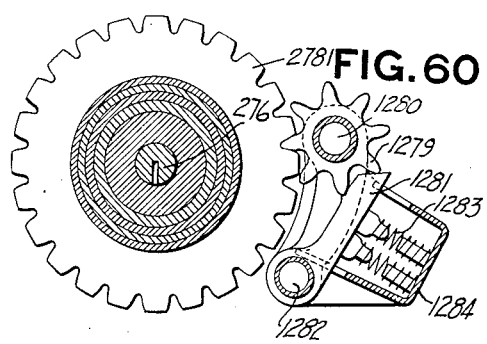
FIG. 60
Inventor
FREDERICK L. FULLER
by Earl Benst
Attorney F. L. FULLER.
CASH REGISTER.
APPLICATION FILED APR. 24, 1918.
1,394,256.
Patented Oct. 18, 1921.
28 SHEETS—SHEET 24.
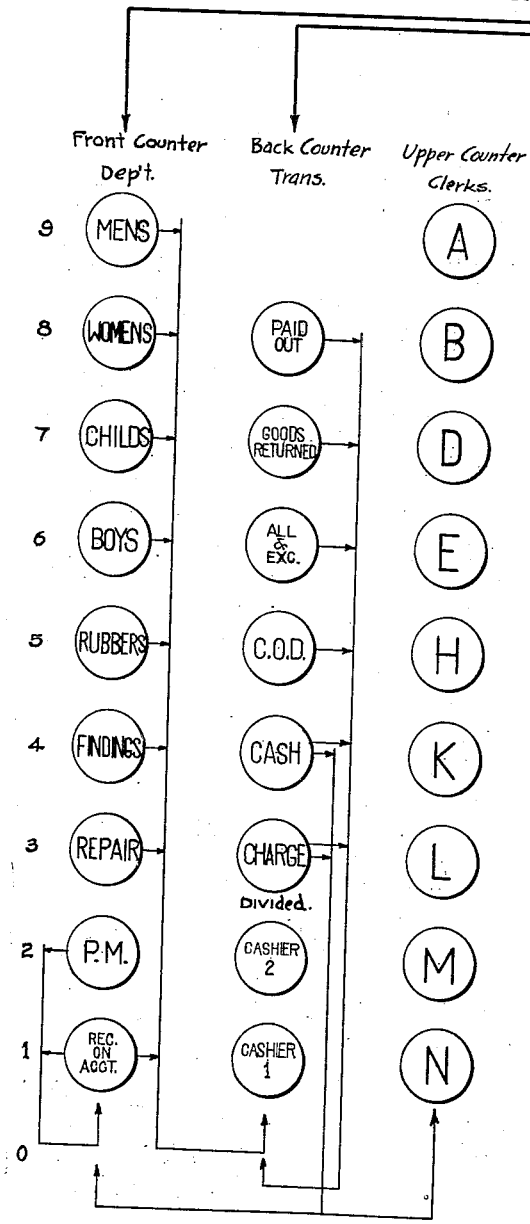
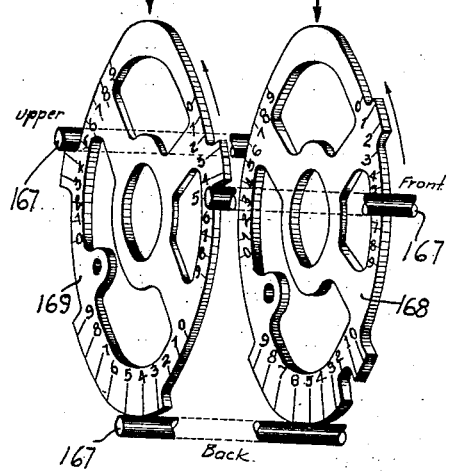
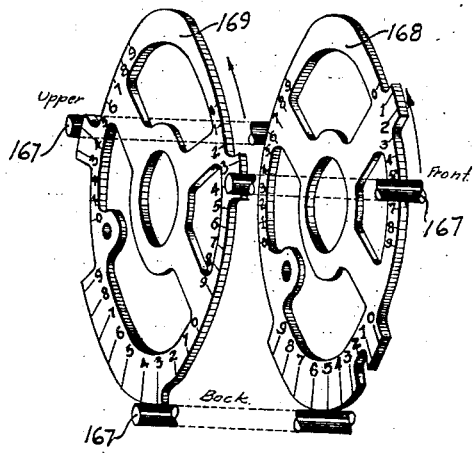
FIG. 64
FIG. 65
Inventor
FREDERICK L. FULLER
by Carl Beust
Attorney F. L. FULLER.
CASH REGISTER.
APPLICATION FILED APR. 24, 1918.
1,394,256.
Patented Oct. 18, 1921.
28 SHEETS—SHEET 25.
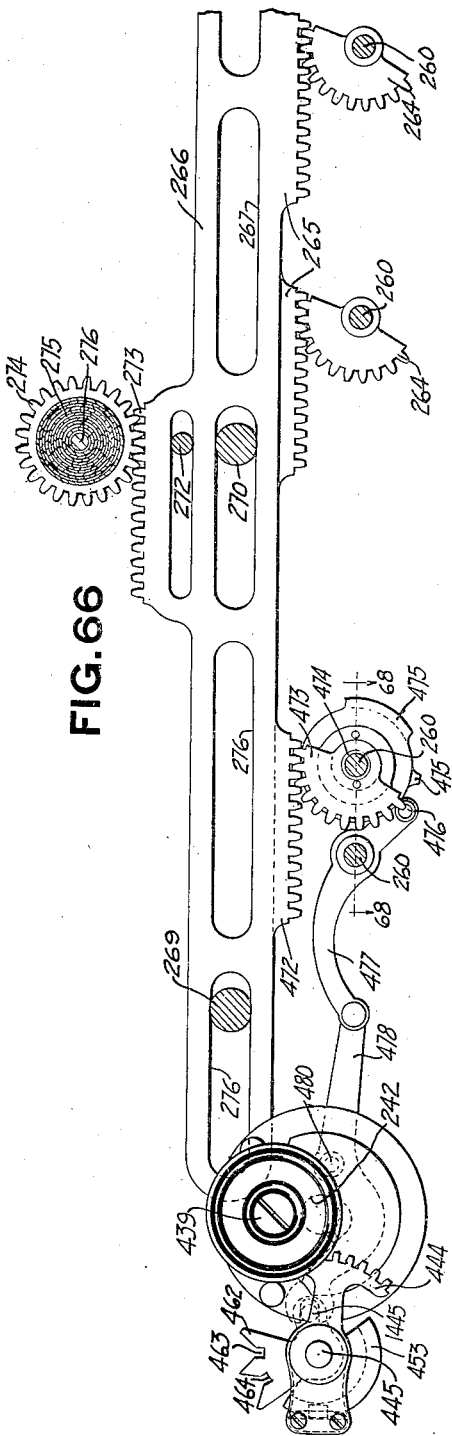
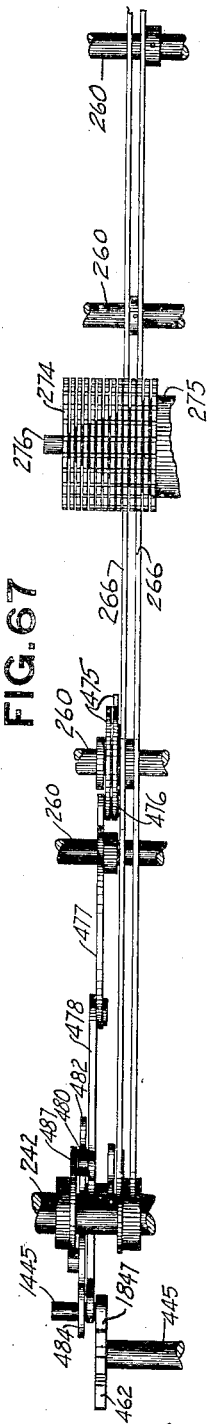
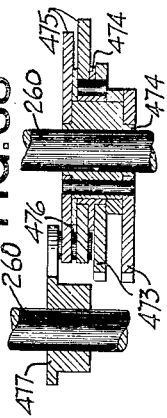
Inventor
FREDERICK L. FULLER
Attorney

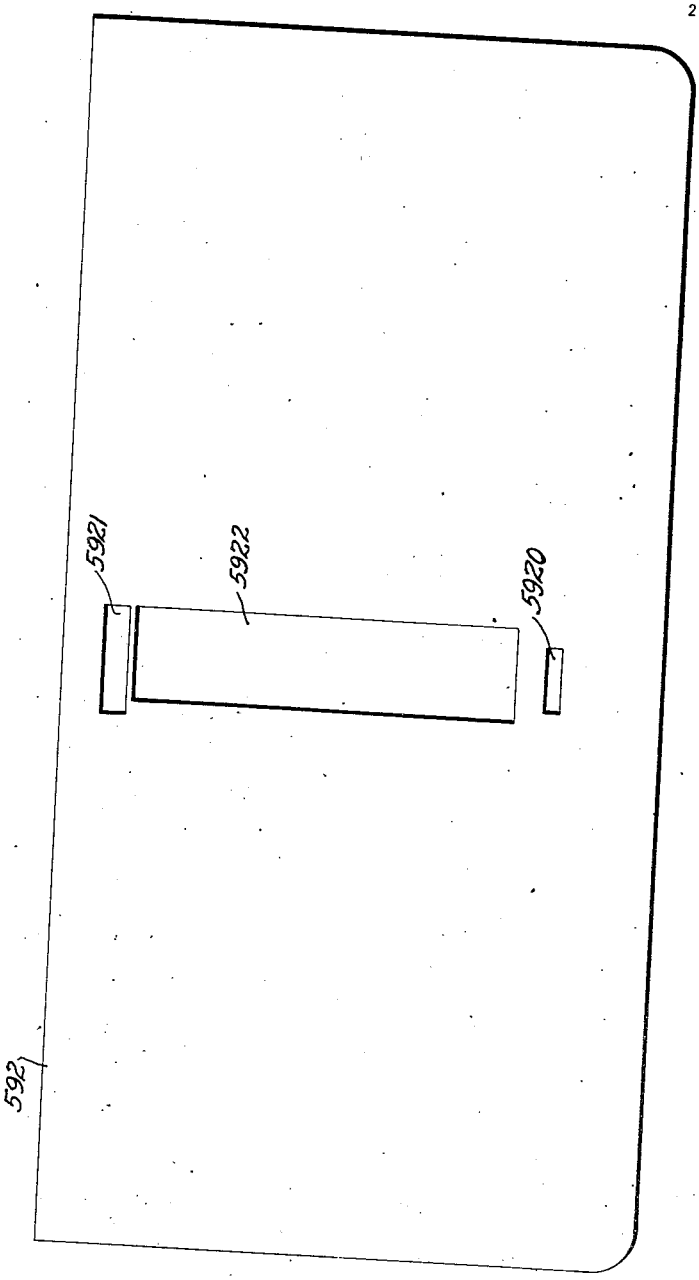

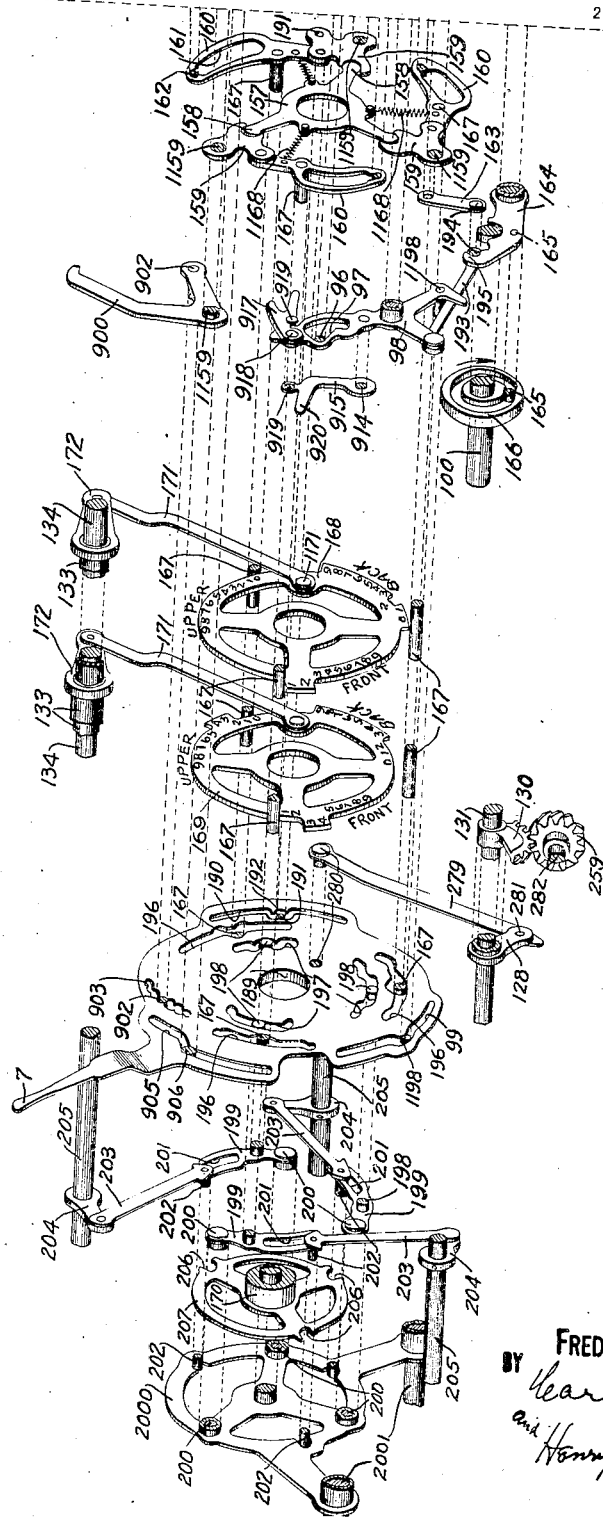

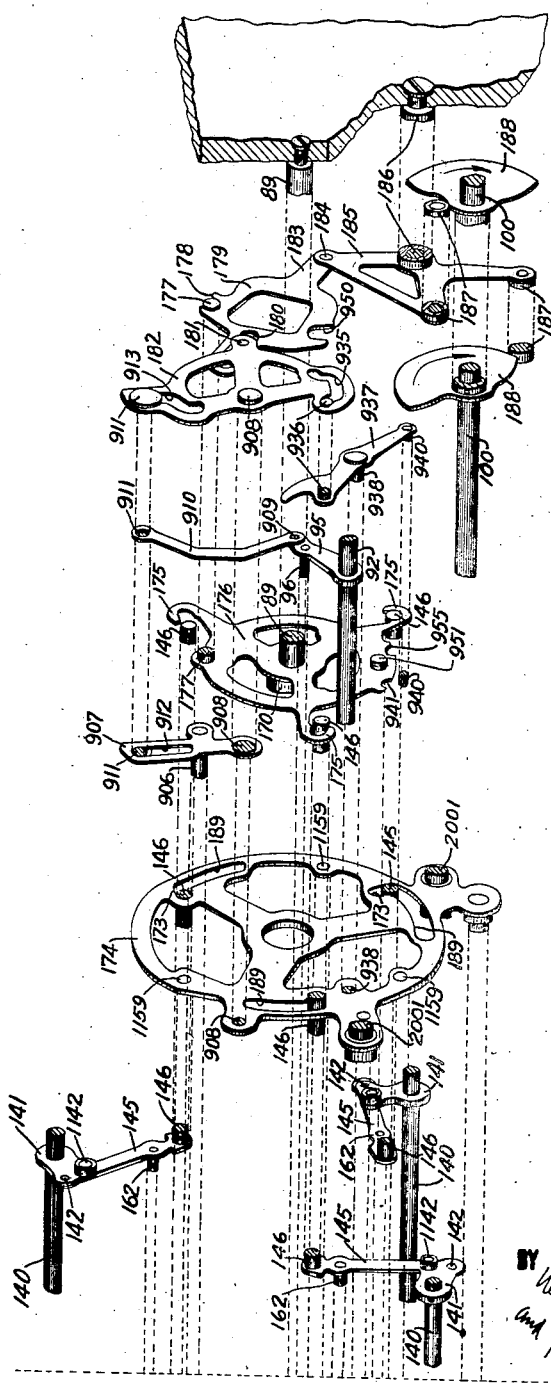

UNITED STATES PATENT OFFICE.

FREDERICK L. FULLER, OF BRIDGEPORT, CONNECTICUT, ASSIGNOR TO THE NATIONAL CASH REGISTER COMPANY, OF DAYTON, OHIO.

CASH-REGISTER.

1,394,256.  Specification of Letters Patent.  Patented Oct. 18, 1921.

Application filed April 24, 1918. Serial No. 230,455.

*To all whom it may concern:*

Be it known that I, FREDERICK L. FULLER, a citizen of the United States, residing at Bridgeport, in the county of Fairfield and State of Connecticut, have invented certain new and useful Improvements in Cash-Registers, of which I declare the following to be a full, clear, and exact description.

This invention relates to cash registers and the like, and has for its principal object the design of a machine adapted more particularly for use in shoe stores and the like. The machine embodies a plurality of individual totalizers for segregating the totals of different classes of goods sold and different classes of work done; a plurality of individual totalizers for segregating the totals of different classes of transactions; a plurality of individual totalizers for segregating the totals of sales by the various clerks; and a plurality of individual totalizers for segregating the amount of money received on account by the various cashiers. Although the present system contemplates and provides a means for segregating the amount of money received on account by the various cashiers, parts may be so arranged that other classes of transactions might be charged to the various cashiers in lieu of transactions where money was received on account without departing from the spirit and scope of the present improvement.

Another object of the present improvement is to provide a counter selecting mechanism coöperating with the differentials whereby various counters and combinations of counters may be selected and positioned for operation so that the amounts set up on the amount banks may be accumulated on any desired counter or accumulated on several desired counters simultaneously. In the mechanism illustrated and described in Letters Patent of the United States to F. L. Fuller, Number 1,242,170, dated Oct. 9, 1917, a plurality of counters are provided, the counters being arranged on two different counter lines, one line being a main totalizer and the other supporting a plurality of individual department totalizers, the department totalizer line being shifted to position the wheels of the desired individual totalizer into coöperation with the differentials, both counter lines however being rocked into engagement with the differential mechanism at each operation of the machine.

In the present mechanism a large number of individual totalizers are provided arranged on three counter lines. Various of these special totalizers may be selected and through the selecting mechanism previously mentioned only those counter lines containing the selected totalizers are rocked into engagement with the differential mechanisms. Although there are three counter lines, if but one special totalizer is selected only the counter line containing this totalizer will be rocked into engagement with the differential mechanism. The counter selecting mechanism is of such a character that it may be designed to select but one special totalizer although a plurality of special transactions or department keys are depressed. The object of this construction is to provide a means to meet the requirements of any special system where an indication and printing of a clerk's, department's and special transaction's character is desired, with an accumulation of these amounts upon only one of the special totalizers controlled by these keys.

Another object of the present improvement is to so construct a key bank of special transaction keys that some of the keys of the said bank are release keys for the machine, and will, when none of the other keys in the bank are depressed, position a counter to accumulate thereon the amount set upon the amount bank; but however, when any other key of the special transaction bank is depressed, these keys will act as release keys only and will not position any totalizer for accumulating thereon the amount set upon the amount bank.

Another object of the present improvement is to combine with a single key bank so constructed that one or more keys thereof may be depressed simultaneously, a plurality of indicators and type wheels which are set commensurate with the keys of the bank which are depressed.

Another object of the present improvement is to provide a key bank so constructed that two keys thereof may be depressed simultaneously and to combine with this key bank a differential mechanism which is provided with a differential segment and two latches which coöperate with, or in other words are broken by, the two keys of the bank which are depressed.

A still further object of the present improvement is to provide a machine of this type with a plurality of special counters and a novel means for determining which of the special counters is to be operated. The special counters perform the function of counting the number of times a certain totalizer is selected for segregating the totals of the classes of goods, of the totalizers for segregating the different classes of transactions, and of the totalizers for segregating the sales of the different clerks. The operating means for the special counters are so connected with a totalizer selecting mechanism, that they are operated only when the totalizer associated therewith is selected for operation under the control of the differential mechanisms and are not operated once for each depression of the key with which it is associated as was formerly the practice, such a structure being illustrated in Letters Patent of the United States to Thomas Carroll, No. 1,054,672, dated, March 4, 1913.

A still further object of the present improvement is to provide a printing mechanism having various novel features and so constructed, that a record strip, check and inserted slip may be printed, and with means wherein either the check or slip may when desired receive a double impression.

Another object of the present improvement is to provide a severing device coöperating with the printing mechanism, whereby a check issued by the printing mechanism may be either partly severed for use as a stub check or completely severed to produce a check without a stub.

A still further object of the present improvement is to provide a manually operative device for setting type wheels associated therewith whereby ledger numbers, stock sizes and the like may be set up and printed upon the record strip, check and inserted slip.

It is also the object of this invention to provide means for preventing a contact of the impression means with the type wheels when no slip is inserted to receive an impression therefrom.

With these and incidental objects in view, the invention consists in certain novel features of construction and combination of parts, the essential elements of which are set forth in the appended claims, and a preferred form of embodiment of which is hereafter described with reference to the drawings which accompany and form part of the specification.

Of said drawings,

Fig. 2 is a transverse sectional view through the machine taken alongside of one of the amount key banks, a part of the flexible detent and the inside key cover being broken away to show the key shanks.

Fig. 3 is a detail view of the cams for operating the feeding and shifting mechanism for the detail strip.

Fig. 4 is a vertical sectional view through the machine taken alongside of the clerk's bank of keys, parts being removed to show clearly the connection between the differential latch mechanism and the operating levers for the printing mechanism.

Fig. 5 is a detail view showing in top plan, the platen for making impressions on the detail strip and check paper, and also the mechanism for preventing the taking of an impression from the date type wheels onto the detail strip.

Fig. 6 is a detail view of the cam for feeding the ribbon and for actuating the pawl for the consecutive number type wheels.

Fig. 8 is a rear view of the divided bank of special transaction keys.

Fig. 9 is a left hand elevation of the divided bank of special transaction keys, and also showing a portion of the differential mechanism coöperating therewith.

Fig. 10 is a sectional view taken on the line 10—10 of Fig. 9 and looking in the direction indicated by the arrows.

Fig. 11 is a detail perspective view of one of the cashier's keys.

Fig. 12 is a fragmentary view in left hand elevation of the divided bank of special transaction keys, the inside key cover being removed, and the latch mechanism coöperating therewith.

Fig. 18 is a plan view of the mechanism shown in Fig. 16.

Fig. 19 is a vertical sectional view taken on the line 19—19 of Fig. 18 and looking in the direction indicated by the arrows.

Fig. 20 is a side elevation of the special counters and the operating mechanism therefor, and also shows the mechanism for throwing the special counters out of operation during total taking operations.

Figure 1:
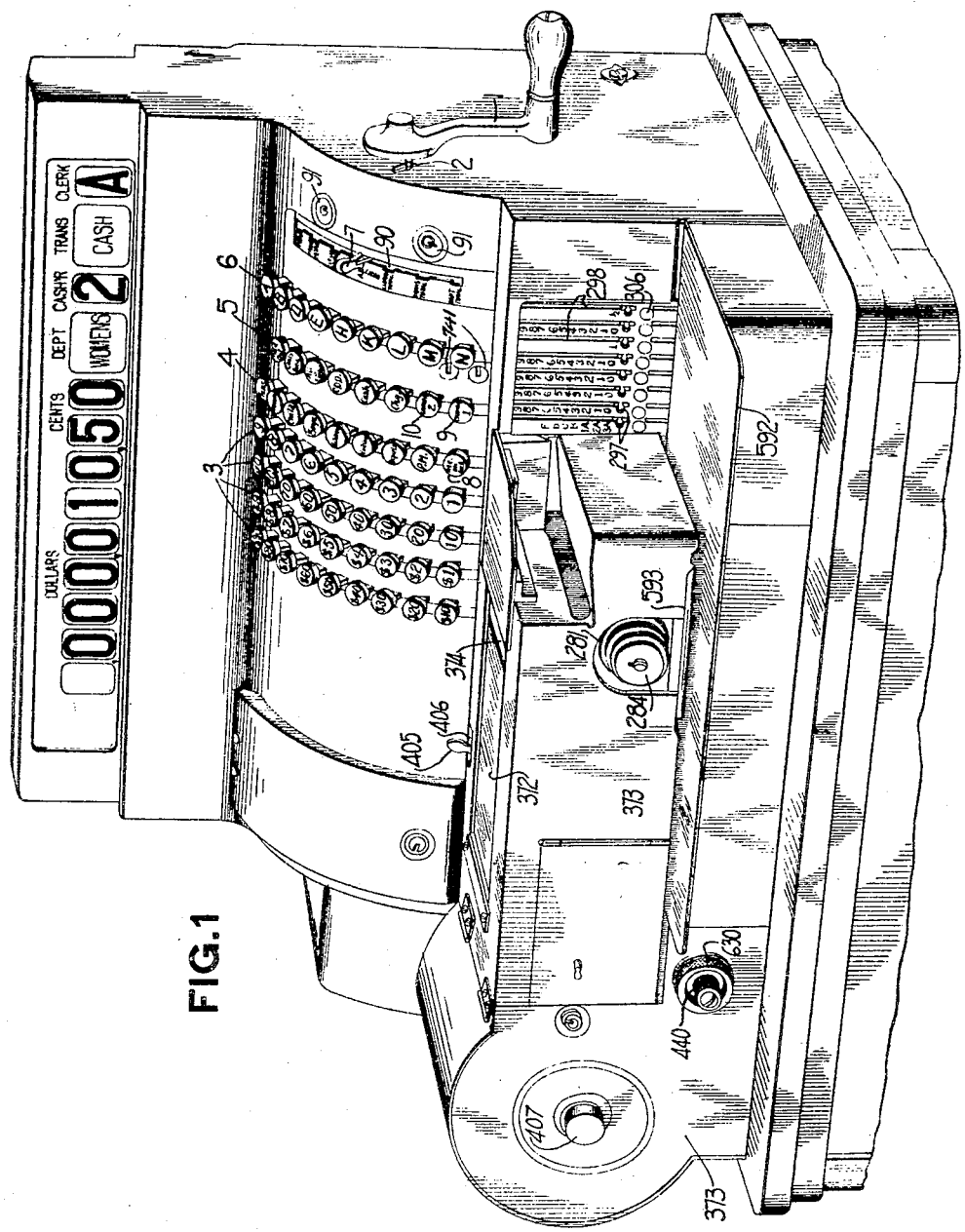
Figure 1 is a front perspective view of the complete machine.

Figs. 21$^A$ and 21$^B$ are complementary parts of a side elevation showing the entire printing mechanism.

Fig. 22 is a top plan view of a portion of the printing mechanism and showing the main drive shaft cam lines, and the gears and racks controlled by the differential segments.

Fig. 23 is a detail view of the cam for automatically controlling the printing and feeding of the check strip.

Fig. 24 is a vertical sectional view taken on the line 24—24 of Fig. 22 and looking in the direction indicated by the arrows.

Fig. 25 is a vertical sectional view taken on the line 25—25 of Fig. 22 and looking in the direction indicated by the arrows.

Fig. 26 is a vertical sectional view taken through the racks for setting the type wheels and also shows the means for printing on the detail strip a character to show whenever a slip is inserted in the machine. This figure also shows an interlocking plate positioned by the total lever for selectively controlling the operation of the clerk's transactions and department keys.

Fig. 27 is a detail view of the zero elimination mechanism.

Fig. 28 is a vertical sectional view taken on the line 28—28 of Fig. 26.

Fig. 29 is a detail view of the cam for operating the zero elimination mechanism.

Fig. 30 is a detail view of the platen and its operating mechanism for taking an impression from the type wheels upon the inserted slip, and also shows the toggle mechanism for crippling the platen when no slip is inserted.

Fig. 31 is a detail view of the cam and associated levers for operating the platen for taking an impression from the type wheels upon the detail strip and check.

Fig. 32 is a detail view of the Geneva feed mechanism for the check paper.

Fig. 33 is a detail view of the operating mechanism for the automatic control of the feeding and printing of the check strip.

Fig. 34 is a detail view of the cam and associated lever for operating the aliner for the type wheels.

Fig. 35 is a detail view of part of the zero elimination mechanism.

Fig. 36 is a detail view of the driving elements of the check ejecting mechanism.

Fig. 37 is a detail view showing in side elevation and partly in section the type wheel line.

Fig. 38 is a detail view showing in vertical section a key and its connection with the consecutive number type wheels for turning them to zero position.

Fig. 39 is a detail view partly in section of the manually operative knobs for setting the date type wheels.

Fig. 40 is a detail view showing in top plan the ledger type wheels and the connections between them and the manually operative setting racks.

Fig. 41 is an end elevation showing the manually operative racks for setting the ledger type wheels.

Fig. 42 is a detail view of the driving mechanism controlled by the totalizing lever for determining whether the machine makes one or two cycles before being locked in normal position.

Fig. 43 is a sectional view taken on the line 43—43 of Fig. 42 and looking in the direction indicated by the arrows.

Fig. 44 is a detail view showing in top plan and partly in section the manually operative knobs for controlling the operation of the impression platens and the feed for the check strip.

Fig. 45 is a vertical sectional view taken on the line 45—45 of Fig. 44 and looking in the direction indicated by the arrows.

Fig. 46 is an end view of the elements shown in Fig. 44.

Fig. 47 is a detail view illustrating the positions in which the manually operative knobs may be set.

Fig. 48 is a detail view showing construction of the rotating knife blade.

Fig. 49 is a vertical sectional view taken on the line 49—49 of Fig. 48 and looking in the direction indicated by the arrows.

Fig. 50 is an end elevation showing the clutch between the main driving mechanism of the register and the drive shaft for the printer, and also shows the device for preventing an operation of the printer during the first cycle of the register mechanism when taking a total.

Fig. 51 is a detail view of the clutch connection between the main drive shaft for the register mechanism and the drive shaft for the printer mechanism.

Fig. 52 is a detail view of the aliner for the operating plates of the Geneva movements for the feeding and printing of the check.

Fig. 53 is a vertical sectional view through the special counters, the counter wheels being shown in elevation.

Fig. 54 is a detail view of one of the actuating pawls for a special counter.

Figure 55:
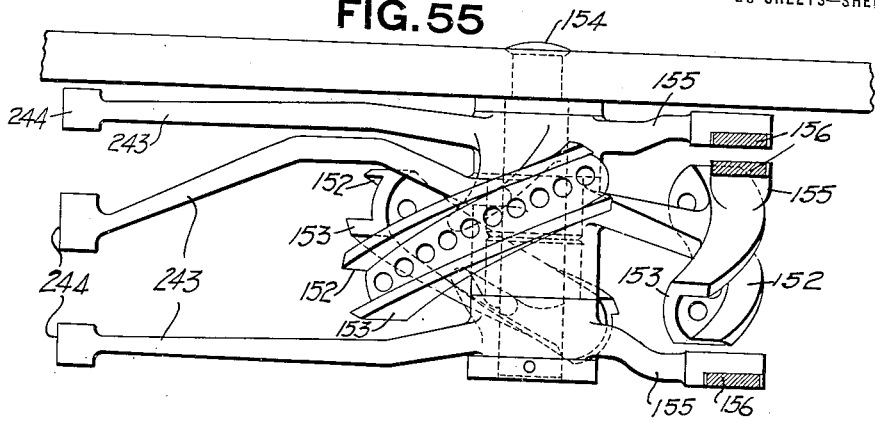

Fig. 55 is a detail view showing in top plan, the counter shifting cam and also showing the arms for selecting the corresponding special counters for actuation.

Figure 56:
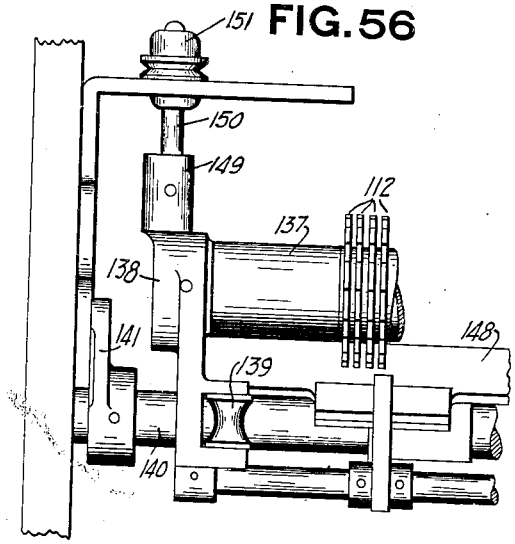

Fig. 56 is a fragmentary detail view showing in rear elevation a portion of one of the counter carrying tubes and also the counter framework.

Figure 57:
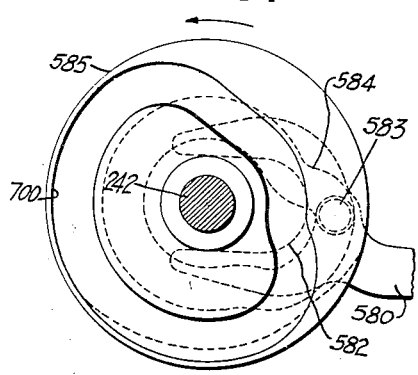

Fig. 57 is a detail view of the cam for operating the check ejecting mechanism.

Figure 58:
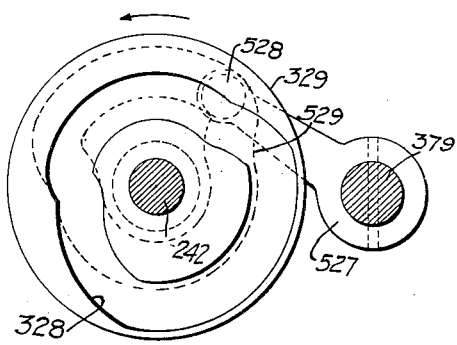

Fig. 58 is a detail view of the cam for controlling the impressions taken from the date type wheels.

Fig. 59 is a detail view showing in end elevation, the consecutive number type wheels and the actuating pawl therefor.

Fig. 60 is a detail view of the aliner mechanism for the date type wheels.

Fig. 61 is a detail view showing a full size stub check printed and issued by the printer mechanism.

Fig. 62 is a fragmentary detail view showing a full size portion of the detail strip printed by the printer mechanism.

Fig. 63 is a reduced fragmentary detail view of a slip printed by the printer mechanism.

Figs. 64 and 65 are diagrammatic views illustrating the operation of the counter line selecting mechanism and its control by the keys in the department, transaction, and clerk's key banks.

Fig. 66 is a side elevation showing the automatic check control and the printer racks by which it is actuated.

Fig. 67 is a top plan view of the mechanism shown in Fig. 66.

Fig. 68 is a horizontal sectional view taken on the line 68—68 of Fig. 66.

Fig. 69 is a plan view of the slip table.

Figure 16:
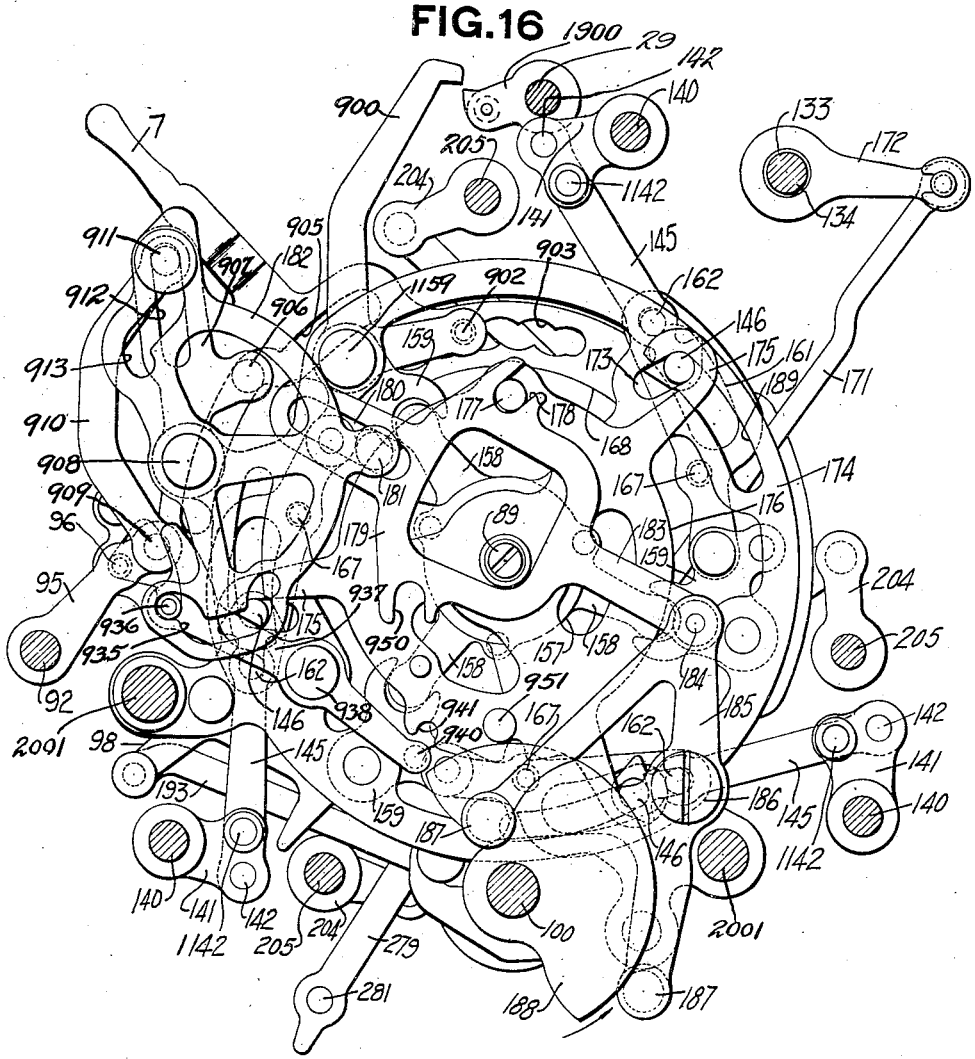
Fig. 16 is a side elevation of the counter control mechanism and also showing the totalizing lever and its coöperating elements.

Figs. 70^A and 70^B together constitute a disunited perspective view of the mechanism illustrated in Figs. 16, 18 and 19.

The machine in the illustrative form of embodiment disclosed herein is designed, more especially for use in shoe stores and the like, the keyboard being arranged suitably for such a type of mercantile business, and the printing mechanism so constructed that it meets all the requirements of such a store. However, certain features of the keyboard arrangement and various functions of the printing mechanism may be used to advantage in various other mercantile lines and although the accompanying drawings show the invention in preferred form adapted to the particular requirements of a shoe store, it is to be understood that it is not intended to limit the invention to such use, as it is well adapted for use in analogous lines of business.

Described in general terms the machine has three counter lines each comprised of a plurality of totalizers, mounted in frames which are movable to bring any one of the totalizers into operative relation with key control differential actuators. The movement of the frames carrying the counters is controlled by three banks of keys, the keys in one bank representing for instance, "Men's", "Women's", Children's" shoes, each key in this bank serving to shift the counter so that the totalizer commensurate with the key depressed will be actuated by the differential mechanisms; the keys in another one of three banks, representing classes of transactions such as "Charge," "Cash", "C. O. D.", etc., are arranged to shift its counter and set its associated totalizer in a manner similar to that explained above; and the last key bank representing the various clerks, has each key thereof arranged in coöperative connection with the machine in the same manner as before explained. Various of these special totalizers may be selected and through the selecting mechanism previously mentioned only those counter lines containing the selected totalizers are rocked into engagement with the differential mechanisms. Although there are three counter lines, if but one special totalizer is selected only the counter line containing this totalizer will be rocked into engagement with the differential mechanism. The counter selecting mechanism is of such a character that it may be designed to select but one special totalizer although a plurality of special transaction or department keys are depressed. The object of this construction is to provide a means to meet the requirements of any special system where an indication and printing of a clerk's, departments' and special transaction's character is desired, with an accumulation of these amounts upon only one of the totalizers controlled by these keys.

One of the three banks of keys above mentioned may be described broadly as of the "divided bank" type, but in addition to having this general construction possesses many novel features. The key bank is provided with a plurality of keys the shanks of which are formed wide enough to coöperate with two latches instead of with but one as is shown in patents to Chryst No. 1,230,864, and Fuller No. 1,242,170. The latches are arranged side by side and are operated by a single differential mechanism of the type illustrated in the above noted patents, and to these two latches two levers are operatively connected each of which set a target and a type wheel.

The key bank itself contains a certain number of keys which have split shanks and is so constructed that when no other key in the bank is depressed both portions of the shank of such a key will be depressed when the key is depressed; but when some other key in the bank is depressed a part only of the shank of such a key will be depressed when the key is depressed. The result is that when one of the special keys is depressed both portions of the shank of such key are depressed and both latches are set at the same point whereas when two keys are depressed but one portion of the split shank will be depressed and the two latches move different distances, one determined by the split key shank of the special key and the other by the shank of the other key depressed. In the first case, the counter associated with the split key shank is set to accumulate the amount set on the amount bank whereas in the latter case the counter associated with the other depressed key of the bank will be set to accumulate the amount. However, since each latch is connected to an indicator target and a type wheel, these elements are set through the movement of its associated latch irrespective of the selection of the counters.

In the present system this key bank is so arranged that the keys with split key shanks are marked "Cashiers" keys and the remaining keys in the bank are marked with special transactions indicating "Paid out," "Goods rec'd," "Allowance and exchange," "C. O. D.," "Cash," and "Charge" which are transactions appropriate to a shoe store. The "Received on account" key is located in the bank of keys denoting special classes of goods such as "Men's," "Women's," "Repairs," etc., and this key is to be depressed in conjunction with a depression of one of the "cashiers" keys so that all amounts received on account will be added both on the "Rec'd on acct." totalizer and also on the "cashiers" totalizer. The "cashiers" keys are in the "divided key bank" and will not set the totalizers associated therewith when any of the other keys such as "Cash," "Charge," etc., in that bank are depressed. When one of the "cashiers" keys is the only key depressed in the bank, the totalizer associated therewith is set and the amount set on the amount key banks accumulated thereon. The present system contemplates pressing the "Rec'd on acct." key only when one of the "cashiers" keys is depressed so that the total on the "Rec'd on acct." totalizer will always equal the sum of the totals on the "cashiers" totalizers.

In the printing mechanism a single set of type wheels is provided, the wheels being of sufficient diameter to contain one series of type numerals or characters on the upper half of their peripheral edges, and a similar series on the lower half of their peripheral edges. Impression means are provided to take two impressions from the upper set of type carried by the wheels onto a detail strip and check paper, the impression mechanism being settable so that one impression will be taken on the detail strip and one impression on the check paper, or set so that one impression will be taken on the detail strip and two on the check paper. Feeding and severing means for the check strip is provided and is adjustable so that when one impression is made on the check strip the same is severed to form a single check and when a double impression is made the check strip is fed to suitably space the impressions and the severing mechanism arranged to partially sever the check strip between the two impressions and completely sever the strip after the second impression so that a stub check is provided.

Impression means is also provided for taking an impression from the lower series of type carried by the type wheels upon an inserted slip. This impression means is adjustable so that either a single or a double impression may be taken upon the slip and a feeding mechanism is provided so that the slip will be fed between impressions and the impressions on the slip as a consequence spaced.

In addition to the setting of type wheels commensurate with the amount set on the amount banks, the setting of a character to print an indication of the special transaction and a printed character to indicate the clerk, manually operatable means is provided for setting type wheels to indicate ledger numbers, stock numbers, sizes and the like.

The machine is also provided with mechanism to print the totals of amounts accumulated on the various counters as shown and described in patents to Chryst No. 1,230,864, and Fuller No. 1,242,170 and in addition is provided with novel means connected with the totalizing lever so that upon adjusting the lever to set up in the machine a condition to "take total" or "read" the totals on the various counters, a type wheel will be set to print a character to show that the amount printed was impressed either during a "total taking" or "reading" operation of the machine.

For the purpose of illustration, the invention is shown applied to a type of machine the general principle of which is disclosed in U. S. patent to W. A. Chryst, No. 1,230,864 dated June 26, 1917, and a patent issued to applicant, No. 1,242,170, dated October 9, 1917. While the invention is shown applied to this particular type of machine, it is to be understood that the invention is susceptible of use with other types of accounting machines, and therefore, it is not intended to limit the scope of the invention for use with the particular type of machine shown. The present improvement resides to a great extent in the printing mechanism and while this printing mechanism is shown applied to the particular type of registering mechanism exemplified by the above noted patents, it is to be understood that this printing mechanism is susceptible of use with various other types of accounting machines, and therefore, it is not intended to limit the scope of this invention for use with the particular type of machine shown.

*Operating mechanism.*

The operating mechanism which it is desired to use with the present invention is of the well known type shown and described in Letters Patent of the United States No. 1,242,170 granted to the present applicant, on October 9, 1917, in which both an electric motor and hand operated drive is disclosed. The electric motor, its connection and control, and the specific construction of the hand operated drive is not illustrated herein, Fig. 1 merely showing a hand operated crank 1 and the usual lever 2 which may be lifted to free the handle so that it may be detached from its operative connection with the machine.

Keyboard.

Figure 13:
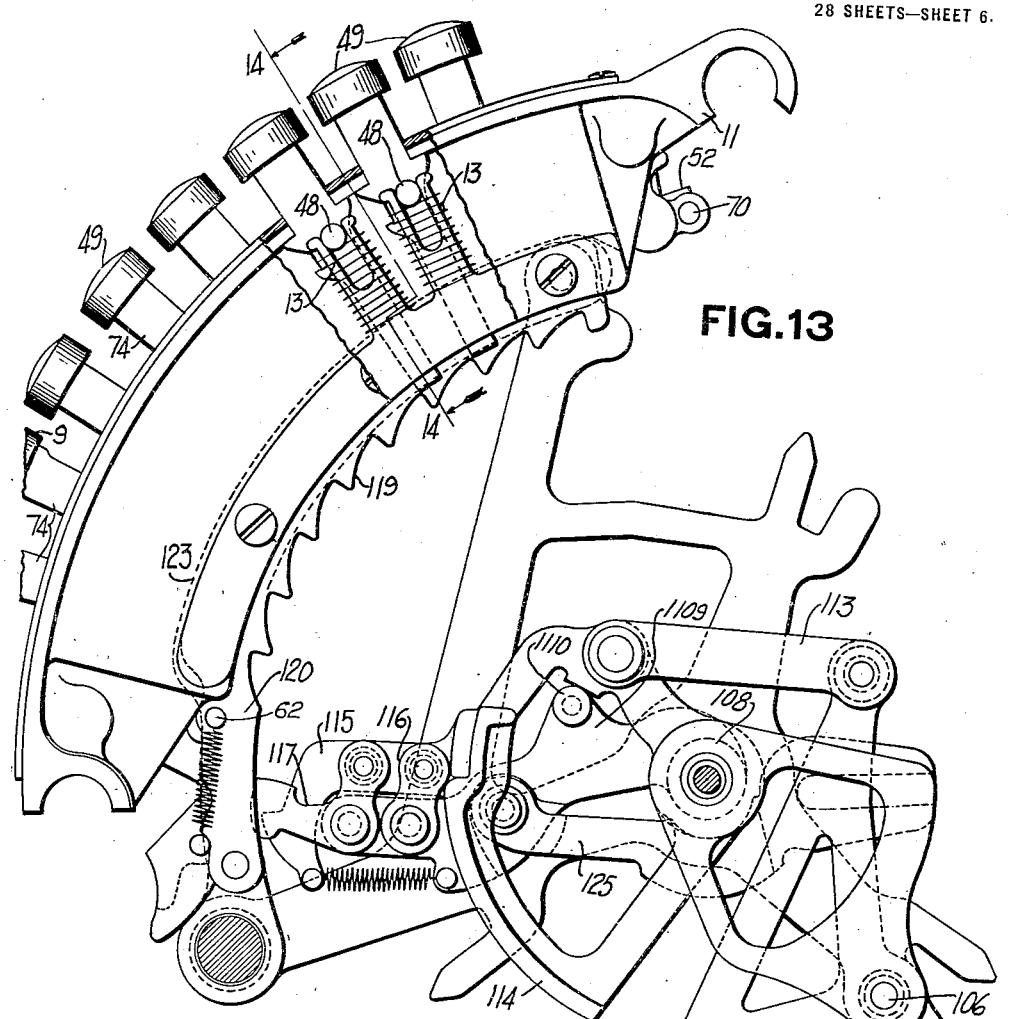
Fig. 13 is a right hand elevation of the divided bank of special transaction keys, and the latch mechanism coöperating therewith.

The keyboard (Fig. 1) comprises four banks of amount keys 3, one bank of departmental keys 4, one bank of transaction keys 5, one bank of clerk's keys 6, and a total control lever 7, employed to control the machine for total and sub-total printing operations. Attention is called to the fact that the bank 4 of departmental keys contains one transaction key 8 designated "Rec. on acct.", and the bank of transaction keys 5, contains two keys 9 and 10 marked "Cashier 1" and "Cashier 2" respectively the purposes of which will be hereinafter explained. The construction of the key banks is very similar to that shown and described in the aforesaid Fuller and Chryst patents, and therefore, they will be described but briefly here. The keys of each bank are mounted in an individual frame 11 (Figs. 2, 4, 9 and 13) mounted on cross rods 12 and springs 13 (Fig. 13) are employed normally to retain the keys in undepressed position.

The amount keys 3 (Fig. 2) coöperate with key detents 14 and locking plates 15. The detents 14 are supported at their upper and lower ends respectively by arms 16 and 17 loosely pivoted on pins 18 on the key frames 11. When a key is depressed the inclined edge of a shoulder 19 on the key engages a corresponding pin 20 on the detent, thus moving the latter downwardly until the shoulder is past the pin, when the detent rises slightly retaining the key in depressed position. The arm 17 engages a pin 21 on a zero stop pawl 22 which is normally in effective position and when the detent 14 is moved downward, the pawl 22 is rocked clockwise (Fig. 2) to render it ineffective. A spring 23 connected at its lower end to the pawl 22 and at its upper end to the key frame serves to retain the pawl 22 and detent 14 in normal position.

The locking plates 15 (Fig. 2) for the banks of amount keys are provided with extensions which immediately upon the depression of either of the cashier's keys to release the machine pass over pins 24 on the depressed keys and under the pins 24 on the undepressed keys, thereby preventing manipulation of the keys during an operation of the machine. In order to give the locking plates 15 the required upward movement, the upper supporting arms 25 for the locking plates are provided with extensions 26 extending over a rod 27 carried by arms 28 fast on a shaft 29. This shaft 29 is rocked counter-clockwise (Fig. 2) upon depression of a cashier's key, as will be hereinafter described, whereupon the rod 27 lifts the locking plates into locking position.

The construction of the key banks 4 and 6 (Fig. 1) which contain the departmental keys and clerk's keys respectively is identical, the bank 4 being taken as representative of the two banks and shown in Fig. 4. The key detent 30 and locking plate 31 are similar to the detents and locking plates for the amount keys and perform substantially the same functions. The detent 30 is pivoted at one end to an arm 32 pivoted to a stud 33 carried by the key frame and engaging a pin 34 carried by a zero stop pawl 35. The upper end of the detent is pivoted to a stud 36 carried by an arm 37 pivoted to a stud 38 carried by the key frame. When a key in the bank is depressed, the detent 30 is moved downwardly and means hereafter to be described hold the key in depressed position and also rock the zero stop pawl 35 clockwise to render it ineffective.

The latch plate 31 is pivoted at its lower end to an arm (not shown) loose upon the stud 33 and at its upper end to a stud 39 carried by the lower end of an arm 40 pivoted at its upper end to the stud 38. The arm 40 is provided with a projecting nose 41. The depression of one of the keys 4 engages a pin 42 carried thereby with an inclined slot 1143 formed in the latch plate 31, which causes the said latch plate to be cammed downwardly. The downward movement of the latch plate positions it beneath the pins 42 on the keys which are not depressed and prevents their manipulation during an operation of the machine. Means is provided for holding the plate 31 in its downward position during the operation of the machine and this means comprises a pawl 43 loosely mounted on the shaft 29 and provided with a notch 44 in its outer end. When the latch plate 31 is moved downwardly the nose 41 of the lever 40 will be moved downward and forward a distance sufficient to permit the pawl 43 to be moved upwardly under action of its spring 45 until the nose 41 lodges within the notch 44 in the pawl, where it is held, thus holding the latch plate 31 in its latching position until the pawl 43 is rocked clockwise to release the nose 41. When no key in the bank is depressed the nose 41 of the lever 40 normally rests upon the upper edge of the pawl just above the notch 44 as is shown in Fig. 4. At the proper time during the latter part of the operation of the machine, the shaft 29 is rotated clockwise. Arms 46 are pinned to the shaft 29 which are adapted to contact with pins 47 carried by the pawls 43 and during the clockwise movement of the shaft 29, engage the pins 47 and rock the pawls 43 clockwise a distance sufficient to release all of the noses 41 which are lodged within notches 44 of the pawls, and thereby permit the return of the latch plates to their normal position.

The bank of special transaction keys 5, which will hereafter be termed the "divided bank" is shown in Fig. 9 and while it is constructed somewhat similar to the key banks already described, it nevertheless contains elements not found in the other banks through the medium of which it is capable of additional functions. The keys of this bank are mounted in a key frame 11, the bank, however, containing but eight keys whereas the other banks contain nine. By reference to Fig. 1, it will be seen that the first six keys, reading from the top, indicate all the different monetary transactions which will be encountered in the business for which the machine is designed, and the last two keys marked 9 and 10 indicate the cashiers who are to be the operators of the machine. It is apparent that whenever desired a greater or a less number of keys might be placed in this bank determinable either by the number of cashiers who are to use the machine, or by the addition or elimination of various branches of monetary transactions which the particular user of the machine might wish. All of the keys are mounted in the key frame 11 similar to the banks previously described, and the first six keys, marked 49 and which indicate the special monetary transactions, are each provided with a pin 48 which coöperates with an inclined slot 1149 made in a detent 50, which is pivoted to an arm 51 similar to the arm 40 of the key bank 4. This arm has a nose 52 which coöperates with a notch in a spring pressed pawl 54 loosely mounted on the shaft 29, the pawl 54 being exactly like the pawl 43 used in connection with the key bank 4. When any one of the keys 49 is depressed through the pin 48 and slot 1149, the detent 50 is cammed downwardly which moves the nose 52 downward a distance sufficient to permit the pawl 54 to be rocked counter-clockwise by its spring and engage the notch in the pawl with the nose 52, locking the latch plate 50 in its downward position in which it lies beneath the pins 48 of all the undepressed keys, preventing their manipulation.

A machine of the type herein shown and which is fully described in the aforementioned patent to Chryst and Fuller has locking means for normally preventing the operation of the machine either by hand or motor until any one of certain designated keys is depressed. These keys, which are known as "release keys", have a number of different designations dependent upon the system for which the machine is designed. In the present instance, the two cashier's keys 9 and 10 are the release keys for the machine and consequently the machine cannot be operated unless one of these keys is depressed. Since each key 9 and 10 is provided with a lock 741, see Fig. 1, preventing its depression unless unlocked by a key held by the cashier, an effective means is provided for preventing use of the machine by any one other than a cashier. Either key 9 or 10 in addition to being a release key also controls a certain counter, indicator and type wheel as will be hereinafter described. It is sufficient here to state that no one can operate the machine but a cashier, and when the machine is operated by such cashier the cashier's number is printed on the various printing mediums and also set up by the indicator.

The only portion of the release mechanism *per se* shown herein is, referring to Fig. 9, the casting 53 loosely mounted on a shaft 1154. This casting is rocked, both for releasing the machine, as is described in the Fuller patent, and also for other purposes to be later described, by the depression of a cashier's key 9 or 10. Each of these keys is provided with a pin 55 which coöperates with a curved slot 56 made in a detent 57. The latch plate 50 is cut away beneath the pins 55 so that the said pins do not actuate the plate 50 for locking the undepressed keys as do the keys 49 previously described. The detent 57 has its lower end pivoted at 58 to an arm 59 which is pivoted to a stud 60 carried by the key frame. A spring 61 stretched between the arm 59 and a stud 62 on a latch plate 123 holds the detent 57 in the position shown in Fig. 9. The upper end of the detent is pivoted at 63 to a bell crank lever 64 pivoted upon a stud 65 carried by the key frame and having a pin 70 projecting from its other arm and fitting with a yoke 72 extending from and integral with the casting 53. When either of the keys 9 or 10 is depressed, the pin 55 thereon engaging the slot 56 will cam the detent 57 downwardly, and through the medium of the pin 70 and yoke 72 rock the casting 53 clockwise. As described in the aforementioned patents a clockwise rocking of the casting 53 will release the machine for operation either by a motor or by hand. Since only the keys 9 and 10 can actuate the detent 50 to rock the casting 53 these consequently are the only keys which can release the machine.

After the machine has been released it is desirable to lock all of the keys in all banks of the machine so that they cannot be depressed during the operation of the machine. This means comprises arms 73, shown in Fig. 4, carried by the casting 53, one arm being normally in engagement with each stud 39 which is extended beyond each arm 40 of the key banks 4 and 6. When a key 9 or 10 is depressed, the casting 53 is rocked clockwise, as previously described, and this movement of the casting will cause a clockwise movement of the arms 73 which, engaging with the studs 39, will move the arms 40 and locking plates 31 downwardly a sufficient distance to position the said plates beneath the pins 42 on all undepressed keys and prevent their manipulation. The movement of the arms 40 downwardly will permit the pawls 43 to move counter-clockwise and lock the noses 41 of said arms 40 within the notches 44 of the pawls.

The rocking of the casting 53 to release the machine necessitates a counter-clockwise rocking of the shaft 29 to actuate the release of the operating mechanism as described in the Fuller patent above mentioned. The counter-clockwise movement of the shaft 29 will through the arms 28, pins 27 and projections 25 on the locking plates 15 for each amount bank 3, also lift the latch plates and prevent a depression of any of the amount keys.

The above makes it clear that upon depression of a cashier's key 9 or 10 the machine is released so as to be actuated by the operating mechanism and simultaneously therewith all keys in all the key banks are locked against depression during the operation of the machine.

As is described in the Fuller patent above mentioned and as will be hereinafter explained, each amount key bank and also the key banks 4 and 6 have a differential mechanism which is controlled by the keys and which is designed to actuate a totalizer, indicator and type wheel commensurate with the key depressed. In the present mechanism a slightly different construction is employed in connection with the key bank 5 in that two differential mechanisms are employed with this key bank instead of one. The construction of these differential mechanisms will be later described in detail it being sufficient here to state that two differentials are arranged side by side and are both controlled by the key shanks of the keys 49 and 9 and 10 in the key bank 5, and further that each of these differentials controls an indicator and type wheel while but one of them selects a totalizer.

Figures 14, 15:
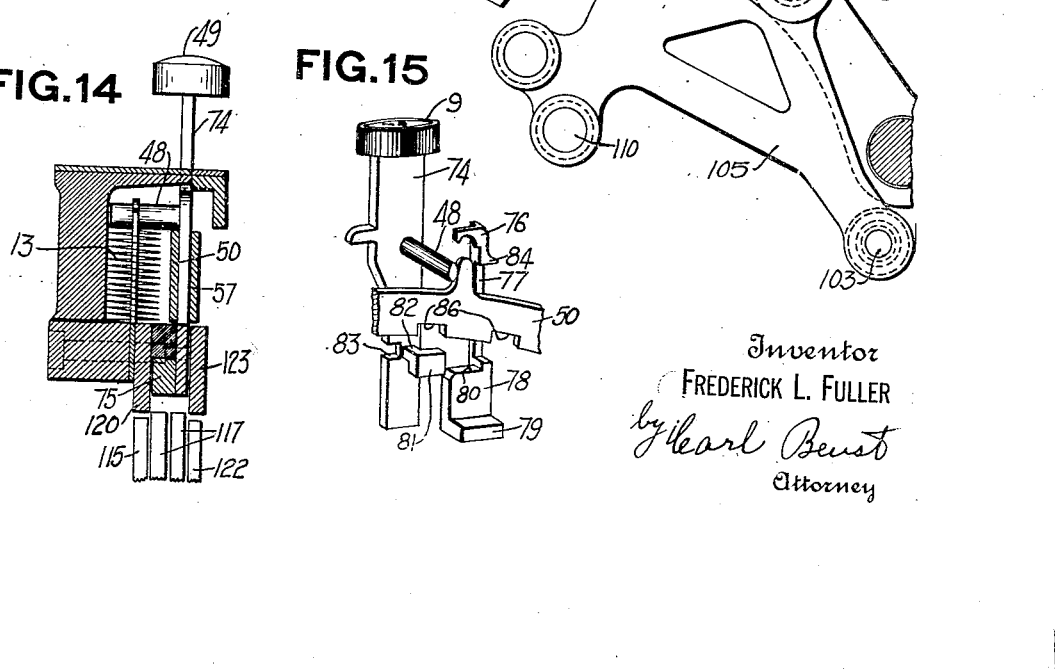
Fig. 14 is a sectional view taken on the line 14—14 of Fig. 13 and looking in the direction indicated by the arrows.
Fig. 15 is a detail disassembled perspective view of one of the cashier's keys.

The lower end of each of the key shanks 74 of the keys 49 has secured thereto a rectangular block of metal 75, referring to Fig. 14, due to which the said key shank is of sufficient width so that when depressed it will stop and break the latch of the differential associated therewith. A fragmentary portion of the latches of the two parallel arranged differentials is shown in the figure above referred to. The drawings make it apparent that the key shank alone without the block 75 is of a width sufficient to break the latch of but one differential and the keys of the amount bank are of this character for the reason that only one differential coöperates with each of the amount banks.

Each of the keys 9 and 10 of the "divided bank" which are designated "Cashier 1" and "Cashier 2" have a different construction than the keys 49 of this bank. Coöperating with each of the keys 9 and 10, referring to Figs. 10, 11, 12, and 15, is a hooked member 76 which fits over the pin 48 with which each of said keys is provided. The hook 76 is carried by the upper end of a slat or bar 77 of the same thickness as the key shank, the slat 77 resting directly against and in the same plane as the key shank as is shown in Fig. 11. Secured to the lower end of the slat 77 is a member 78 lying against the face of the key shank and approximately the same width as the key shank. The extreme lower end of the member 78 is provided with an outstanding lug 79, the thickness of the lug 79 and member 78 being equal to the thickness of the blocks 75 attached to the key shanks of the keys 49 previously described. The upper edge of the member 78 is provided with a notch 80 Fig. 15 to receive the lower edge of a small square plate 81 one corner of which is provided with a substantially cubical shaped projection 82 which fits within a notch 83 Fig. 15 cut in the edge of the key shank opposite to that against which the slat 77 rests. As is shown in Figs. 10 and 12 when the keys 9 and 10 are assembled in the key frame together with their coöperating elements above described, the member 78 and an ear 84 carried by the hooked member 76, rest upon the webbing of the key frame and support the key shank. The square plate 81 rests upon an extension 85 formed on the webbing of the key frame (Fig. 12) and fits within a notch 86 cut in the lower edge of the detent 50. When any one of the keys 49 is depressed the detent 50, as previously described, is rocked downwardly and this movement of the detent will, through engagement of the notch 86 therein with the square plate 81, slide the plate a sufficient distance to remove the projection 82 of the plate out of the notch 83 in the key shank. The square plate 82 when actuated by the detent slides within a groove 87, see Fig. 12, made between the extension 85 and part of the key frame. After a key 49 has been depressed and the plate 81 moved as above described, should either the key 9 or 10 be depressed the shank only of the key would be depressed and the lug 79 left in its normal raised position due to the fact that an upstanding arm 88 integral with the detent 50 would, when the detent moved, be positioned beneath the lower edge of the ear 84 as is shown in Fig. 12. With the parts in the positions described in the above operation, the key shank 74 of either of the keys 9 and 10 would break the latch of the associated differential and consequently position the cooperating indicator and type wheel to indicate and print "Cashier 1" or "Cashier 2" whichever it might be. No counter selecting mechanism, which will be hereinafter described, is connected with this differential so that although the "Cashier" would be indicated and printed the amount set on the amount bank would not accumulate on the "Cashier's counter" since this differential cannot select it. In this operation the other differential would be free to pass the cashier key and break its latch on the shank of whichever of the keys 49 that had been depressed. A counter selecting mechanism, hereafter to be described, is connected with this differential so that the movement of the differential will select the counter commensurate with the key 49 depressed. Should none of the keys 49 be depressed however, and one of the keys 9 or 10 be depressed to release the machine, the detent 50 would not be moved, and the plate 81 would be left in the position in which the projection 82 thereof fitted within the notch 83 in the key shank. As a consequence the depression of the key shank 74 would carry the plate 81 downwardly and since this plate lies above the member 78, this member would also be moved downward to position the lug 79 thereof in a position to obstruct one differential latch while the shank 74 of the key would obstruct the other as was previously described. When the parts are in this position and the machine operated, the latches of both differentials break at the same point, viz., on the depressed cashier's key. In this case, the indicator and type wheels are set commensurate with the key depressed and the cashier's counter also selected to accumulate thereon the amount set on the amount banks.

From the foregoing description it will be understood that when any key 49 of the divided bank is depressed, a depression of one of the cashier's keys will not select a counter, for the reason that the detent 50 has been moved by key 49 and has picked up the lug 79 and prevented it from intercepting the counter differential. When, however, no key 49 is depressed, and a cashier's key depressed, the commensurate cashier's counter will be selected as lug 79 will be depressed with key 9 and will intercept a counter differential.

Referring now to Fig. 1, it will be seen that all of the special transaction keys are located in the divided bank except the "Rec. on acct." key which is located in the bank to left of the divided bank. Due to this arrangement when any of the special transaction keys, (except the Rec. on acct. key) is depressed the special transaction counter will accumulate the amount and the cashier's counter will not. When the "Rec. on acct." key is depressed and the "cashier's" key also depressed to release the machine, the amount on the amount banks will in this case be accumulated, both on the "Rec. on acct." counter and also on the "cashier's counter."

This construction and operation of the machine, contemplates giving only "Rec. on acct." sales to the credit of the "Cashiers" and since one or the other of the "Cashiers keys" is to be depressed in conjunction with the "Rec. on acct." key, the total on the "Rec. on acct." counter will always equal the sum of the totals on the "Cashiers" counters.

The total lever 7 is in the form of a nearly circular plate (Figs. 16 and 70A) loosely mounted on a sleeve 170 loose on a stud 89 projecting from the right hand frame of the machine. The other end of the stud 89 is supported by a plate 2000 (Figs. 70A and 70B) mounted on cross rods 2001 carried by the side frames. The finger piece or handle of the lever is movable in a slot 90 (Fig. 1) to adjust it to the desired position. If the lever is moved one step above its central or adding position it will control the machine for printing a sub-total and when moved one step below its adding position it will control the machine for printing a total. Locks 91 are provided to prevent unauthorized persons from operating the total lever. When the locks are operated by keys inserted into the key barrels to lock the total lever in adding position the bolt of one of the locks is above and the bolt of the other lock below the handle of the lever.

When for instance the total lever is moved to a position to print and indicate the totals or sub-totals of the clerk's counters, means is provided during such total or sub-total printing operation to prevent an operation of the amount, department or special transaction keys during such printing operation. This means comprises, referring to Figs. 2 and 16, 70B a shaft 92 carrying arms 93 which support a rod 94 extending across the ends of the arms 17 which support the lower ends of the detents 14, 30 and 50 for the amount, department and special transaction keys respectively. When the total lever is adjusted out of adding position the shaft 92 is rocked counter-clockwise, as viewed in Fig. 2, through an arm 95 (Figs. 16, 70A and 70B) fast on the shaft 92 carrying a pin 96 projecting into a slot 97 (Fig. 19) formed in a lever 98 which is operated by a slot 99 in the total lever engaging a pin 1198 on the lever 98 as is fully shown and described in the aforesaid Fuller patent. When the shaft 92 is rocked by the adjustment of the total lever to a total or sub-total position the rod 94 is lowered in front of the curved edges of the arms 17, the arm 32 and an arm pivoted to the detent 50 and similar to the arm 59 being held against operation by an interlocking mechanism 1282, Fig. 26, and hereafter to be described, these elements preventing operation of the detents and hence operation of the keys in the amount, department and special transaction banks. The movement of the rod 94 through the operation of the machine during the total taking operation, as is fully shown and described in the Fuller patent before mentioned, at the proper time also moves the zero stop pawls 22 and 35 out of operative position.

*The differential mechanism.*

To drive the differential mechanism of the machine the drive shaft 100 is provided with a plurality of pairs of cams 101 and 102 (Figs. 2 and 4) each pair coöperating with rollers 103 and 104 respectively carried by Y-shaped levers 105 of which there is one for each bank of keys in the machine. Each of these levers 105 is pivoted at 106 on a corresponding frame 107 as is fully shown and described in the aforesaid Fuller patent. Loosely mounted on studs 108 carried by the frames 107 which support the differential units adjacent the banks of amount keys (Fig. 2) clerk's and department keys (Fig. 4) are differentially movable members 109 carrying racks 110 and transfer arms 111 for operating the totalizer pinions 112 (Fig. 2). The levers 105 at the upper ends of their upwardly extending arms are pivotally connected by links 113 to driving segments 114 loose on the studs 108. The driving segments 114 adjacent the banks of amount keys, are connected to the differentially movable members 109 by latches 115 each of which is supported by an arm 116 and a lever 117 pivoted on the corresponding differentially movable member. Springs 118 hold the rear end of the latches 115 in engagement with shoulders on the driving segments. When the segments 114 for the banks of amount keys are driven by their cams 101 and 102, the differentially movable members 109 are carried with their latches up to points where the forwardly extending arms of the levers 117 engage the depressed amount keys. Such engagement results in disengagement of the latches from the driving segments and engagement of the forward ends of the latches with the particular notches 119 opposite the latches at the time and formed in plates 120. Upon return movement of the driving segments to normal position the latches connect the differentially movable members thereto and return the latter to normal position. If a key is not depressed in an amount bank the zero stop pawl 22 for that particular bank operates the latch to arrest the differentially movable member in zero position. When a key is depressed, however, the arm 17 through its engagement with the pin 21 on the zero stop pawl 22 moves the latter out of operative position.

The differential mechanisms which coöperate with the banks of department and clerk's keys are exactly similar to those which are used with the amount banks and which have just been described, the plates 109 being omitted and arms 1109 being (Figs. 4 and 7) substituted therefor. Since all of this structure is fully described in the aforesaid Fuller patent no detail description of the arms 1109 or their functions will be given herein other than to say that the studs 1110 carried thereby provide the means whereby the segments 114 swing the latches counterclockwise (Fig. 13) during the operation of the machine. However, the differential mechanism coöperating with the "divided bank" comprises one segment, two latches and two differentially movable members to coöperate with the two portions of the key shanks of the "cashier's" keys as previously described.

Figure 7:
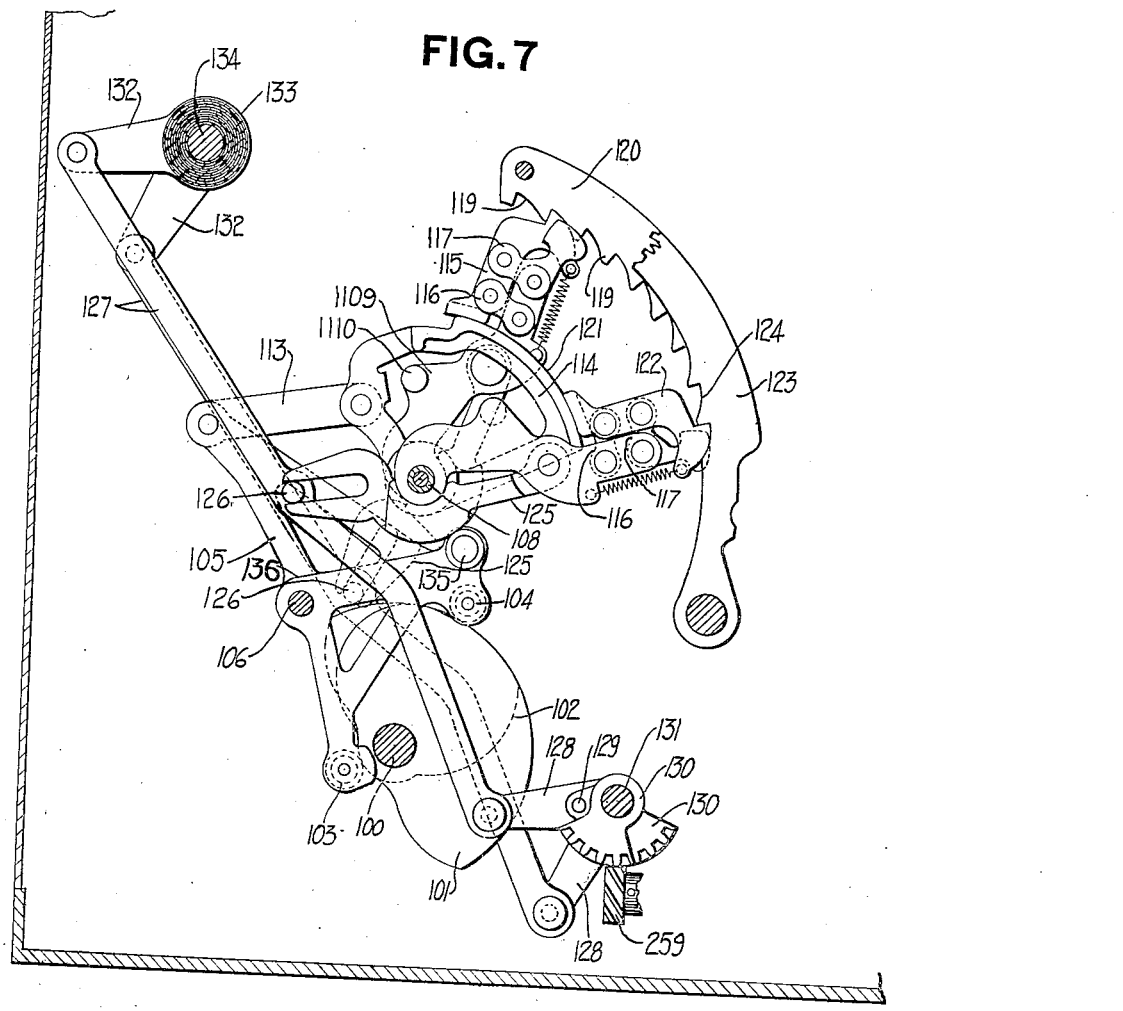
Fig. 7 is a detail view of the differential mechanism coöperating with the divided bank and also showing its connection with the indicators and printer.

This differential mechanism, referring to Fig. 7, comprises the drive shaft 100, cams 101 and 102, and lever 105 carrying the rollers 103 and 104 coöperating with the cams, which construction is similar to that described in connection with the differential mechanisms for the amount banks. Pivoted to the lever 105, is the link 113 which is also pivotally connected to the segment 114 the peripheral edge 121 of which, however, is twice as wide as the peripheral edges of the other segments 114. Coöperating with one half of the peripheral edge 121 is one latch 115 while coöperating with the other half of the said edge is a second latch 122 exactly similar to the latch 115. This latch 122, however, does not coöperate with the latch plate 120 but with a latch plate 123 spaced therefrom and having two teeth 124, this number being all that is necessary since there are only two keys, the two cashier keys, coöperating with this latch. To each of the latches 115 and 122 is pivoted the usual beam 125 the outer end of which is bifurcated to receive a pin 126 carried upon a link 127. A roller 135 carried by a Y-shaped lever 136 secured to the Y-shaped lever 105 coöperates with the beam 125 carried by the latch 122 while the usual roller positioned directly in alinement with the roller 135 and carried by the Y-shaped lever 105 coöperates with the beam 125 of the other latch 115. The lower end of each link 127 is pivoted to an arm 128 connected by a pin 129 with a segment 130 loose upon a shaft 131, the upper end of the said link 127 being pivoted to an arm 132 secured to a sleeve 133 surrounding a shaft 134. The shaft 134 supports the nested sleeves 133 which actuate the indicators as is fully described in a former Fuller Patent, No. 1,163,748, Dec. 14, 1915, while the shaft 131 supports the segments which actuate the printing mechanism as will be hereinafter described. It is sufficient here to call attention to the fact that coöperating with the divided bank are two differential mechanisms which control two indicator units and two printing units whereas only one differential mechanism coöperates with the amount, department and clerks banks of keys, these last mentioned constructions being similar to that described in the aforesaid Fuller Patent No. 1,242,170.

*Totalizers and totalizer selecting mechanism.*

Heretofore counter selecting mechanisms used with machines of the Chryst type were of one kind as is illustrated in the before mentioned Fuller Patent No. 1,242,170, which may be taken as an example. In these prior machines where a plurality of counter lines were provided each line containing a plurality of individual totalizers, the particular totalizer was selected by sliding the counter line but all the counter lines were rocked into engagement with the differential mechanism at every operation of the machine. As a consequence should it be desired to accumulate on but one totalizer, where a machine had two counter lines, the only way the desired result could be accomplished was by removing the totalizer wheels from the counter line which it was not desired to operate. This construction manifestly led to a very limited number of totalizer selection combinations.

In the present machine three counter lines are provided and the mechanism for shifting these counter lines to select various totalizers is also provided similar to that mentioned above. In addition, however, a counter line selecting mechanism is provided with means for preventing or permitting as desired one, two, or all three of the counter lines to be rocked into engagement with the differential mechanism simultaneously. Due to this construction totalizer controlling keys may be pressed either singly or in combination, but only one totalizer selected thereby to accumulate the amount, due to the counter selecting mechanism. As an additional result a plurality of totalizer selecting keys may be depressed and their particular department or transaction indicated and printed while the amount will be accumulated on but one of the totalizers if such result is desired. Then again two totalizer keys may be depressed and the amount accumulated on one, two, or three totalizers, this result being attained as before described by the counter selecting mechanism which automatically determines which or how many of the counter lines are to be rocked into engagement with the differential mechanism.

Figure 17:
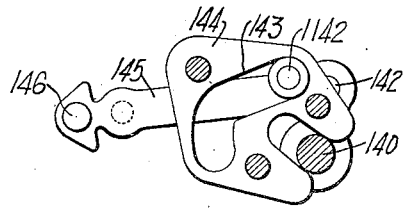
Fig. 17 is a detail view of the cam plate for rocking a counter line into and out of mesh with the differential segments.

A fragmentary part of one of the three counter lines each carrying a plurality of totalizers is shown in detail in Fig. 56 and their relation to the remainder of the machine is well shown in Fig. 2. Only a general description of the totalizers will be given herein since both a very full illustration and description of these devices is given in the Chryst patent heretofore mentioned. In the present case it is sufficient to state that each counter line consists of a plurality of department or individual totalizers 112 loosely mounted on a tube 137 fixed in frames 138 one arranged at each end of the tube. These frames are secured to said shaft provided with a roller 139 in position to engage the shaft 140 which has arms 141 provided with rollers 1142, Figs. 16, 17 and 70ᴮ extending into cam slots 143 in fixed plates 144. The arm 141 on shaft 140 is provided with a link 145 carrying a pin 146 which is operated to rock the counter wheels 112 into and out of mesh with the differential mechanism as will be hereinafter described. Rocking movement of the shaft 140 through a pair of cams 147, Fig. 2, controls the operation of the alining device 148 for the totalizers the same as the alining device illustrated and described in the before mentioned Chryst patent.

Each totalizer of the individual totalizers consists of one pinion in each group of pinions, therefore, if the first pinion of each group is engaged with the differential actuators 110 a certain individual totalizer will be operated; if the second pinion of each group is engaged with the actuators a different totalizer will be operated, etc. This arrangement of multiple totalizers is described in a U. S. Letters Patent No. 1,109,763, granted September 8, 1914, to Chas. F. Kettering.

To shift each multiple totalizer unit along shaft 140 so that any desired totalizer may be brought opposite the actuators, the frame 138 is provided with a boss 149 in which is secured a rod 150, Fig. 56, provided with a roller 151 loose on the rod which extends into a groove 152 in a cam 153 (Fig. 55). There are three cams 153 illustrated in the figure each one of which coöperates with the respective roller 151 of its associated totalizer 112. Each of the cams 153 is journaled on a rod 154 and has a rearwardly extending arm 155 to which is pivoted a link 156 connecting it with the tube line 133 which is actuated by the beam 125 set by the differential mechanism associated with either the department, special transaction, or clerk's bank of keys as has been previously described. By this means through the link 156 and cam 153 the totalizer 112 associated with each of the key banks just mentioned is slid to position the individual totalizer commensurate with the key depressed in position to be actuated by the differential mechanism when it is rocked into engagement therewith.

The counter line selecting mechanism which is the means for automatically causing one or more of the counter lines each containing a plurality of totalizers to be rocked into mesh with the differential actuators will now be described. After a particular counter line or lines have been shifted to position a totalizer or totalizers to be operated by the differential actuators, at the proper time during the cycle of the machine, the selected totalizer wheels are rocked into mesh with the differential actuators. This counter rocking mechanism broadly considered is substantially like that shown and described in the above noted Fuller Patent, No. 1,242,170 in that practically all the mechanism therein shown is used in the present machine an auxiliary control mechanism being added.

This control mechanism referring to Figs. 16 and 19, 70<sup>A</sup> and 70<sup>B</sup> comprises a rotatable spider 157 lose upon the sleeve 170. Associated with each of three knobs 158 formed on the spider 157 is a pivoted lever 159 and a lever 160 which is connected by a slot 161 with a pin 162 carried by the link 145. The levers are pivoted on studs 1159 on a plate 174 mounted on rods 2001. One of the levers 159 is oscillated back and forth by a link 163. The link 163 has a stud 194 engaged by hook 195 of a lever 164 which carries a roller 165 running in the slot of a cam 166. The configuration of the slot in the cam 166 is of such a character that one revolution thereof will, through the link 163 rock the levers 159 and spider 157 back and forth. If no obstruction is placed in the path of a pin 167 carried by each lever 160 this lever will idly rock and not actuate the link 145, to position the pin 146 carried thereby so that said pin will, by means hereafter to be described, be moved sufficient to rock the shaft 140 and mesh the totalizer wheels mounted thereon with the differential actuators. However, if an obstruction is placed in the path of the pin 167 the toggle connection between it and the lever 159 will be broken so that rocking of the said lever 159 will, using the obstructed pin 167 as a fulcrum rock the lever 160 a distance to set the pin 146 carried by the link 145 in position to be moved, by means hereafter to be described, for rocking the totalizer into mesh with the differential actuators.

The means for placing an obstruction in the path of any one or various of the pins 167 simultaneously comprises two plates 168 and 169 loosely mounted upon a sleeve 170 surrounding the stud 89 (Fig. 19, 70<sup>A</sup>) the diameter of the plates 168 and 169 being such that their peripheries are positioned adjacent the pins 167. These plates 168 and 169 are positioned at various points about the sleeve 170 by means of links 171 pivoted to the plates at their lower ends at the point 1171 (Fig. 19) and at their upper ends to arms 172 which are secured to the sleeves 133 loosely mounted upon the shaft 134 to which the beams 125 are connected which are actuated by the differential mechanism associated with the department and special transaction key banks as has been previously described. Due to this construction through the sleeves 133 and links 171 the plates 168 and 169 are set commensurate with the keys depressed in either or both the department and special transaction key banks.

The setting of the plates 168 and 169 can best be understood from the diagrammatic illustrations shown in Figs. 64 and 65 and the disunited view, Figs. 70<sup>A</sup> and 70<sup>B</sup>.

The periphery of the plates 168 and 169 are adjacent the pins 167 and coöperate therewith to engage the totalizers with the differential actuators as has been previously described. When the periphery of one of the said plates is projecting it will form an obstruction for the pin 167 so that the toggle between it and the lever 159 will be broken so as to position the pin 146 where it can be engaged to rock the associated totalizer into mesh with the differential actuators. If the periphery of the plate is cut away, however, this obstruction for the pins 167 will be removed so that the said pin may idly rock, as has been previously described, and the toggle connected between it and the lever 159 will not be broken and as a consequence the pin 146 will not be positioned where it can be actuated to rock the totalizer into engagement with the differential actuators.

Since the selection and engagement of the totalizers for adding items on one, two, or three totalizers at the same time depends upon the system which it is desired the machine should carry out, as a consequence, the controlling plates 168 and 169 have their peripheries shaped so as to carry out the special functions desired of the machine. The position of the three pins 167 remains substantially constant whereas the plates 168 and 169 are rocked about their pivots by means of the links 171 as has been previously described. The links 171 and consequently the plates connected thereto are moved and set commensurate with the keys depressed in the banks of keys which are associated with the two plates. Turning now particularly to Fig. 64, there is shown diagrammatically illustrated the connection between the banks of keys and the two control plates. The link 171 which is connected to the plate 168 is set by the differential mechanism that is controlled or adjusted by the keys in the department bank. This control is diagrammatically shown in this figure by means of the arrow which connects the plate 168 and the department bank of keys. The link 171 which positions the plate 169 is actuated by the differential mechanism that is controlled or positioned by the bank of transaction keys, an arrow being shown connecting this plate and the bank of transaction keys. There is no plate associated with the bank of clerk's keys. Above the bank of department keys it will be noticed are the words "Front counter". These words mean that the totalizer which is located near the front of the machine will accumulate the amount set up by the amount keys on the particular counter of this totalizer commensurate with whatever key in the bank is depressed, the counter being selected by the sliding of the totalizer as is fully shown and described in the Fuller Patent 1,242,170 heretofore mentioned. The words "Back counter" located above the transaction bank of keys and the words "Upper counter" located above the clerk's bank of keys designate that the totalizers which are located near the back of the machine and upper part of the machine respectively will accumulate the amount set up by the amount keys when the keys in these two banks are depressed. It is to be remembered that although the totalizers are slid and selected commensurate with the keys depressed in either of these banks viz. the department bank, transaction bank and clerk's bank, nevertheless the plates 168 and 169 determine whether the selected counter will be rocked into engagement with the differential actuators.

Should the key of the department bank, marked "Boys" be depressed and the machine operated, the plate 168, as has been previously described, would be set by the link 171 commensurate with this key. The periphery of the plate 168 has been marked with three series of numerals ranging from 0 to 9 adjacent the pins 167. These numerals are to designate and show more clearly that when the "boys" key is depressed, which is taken as an example and which is the sixth key in the bank reading from the bottom, the pin 167 which is marked "Front" will be set opposite the numeral 6 of the series which is adjacent the pin. It will be assumed that the key in the special transmission bank marked "C. O. D." is depressed, which is the fifth key in the bank reading from the bottom and as a consequence the plate 169 which is associated therewith will be moved until the pin 167 which is marked "Back" is opposite the point on the periphery marked by the numeral 5 of the series associated with this pin 167. Since no plate is associated with the bank of clerk's keys, although one of the keys in this bank should be depressed to indicate the clerk making the sale, its depression would not determine whether or not the amount of the sale which was made in the "boys" department and which was a C. O. D. transaction would be added upon the clerk's counter. Whether or not the amount is added upon the clerk's counter is determined by the operation of keys in the other two banks viz. the department bank and the transaction bank. The pin 167 which is marked "Upper" is the one which, controlled by the plates 168 and 169, will mesh or not mesh the upper counter, which is the one upon which the clerk's sales are accumulated, with the differential actuators.

Now assuming that the "boys" key, "C. O. D." key, and clerk's key A have been depressed the plates 168 and 169 will be positioned as shown at the right of Fig. 64. In this figure they are shown so positioned that the pin 167 marked "Upper" is opposite the point on the periphery of plate 168 marked 6. The pin 167 marked "Front" is opposite the periphery of plate 169 marked 5 and opposite the point on the periphery of plate 168 marked 6. The pin 167 marked "Back" is opposite the point on the periphery of the plate 169 marked 5 and opposite the point on the periphery of the plate 168 marked 6. Attention is directed to the fact that the three pins are opposite the same points on the periphery of the two plates marked 168 and 169 associated with the pins. This is due to the fact that the positioning of the plate 169 by the depression of the "boys" key will position its periphery so that the point marked 6 thereon will be opposite each of the pins. The same is true with respect to the plate 169, this plate, however, being positioned by the depression of the C. O. D. key which is the fifth key in the bank will set the plate so that each of the pins is opposite the point 5 of the periphery adjacent the pin. With the plates in this position it will be seen that the pins 167 marked "Upper" and "Front" are opposite the cut away portion of the periphery of the plates adjacent the pins whereas the pin 167 marked "Back" is opposite the portion of the adjacent periphery of the plate which is not cut away. It has been previously mentioned that the two plates form the means of placing an obstruction in the path of the pins 167 so that the totalizers associated therewith will be rocked into mesh with differential mechanism. This means of placing an obstruction consists in so setting the plates that a projecting portion of their periphery is opposite the pin, whose associated counter it is desired should mesh with the differential actuators. Where the periphery of the plates are cut away the pins 167 which are opposite these cut away portions of the periphery will not rock their associated counter into mesh with the differential actuators, but will be idly rocked. The pins 167 are of a length to extend across the periphery of the two plates 168 and 169 which are arranged side by side. It is of course manifest that only one plate may be positioned to form an obstruction for the pin and as a consequence although the periphery of one plate adjacent the pin might be cut away and the periphery of the other plate adjacent the pin be projecting an obstruction would be placed against the pin so that the counter associated therewith would be meshed with the differential actuators. An instance of this kind is illustrated in Fig. 65 which will be taken up specifically later, attention in this instance being directed to the pin 167 marked "Upper" in this figure. Here the plate 169 is shown having a projecting periphery opposite the pin 167 while the periphery of the plate 168 opposite this pin is entirely cut away. In this instance the counter, which is the upper counter, will be rocked into mesh with the differential actuators although only one plate places an obstruction in the path of the pin 167.

Referring again specifically to Fig. 64 it will be seen that although a key in each of the three banks which control the counter has been pressed, viz., department, transaction, and clerk's key banks, the word control in this instance being meant to designate the selection of the counter, nevertheless only one counter will be rocked into mesh with the differential actuators. Due to this construction, although the department in which the sale was made and the clerk who made the sale will be printed on the strip, check, and detail slip and the department in which the sale was made and the clerk who made the sale indicated, nevertheless, the amount of the sale will only be accumulated on the counter designating C. O. D. transactions. It is, of course, to be understood that the words showing a C. O. D. transaction will be printed on the check, slip, detail strip, and also indicated. This figure illustrates an instance where three counters are selected, one by the department bank of keys, one by the transaction bank, and one by the clerk's bank yet due to the construction of the plates 168 and 169 only one of the selected counters is rocked into mesh with the differential actuators so that the amount set up on the amount bank is accumulated on only one counter.

The long arrow line at the left hand portion of Fig. 64 together with the short arrows connecting the long arrow line with the keys, indicates also diagrammatically the manner in which the counters controlled by the keys are rocked into mesh with the differential actuators. For instance the key joined by a short arrow to a long arrow indicates that the key will throw in the counter to which the long arrow points. Referring to the department bank it will be seen that the long arrow line is connected with the "boys" key by a short arrow, the arrow head on the long arrow line pointing to the transaction bank of keys. This indicates that a depression of the "boys" key will so set the plate 168 associated therewith that the back counter will be rocked into mesh. Turning now to the transaction bank of keys it will be seen that these are connected by short arrows with a long arrow, the arrow head of which points to the special transaction bank of keys. This long arrow indicates that a depression of the C. O. D. key in this bank, taking this key as an example, will so position the plate 169 that the back counter will be rocked into engagement with the differential actuators. No long arrow line is connected with any of the keys of the "upper" counter for the reason that these keys do not control any plate and no plate is provided for this bank of keys as has been previously mentioned. This diagram makes it very clear that should the "boys" key and the C. O. D. key be depressed they would both position the plate 168 and 169 associated therewith so that the back counter would be rocked into engagement with the differential actuators. No long arrows in this instance point to either the "front" counter or "upper" counter so that as a consequence these counters would not be rocked into mesh.

By turning now to the plates illustrated in Fig. 64, it will be seen that the construction of these plates is such that the functions illustrated by the long arrows in this figure will be carried out.

Turning now to Fig. 65, it will be seen that the plates have been moved to different positions from that illustrated in Fig. 64. This figure illustrates the position the plates will occupy after the "boy's" key in the department bank, the "cash" key in the transaction bank and "clerk's A" key in the clerk's bank has been depressed. When the plates are in this position it will be seen that the pin 167 marked "Upper" is opposite the point on the periphery of the plate 168 marked 6 and opposite the point on the periphery of the plate 169 marked 4. Likewise the two pins 167 marked "Front" and "Back" respectively are opposite the points on the periphery of the plate 168 marked 6 and opposite the point on the periphery of plate 169 marked 4. The points 4 and 6 on the plates 168 and 169 are commensurate with the two keys which have been depressed, viz. "Cash" being the fourth key in the transaction bank and the key marked "Boy's" being the sixth key in the department bank. It will also be noticed in examining this figure that the pin 167 marked "Upper" is opposite a cut out portion of the periphery of the plate 168 while it is opposite a projecting portion of the periphery of the plate 169. The pin 167 marked "Front" is also opposite a cut away portion of the periphery of the plate 168 and opposite a projecting portion of the periphery of the plate 169. The pin 167 marked "Back" is opposite projecting portions of the periphery of both plates. As a consequence when the plates are in these positions with respect to the three pins 167, all of the counters will be rocked into engagement with the differential actuators since the plates provide an obstruction for each of the pins 167. In the case of the pins which are marked "Upper" and "Front" only one plate provides an obstruction whereas in the case of the pin 167 marked "Back" both plates provide an obstruction. As has been previously described, however, an obstruction which has been placed in the way of a pin 167 whether it be formed by one plate or two plates is sufficient to cause the counter associated with the pin to be rocked into mesh with the differential actuators. When the two plates are in the positions illustrated in Fig. 65, all three totalizers will be rocked into mesh, these totalizers having previously been slid to select the totalizer desired to accumulate the item of the sale made in the "boy's" department, a "cash" transaction and made by clerk A. In other words, the amount which was set up on the amount bank will be accumulated on the "boy's" counter, the "cash" counter, and clerk A's counter. This condition or result is also shown diagrammatically by the illustration at the left of Fig. 64. The depression of the "boy's" key will as previously described so place its associated plate that the "back" counter will be rocked into mesh with the differential actuators. The depression of the "cash" key will position its associated plate so that both the "front" counter and "upper" counter will be rocked into mesh. This last condition is illustrated by the arrow which connects the short arrow on the cash key and terminates in two arrow points one pointing to the "front" counter and the other arrow point thereof pointing to the "upper" counter. In this instance where three keys are pressed all three totalizers will be rocked into mesh with the differential actuators so that the counter selected by the sliding of the totalizers under the control of the three keys will accumulate the amount set up by the keys in the amount bank. It is thought that the above has made clear the function and operation of the plates 168 and 169 which are merely for the purpose of providing an obstruction for the pins 167 determinable by whatever keys are depressed in either the department, transaction, or clerk's bank.

Referring now particularly to Figs. 16, 19, 70^A and 70^B at the proper time during the operation of the machine, the cam 166 is given a partial rotation which will cause a downward movement of the lever 164. This movement, as has been previously described, through the hook 195, stud 194, link 163 and the lower lever 159, will actuate the spider 157 counter clockwise, and thereby move all of the levers 159 a distance sufficient to rock the levers 160 counter-clockwise so that the pin 167 carried by each lever will be moved away from the periphery of the plates 168 and 169. This movement of the pins 167 is to permit free clearance between them and the periphery of the said plates, and at the same time to disengage the pins 146 from hooks 175, hereafter to be described, which are for the purpose of engaging the totalizers with the differential actuators when the pins 146 fit therein. As a consequence the first actuation of the cam 166 disconnects the mechanism for engaging the totalizers so that a new selection may be made. After the pins 167 have been so moved, the plates 168 and 169 are set by the links 171 through the depression of keys in the transaction and department banks as has been previously explained. After the plates have been set, the cam 166 is then rotated a farther distance which raises the link 163 whereby the lever 159 to which it is connected causes the spider 157 to have a clockwise movement, which will cause all of the levers 159 to be actuated so that the levers 160 which are pivoted thereto will move their pins 167 against the periphery of the plates 168 and 169. Where a pin 167 in its inward movement, that is, toward the stud 89, engages a projecting part of the periphery of either of the plates 168 and 169, the toggle connection between the lever 160 and its associated lever 159 will be broken. The further movement of the lever 159 under the influence of the spider 157 driven through the cam 166 will, using the pin 167 as a fulcrum point, swing the lever 160 outwardly. The outward movement of the lever 160 will cause an outward movement of the link 145 which is operatively connected therewith by the pin 162. This movement of the link 145 will cause an outward movement of the pin 146 carried by the said link. It is to be understood that only those pins 146 which are associated with levers 160 whose pin 167 abuts a projecting portion of the periphery of either of the plates 168 and 169 will be moved outwardly as has just been described. Those pins 146 whose associated lever 160 has a pin 167 opposite a cut away portion in either of the plates 168 or 169 will not be moved outward but the toggle connection between the lever 160 and 159 will not be broken and these levers rock together idly, the pin 167 playing in the cut away portion on the periphery of the two plates 168 and 169.

At this time springs 1168 fast at one end to the spider 157 and at their opposite ends to a stud carried by the levers 160 insure the retention of the pins 146 in the portion to which they are set within the slots 173.

By an examination of Fig. 19 it will be found that all of the pins 167 lie opposite a projecting portion of the periphery of the two plates 168 and 169, this figure illustrating the parts after the two plates have been positioned through their links 171 set by the differential actuators under the control of the keys of the transaction and department banks.

Referring now particularly to Figs. 16, 70$^A$ and 70$^B$, it will be seen that the pins 146 are movable toward and away from the shaft 89 in slots 173 made in a plate 174. The breaking of the toggle between the levers 160 and 159 as above described caused an outward movement of all of the pins 146 so that they occupy their extreme outward position in the slot 173, as is illustrated in Fig. 16. When the pins 146 have been moved into these positions they will rest within hooks 175 carried by a disk or spider 176 pivotally mounted upon the stud 89 and secured to the sleeve 170. It will be seen that the spider 176 has three hooks 175 each hook coöperating with one of the pins 146. At the proper time during the operation of the machine the spider 176 is given a clockwise rotation by the following means. A pin 177 carried by the said spider 176 fits within a slot 178 made in a lever 179 which is supported by a slot 180 receiving a pin 181 carried by a segment shaped lever 182, and by an arm 183 which is pivoted at 184 to a V-shaped lever 185. This V-shaped lever is pivoted at 186 to the right side frame (Fig. 70$^B$), each of its arms carrying on their outer ends an antifriction roller 187. Each of the rollers 187 coöperates with one plate of a double plate cam 188 which is fast upon the shaft 100.

At the proper time during the operation of the machine the double plate cam 188 is given a rotation which, through the rollers 187, will cause a clockwise movement of the lever 185 which through the arm 183, lever 179, and pin 177 carried by the spider 176 will cause a clockwise movement of the said spider. This movement of the spider 176 will, through the engagement between the hooks 175 carried thereby and the pins 146, move the said pins from the positions which they occupy as shown in Fig. 16, along slots 189 made in the plate 174 until they reach the opposite end of the said slot. Attention is directed to the fact that the slot 189 is a part of the slot 173. The movements of a pin 146 throughout the length of the slot 189 will cause a movement of the link 145 which carries the pins 146. This movement of the link 145 will rock the levers 141 to which they are pivotally connected at 142. The levers 141 are fast upon the shafts 140 and consequently the rocking movement of the said levers will be transmitted to said shafts. The rocking movement of a shaft 140 will, as has been previously described mesh its associated totalizer with the differential actuators.

Attention is called to the fact that only those shafts 140 will be rotated whose associated links 145 have their pins 146 in position to be moved by the hooks 175 of the spider 176. As has already been previously described, the plates 168 and 169 are the elements which determine whether or not a pin 146 will be moved into position to be actuated by the spider 176. As a consequence the plates 168 and 169, through the mechanism just explained will determine whether or not one, two or three totalizers are to be meshed with the differential actuators.

The foregoing has been a description of the construction and function of the two plates 168 and 169 and their associated elements when the machine is operating during adding or listing operations, in which case the selection of the counters for engagement with the differential actuators is determined automatically by the depression of different keys in the transaction and department banks.

A different mechanism for controlling and selecting the totalizers is called into play during total taking and reset operations. This mechanism will now be described. In a total taking or re-set operation the selection of the totalizers for engagement with the differential actuators is not determined by the plates 168 and 169, but these plates are entirely disconnected so far as their control is concerned and the selection of the different totalizers for engagement with the differential actuators is made by the total lever itself, when the said lever is set in correct position for taking totals and sub-totals.

When the total lever 7 is moved in position for a total or sub-total operation a condition is set up by the movement of the said lever wherein the function of the two plates 168 and 169 is crippled. This condition is set up by the following mechanism. The total lever 7 is part of a plate which is fast upon a sleeve 189 loose upon the sleeve 170. The plate portion of the lever 7 adjacent its periphery is provided with a slot 190, of irregular shape, within which fits a pin 191 carried by one of the levers 159. In Figs. 19 and 70$^A$ the total lever 7 and its integral plate is shown in the position it will occupy during adding operations. It will be remembered that during adding operations the levers 159 are moved through the action of the cam 166; as a consequence the slot 190 is provided with an enlarged portion 192 within which the pin 191 will move idly when the lever 159 is actuated during such an operation. When, however, the lever 7 is moved in position for total or sub-total operations, the slot 190 adjacent the pin 191 will move the pin and its lever 159 a distance sufficient to move all of the levers 160 far enough to position the pins 167 carried by these levers away from the periphery of the plates 168 and 169. All of the levers 160 and the pins 167 are moved by the movement of the one plate 159 and pin 191 because the movement of this one lever 159 is communicated to the other two levers 159 through the spider 157. Any subsequent movement of either of the plates 168 or 169 will have no effect upon the levers 160 or links 145 for engaging the totalizers with the differential actuators, as would be the case during adding or listing operations. It has been previously described that a movement of the total lever into position for taking totals or sub-totals causes a movement of the lever 98 through the pin 1198 fitting within the slot 99 made in the total lever. This rocking movement of the lever 98 is communicated by a link 193 to the link 163, the link 193 being connected at one end to the lever 98 and at its other end to the link 163. The movement of the link 193 by the lever 98 will cause a counter clockwise movement of the link 163 a distance sufficient to disengage the pin 194 carried thereby from the hook 195 formed on the end of the lever 164. It will be remembered that the lever 164 is actuated by the cam 166 during adding operations so that the link 163 which is connected therewith by the hook 195 and pin 194 will rock all of the levers 159 to actuate their pins 167 to select the totalizers which are to be meshed with the differential actuators. By disengaging the hook 195 of the lever 164 from the pin 194 carried by the lever 163 all driving connections between the cam 166 and the levers 159 is disconnected. As a consequence the movement of the lever 7 to total and sub-total positions will cripple the driving connections between the cam 166 and the levers 159 so that the said levers will receive no actuation from the cam as would be the case during adding operations.

Since the operation or conditions set up by the total lever 7, as just described, has crippled the automatic means for selecting which totalizers are to be meshed with the differential actuators, means is provided for setting up a condition by the total lever itself for determining which totalizers are to be meshed with the differential actuators. This means comprises, referring particularly to Figs. 19, 70$^A$ and 70$^B$ three irregularly shaped slots 196 made in the plate portion of the total lever 7, each of these slots receiving one of the pins 167. The slots 196 are so shaped that when the total lever 7 is moved to total or re-set positions, the pins 167 will be moved radially away from the stud 89. Since the levers 159 are held stationary, as has been previously described, the movement of the pins 167 will cause an outward movement of the levers 160, which movement will be communicated to the links 145 and cause them together with their pins 146 to also be moved outwardly. This outward movement of the pins 146 will position them so that they will fit within the hooks 175 of the spider 176 so that the subsequent operation of the said spider, as previously described, will rock the links 145 and mesh the totalizers associated therewith with the differential actuators. Attention is called to the fact that each of the slots 196 has a different shape. These slots are so shaped that the pins 167 will be moved alternately so that their associated pins 146 are moved outwardly into position to fit within the hooks 175. This is to insure that only one of the totalizers may be selected at a time and to prevent the simultaneous engagement of two or more of the totalizers with the differential actuators. It is manifest that both in total or re-set operations it is only desirable to take the totals of one counter at a time since only one impression and one indication can be made during a single or re-set operation. The above makes it apparent that through the medium of the slots 196 and pins 167 the movement of the total lever itself will select and determine which of the totalizers is to be meshed with the differential actuators. In addition to selecting the totalizer which is to be meshed with the differential actuators it is also necessary to set up a condition by the total lever so that the re-set pawls will be set to engage the long teeth of the counter wheels. This means comprises, referring particularly to Figs. 19 and 70$^A$, three slots 197 made in the plate portion of the total lever 7. Fitting within the slots 197 are pins 198 carried by levers 199 pivotally supported at 200 to the plate 2000 (Fig. 18). The free end of each of the levers 199 is bifurcated at 201 to surround a pin 202 carried by one end of a link 203 which in turn is pivoted to an arm 204 fast upon the shaft 205 which carries the means for actuating the re-set pawls (not shown.) All of the slots 197 are different and are arranged commensurate with the slots 196 so that when one of the totalizers is selected to be meshed with the differential actuators its associated re-set pawls will be selected through the medium of the slot 197 and lever 199 which is associated with this selected totalizer. When the total lever 7 is moved to select a totalizer the pins 198 moving in the slots 197 will rock the levers 199 a distance sufficient to move the pins 202 carried by the link 203 into a notch 206 made in a plate 207. It is to be understood that there is a notch 206 coöperating with each of the pins 202. The plate 207 is secured to the sleeve 170 which supports the spider 176. The pin 202 which is associated with the engaging levers or mechanisms of the selected totalizers is moved into the notch 206 of the plate 207 so that it is secured thereto. As a consequence when the spider 176 is rotated to engage the totalizers with the differential actuators, as has been previously described, the plate 207 will also be rotated so that the pin 202 which fits within a slot 206 made in the said plate will be actuated so that the link 203 carrying the said pin will be moved. The movement of the link 203 through the lever 204 will rock the shaft 205 a distance sufficient to set the re-set pawls of the totalizer which has been selected in position to engage the long teeth of the counter wheels.

As the total lever 7 is being moved from its adding position to any of its total or sub-total positions, the shaft 29 is prevented from being rocked by a lever 900 (Figs. 16, 19, 70ᴬ and 70ᴮ) pivoted on the stud 1159 on the plate 174. Said lever carries a pin 902 projecting in a slot 903 in the total lever plate. The slot 903 rocks the lever 900 clockwise and the upper end of said lever projects over an arm (not shown) on the release shaft 29 thereby preventing said shaft from being rocked while the total lever 7 is between any of its various predetermined positions. When said lever is in the exact position, either adding, totalizing or subtotalizing, the slot 903 holds the lever 900 away from the arm on the shaft 29 thereby allowing said shaft to be rocked to release the operating mechanism.

In totalizing operations, the lever 179 is moved to a different position than that shown in Figs. 16 and 70ᴮ. This is done by movement of the total lever 7 preliminarily to an operation of the cam shaft 100, so that the time of the engaging and disengaging of the totalizers may be changed in accordance with the desired operation. When the total lever 7 is moved counter clockwise (Fig. 70ᴬ) for a totalizing operation, a slot 905 therein, through its engagement with a pin 906 on a lever 907 (Fig. 70ᴮ), pivoted on a stud 908 on the plate 174, rocks said lever 907 clockwise. At the same time the lever 98 is rocked counter clockwise by the slot 99 as previously described. Pivoted at 909 to the arm 95 (Fig. 70ᴮ) is the lower end of a link 910 the upper end of which carries a stud 911 extending in a slot 912 in the lever 907 and in the straight portion of a slot 913 in the lever 182. The pin 96 on the arm 95 extends in the slot 97 in the lever 98 as previously described, and said lever has pivoted thereto at 914 an arm 915. A pawl 917 pivoted at 918 on the lever 98 engages a stud 919 on the arm 915 and normally holds an extension 920 of the arm 915 so that the under side of said extension and the lower portion of the slot 97 form a cam slot for the pin 96.

From the above description it will be clear that when the lever 98 is rocked counter clockwise by the total lever, the arm 95 and shaft 92 are rocked clockwise (Figs. 70ᴬ and 70ᴮ) through the cam slot formed by the projection 920 and the slot 97.

Clockwise movement of the shaft 92 by the total lever 7 rocks an arm 922 (Fig. 42) and moves a link 923 pivoted thereto, to the left. Said link carries a roller 924 normally resting in a notch 925 in a disk 926 loose on a stud 927 secured to the right side frame. The link 923 also has two pins 928 (Fig. 43) one on each side of a portion 929 of a plate 930 slidably mounted in a gear 931 meshing with a gear 932 fast on the drive shaft 100. The gear (not shown) secured to the handle 1 (Fig. 1) meshes with gear 931. In adding operations the gear 931 receives one-half a revolution which gives one revolution to the gear 932 and shaft 100. In total and sub-total operations, the gear 931 receives one revolution which gives two revolutions to the gear 932 and shaft 100. In adding operations the plate 930 and its portion 929 are as shown in Fig. 42, and the disk 926 does not rotate with the gear 932.

When the link 923 is moved to the left as above described the pins 928 move the plate 930 to the left and connect the disk 926 with the gear 931 and also position the roller 924 in a cam race 933 in the disk 926.

Clockwise movement of the lever 907, as above described, through the stud 911 rocks the lever 182 clockwise about the stud 908, and through the engagement of its pin 181 with the slot 180 rocks the lever 179 counter clockwise with the stud 184 as the pivot point and disengages said lever from the stud 177 on the spider 176.

The lever 182 has a slot 935 (Fig. 70ᴮ) engaging a pin 936 on a lever 937 mounted on a stud 938 carried by the plate 174. The lever 937 also carries a pin 940. Clockwise movement of the lever, by its engagement with the pin 936 rocks the lever 937 counter clockwise whereby the pin 940 engages a notch 941 in the spider 176 and positively locks the spider 176 in this position until one of the pins 146 has been engaged with one of the hooks 175 on said spider.

After the parts have been moved to the position just described by the movement of the total lever 7, the handle 1 is given four complete rotations thereby causing two rotations of the cam shaft 100 (Figs. 70ᴬ and 70ᴮ) in a clockwise direction. The four rotations of the handle 1 rotate the gear 931 and the disk 926 (Fig. 42) one complete rotation counter clockwise. During the first rotation of the shaft 100 the lever 185 is rocked clockwise (Fig. 70ᴮ) and moves the lever 179 to the right, in the direction of its length, and positions a notch 950 therein directly above a pin 951 on the spider 176. Immediately after this has taken place the cam 933 (Fig. 42) moves the link 923 to the left and rocks the shaft 92 still further in a clockwise direction. This movement of the shaft 92 rocks the arm 95 (Fig. 70ᴮ) and moves the link 910 downward whereby the stud 911 through its engagement with the cam portion of the slot 913 rocks the lever 182 still further clockwise and through the engagement of its pin 181 with the slot 180 rocks the lever 179 still further counter clockwise, with the stud 184 as the pivot point, and engages the notch 950 of said lever with the pin 951 on the spider 176. The clockwise movement of the lever 182 just described also, through the engagement of its slot 935 with the pin 936, rocks the lever 937 clockwise and disengages the pin 940 from the notch 941.

After the notch 950 is engaged with the pin 951 and during the last part of the first rotation of the shaft 100 the lever 185 is rocked counter clockwise and moves the lever 179 to the left thereby rotating the spider 176 clockwise. This movement of the spider 176 through the engagement of one of its hooks 175 with one of the pins 146 rocks the selected totalizer shaft, as determined by the position of the total lever 7, into engagement with the totalizer actuators previously described.

The totalizers are held in engagement with their actuators by the cams 188 until each of the said actuators have been differentially positioned under the control of said totalizer wheels after which the lever 185 is rocked clockwise and moves the lever 179 to the right. Immediately after the lever 179 has been moved to the right the cam race 933 (Fig. 42) rocks the shaft 92 and the arm 95 counter clockwise thereby raising the link 910 and rocking the lever 182 counter clockwise which rocks the lever 179 clockwise about the stud 184. This movement of the lever 179 disengages its notch 950 from the pin 951. After said disengagement the lever 185 is rocked counter clockwise and moves the lever 179 to the left to the position in which it was placed by the movement of the total lever 7. The last described movement of the lever 179 to the right rocks the spider 176 counter clockwise to normal position thereby disengaging the selected totalizers from the totalizer actuator.

After the lever 179 has been moved to the left as last described the total lever 7 is moved clockwise to its adding position, which rocks the lever 907 counter clockwise. This movement of the lever 907 raises the link 910 and rocks the arm 95 and the shaft 92 counter clockwise to normal position. The stud 911 also rocks the lever 182 counter clockwise to normal position whereby, through the engagement of its pin 181 with the slot 180 it rocks the lever 179 clockwise about the stud 184 so that the notch 178 again engages the pin 177 on the spider 176.

From the above described operation it can be clearly seen that the totalizer selected by the total lever is rocked into engagement with the totalizer actuators before said actuators are moved differentially and held into engagement therewith until the differential movement of the actuators, under the control of the long tooth on the totalizer pinion 112, is completed after which said totalizer is rocked out of engagement with the differential actuators thereby leaving said totalizer at zero.

The control of the engaging and disengaging of the totalizers with the actuators during subtotalizing operations will now be described. For a subtotalizing operation the total lever 7 is moved in a clockwise direction. Clockwise movement of said lever does not rock the lever 907 or the lever 182 as is the case in totalizing operations because the slot 905 is concentric with the center of the stud 89 in all positions of the total lever 7 above its adding position. However, clockwise movement of the lever 7 through the engagement of the slot 99 with the pin 1198 rocks the lever 98 counter clockwise in identically the same manner as the said lever is rocked during the totalizing operation above described. This movement of the lever 98 also rocks the shaft 92 clockwise as described above to connect the disk 926 with the gear 931.

In subtotalizing operations the gear 931 receives one complete rotation and the gear 932 and shaft 100 receive two complete clockwise rotations in identically the same manner as described in connection with the totalizing operation. As the lever 182 is not moved by the movement of the lever 7 the lever 179 remains in engagement with the pin 177 on the spider 176.

During the first clockwise movement of the lever 185 the lever 179 is moved to the right and rocks the spider 176 clockwise to engage the selected totalizer with the differential actuator. After the totalizer has been engaged the cam race 933 (Fig. 42) rocks the link 923 still farther to the left thereby rocking the shaft 92 and the arm 95 clockwise which lowers the link 910 whereupon the stud 911 engages the cam portion of the slot 913 and rocks the lever 182 clockwise about the stud 908. Clockwise movement of the lever 182 rocks the lever 179 counter clockwise about the stud 184 and disengages the notch 178 from the pin 177 on the spider 176. This movement of the lever 182 rocks the lever 937 counter clockwise and its pin 940 engages a notch 955 in the spider 176 and positively locks said spider in this position thereby holding the totalizer in engagement with the actuators. Immediately after the disengagement of the lever 179 from the pin 177 the lever 185 is rocked counter clockwise and moves the link 179 to the left. This movement of said lever is an idle movement as it is not engaged with either the pin 177 or the pin 951. The selected totalizer is now engaged with the differential actuator and said actuator is moved differentially under the control of the long tooth on the totalizer pinions 112 thereby resetting said pinions to zero. As previously described the amount which is on the totalizer is now printed from the type wheels. During the first part of the second rotation of the shaft 100 the differential actuators are again moved and due to the fact that the totalizer pinions are still in engagement therewith the amount that was taken from said pinions is again accumulated thereon. The lever 185 is again rocked clockwise and moves the lever 179 to the right and positions the notch 178 therein directly beneath the pin 177 on the spider 176. The race 933 at this time moves the link 923 to normal position to rock the shaft 92 counter clockwise and raises the link 910 which rocks the lever 182 counter clockwise and thereby rocks the lever 179 clockwise so that it again engages the pin 177. This counter clockwise movement of the lever 182 rocks the lever 937 clockwise and disengages its pin 940 from the notch 955 to allow the spider 176 to be rocked. The lever 185 is then rocked counter clockwise to normal position and moves the lever 179 to the left to normal, thereby rocking the spider 176 counter clockwise which disengages the totalizer from the actuators.

The total lever 7 is then moved counter clockwise to its normal adding position and through the slot 99 and pin 1198 rocks the lever 98 clockwise to normal position and raises the link 910 to the position shown in Fig. 70ᴮ. This movement of the total lever 7 also disconnects the disk 926 from the gear 931 so that said disk is not rotated while the total lever 7 is in the adding position.

From the above description it can be clearly seen that during a subtotalizing operation the totalizer is engaged with the actuator and reset to zero by the movement of the actuator and said totalizer is also maintained in engagement until the actuators are again moved, which operation puts back on the totalizer the amount which was taken therefrom so that at the end of a subtotalizing operation the amount on the totalizer is the same as it was before the subtotalizing operation was made.

Special counters.

A description of the special counters together with their selection and operation will now be set forth. Referring particularly to Figs. 20, 53, and 54 there are three banks of special counters each bank containing nine individual rotation counters. The counter banks are arranged at the extreme left hand side of the machine and directly over the counter selecting cams 153 as is clearly shown in Fig. 20. Each of the special counter banks consists of a framework 208 supported at its upper and lower ends upon the tie rods 12 which support the key banks of the machine as has been previously described. The special counters 209 are of the usual rotation type and are supported upon shafts 210 secured within the framework 208. The wheels of the counters 209 are moved step by step by the usual graduated tined carrying pawls 211 to which are pivoted at 212 links 213 which have their other ends pivoted at 214 to slotted links 215. Within the slots of the links 215 fit pins 216 which are carried by the counter framework 208. The pivotal point 214 between each of the links 213 and 215 comprises a pin, each of which fits within a slot 217 made in a detent 218 which is pivoted at its upper end at the point 219 to an arm 220 pivotally supported at 221 upon the framework 208, the detent being supported at its lower end by a pivotal connection 222 with a lever 223 which is itself pivotally supported at 224 upon the counter frame 208. The lever 223 carries a pin 225 which fits within the bifurcated end of one arm 226 of a casting 227 loosely mounted upon a tie rod passing through the machine. The casting 227 is also provided with an arm 228 which is bifurcated at 229 and has an upwardly extending tail 230. Fast upon the shaft 92 is an arm 231 which carries at its outer end a pin 232 which plays within a slot 233 made in a link 234 which is pivotally connected at its lower end at the point 235 to a short arm 236. The arm 236 is loose upon a shaft 237 and has secured thereto a downwardly extending arm 238 which carries at its lower end an anti-friction roller 239 which coöperates with a cam groove 240 made in a cam 241 fast upon a shaft 242. The shaft 242 is actuated by the main shaft 100 as will be hereinafter described.

Each of the counter selecting cams 153 carries a forwardly extending beam 243 the outer end of which is provided with a foot 244. When one of the counters has been selected by the sliding of the totalizers as has been previously described, which action is caused by the cams 153, the beam 243 which is secured to the actuated cam will be moved a distance commensurate with the setting of the cam. The movement of the beam 243 will position the foot 244 thereof beneath the slotted link 215 of the associated counter 209 which is allotted to the counter of the totalizer which has been selected. In other words there is a special counter 209 for each of the totalizers and when the counter 209 is selected by the sliding of the totalizer, the beam 243 is placed beneath the slotted link 215 of the special counter commensurate with the totalizer which has been selected. Should one of the counters of the totalizer be selected whose cam and beam 243 is shown in Fig. 20, the foot 244 of the said beam would be positioned beneath one of the slotted links 215. After the foot has been so positioned, at the proper time during the operation of the machine, the links 234 are moved upwardly under action of the levers 236, 238, and cam 241. The upward movement of the link 234 will, through its pin and slot connection with the lever 228 of the casting 227, rock the said casting clockwise. The clockwise movement of the casting 227 will, through the arm 226, rock the lever 223 counter-clockwise thereby moving the detent 218 downwardly. As the detent 218 is moved downwardly, it will carry with it all of the pins 214 so that the toggle between the links 215 and 212 will be straightened out. Those links 215 which meet no obstruction will slide outwardly on the pins 216 so that the links 213 associated therewith will be free to swing about their pivots 212 and the pawl 211 will not be actuated. That link 215 however, beneath which the foot 244 of the beam 243 has been positioned can not move outwardly on its pin 216, the outward movement of the said link being prevented by the interference set up by the foot 244. As a consequence when the pin 214 is moved downwardly by the action of the detent 218, the toggle will be straightened but in this instance the link 213 will move the carrying pawl 211 to which it is pivoted. The movement imparted to the pin 214 is sufficient to move the carrying pawl 211 one tooth space so that each time this particular counter is selected one will be added upon the special counter 209 associated therewith. It is to be understood that all of the detents 218 associated with the special counters will be given a movement during every operation of the machine, but none of the counters 209 will be actuated except those that have their links 215 opposite the feet 244 which have been positioned by the movement of the cams 153. It is also to be understood that the operation just described would take place only when the machine was set for adding or accumulating operations. When the total lever is positioned to re-set or total taking position it is not desired to count such totals or re-set operations upon any special counter and no special counter is provided to accumulate these operations. However, during total and re-set operations the cams 153 are positioned so that it is necessary in such operations to provide a mechanism for preventing the actuation of the detents 218. Since the detents 218 are not actuated although the beams 243 are actuated nevertheless, the special counter selected would not be operated, as will be readily understood.

When the total lever 7 is moved to total taking or re-set operations the shaft 92 is rocked as has been previously described. The rocking of the shaft 92 will, referring to Fig. 20, rock the lever 231 secured thereto downwardly so that the pin 232 carried thereby will move downwardly along the slot 233 made in the link 234. The downward movement of the pin 232 within the slot 233 will move the link 234 outwardly, that is away from the shaft 92, so that the pin 229 carried by the link 234 will be moved away from the bifurcated end of the lever 228 integral with the casting 227. The downward movement of the link 231, in the operation just described, will position a pin 245 carried thereby against the curved tail 230 of the lever 228 so that as the pin 229 leaves the bifurcated end of the lever 228 the pin 245 engaging the curved tail 230 will hold the lever 228 in correct position to receive the pin 229 when it is moved back into its original position. When the pin 229 has been disconnected from the bifurcated end of the lever 228, as has just been described, although the link 234 is actuated, as it is during every operation of the machine, no movement will be imparted to the detents 218 since the driving connection between them and the link 234 has been disconnected by the rocking of the shaft 92 under the control of the total lever 7 as it is set to total taking or re-set operations.

The special counters 209 are each provided with the usual re-set pawls which are actuated by a knurled knob 2209 (Fig. 53) for setting the counter wheels to zero.

The printing mechanism.

The entire printing mechanism is driven by the operations of the cash register. Referring particularly to Fig. 50, the shaft 100 which is the main drive shaft for the cash register, is provided, adjacent the left hand side of the machine, with a spiral gear 246 which meshes with a spiral pinion 247 fast upon a sleeve 248 which is rotatably mounted upon the shaft 242. The sleeve 248 is provided with a plate 249 upon which are pivotally mounted two pawls 250 and 251, shown more clearly in Fig. 51. The two pawls just mentioned are tied together by a spring 252 which causes their noses to fit against a boss 253 secured to the shaft 242. When the parts are in the position shown in Fig. 51 and the plate 249 given a counter clockwise rotation, the pawl 250 abutting against the boss 253 will cause a rotation of the shaft 242 in the direction indicated by the arrow. The above makes it clear that when the parts are in the positions shown in Fig. 51, the sleeve 248 is coupled to shaft 242 so that as the said sleeve is rotated through the gear 246 the shaft 242 will also be rotated. As has been previously described, all of the printer mechanism except the mechanism for setting the type wheels, is driven from the shaft 242 so that this shaft may be termed the printer drive line. During adding or listing operations of the register it is desired that the printer should operate every time that the register is actuated. During total or reset operations, however, the registering mechanism receives two rotations in order to complete such totals or re-set operations and in such a case it is desired that the printer should operate only once, this operation occurring during the second rotation of the register so that the total of the selected totalizer will be printed. In order to accomplish this result mechanism is provided, controlled by the total lever, so that when the said total lever is set for total or re-set operations the printer will not be driven during the first rotation of the register but will only be driven during the second rotation thereof. This mechanism, referring to Fig. 50, comprises an arm 2531 fast upon the shaft 92 to which is pivoted at 254 a link 255 the other end of which is pivoted at 256 to a casting 257 loosely mounted on the shaft 205 which carries the means for actuating the re-set pawls that are associated with the "front" totalizer. The casting 257 is provided with a downwardly extending arm 258, which, when the total lever is operated through the shaft 92 arm 2531 and link 255, is moved so as to occupy the position illustrated in Fig. 51 in which it will obstruct the movement of the tail of the pawl 250. When the arm 258 has been moved in the position illustrated in Fig. 51 and the register begins its first revolution during a total or re-set operation, the rotation of the plate 249 will engage the tail of the pawl 250 with the arm 258. This engagement will rock the pawl 250 clockwise so that during the rotation of the plate 249 the nose of the said pawl will ride upon the periphery of the boss 253 and will not drive the shaft 242, so that during the first rotation of the register the shaft 242 will not be driven. At the completion of the first operation of the register the plate 249 will have made one rotation and the pawl 250 returned home or the position which it occupies in Fig. 51 in which its nose abuts against the boss 253. When the pawl 250 has reached this position at the end of the first rotation of the register the arm 258 will have been removed by an operation of the shaft 92, the said shaft receiving this actuation through the medium of the segment shaped lever 182 as previously described. As a consequence during the second rotation of the register the plate 249 will be driven thereby and since the pawl 250 abuts against the boss 253 during this second rotation of the plate 249 the shaft 242 will be given one complete rotation. The tension of the spring 252 always tends to press the noses of the pawls 250 and 251 toward the shaft 242 and as a consequence when the plate 249 and the shaft 242 are coupled together the abutment 253 will be located between the noses of the two said pawls as is illustrated in Fig. 51 and as a consequence the pawl 251 will prevent any overthrow of the shaft 242 although the plate 249 may be brought to a stop with a sudden jolt. Thus the shaft 242 driven thereby may not coast any perceptible further distance so as to permit the printer to get out of time with the registering mechanism.

Meshing with each of the segments 130 which are actuated by the movement of the differential mechanism, referring now to Fig. 2, is a spiral gear 259 secured to a shaft 260 having bearings within a frame 261 and a bar 1262 carried by a frame 1261 both of which extend across the front of the register. Retaining collars 262 and 263 (Fig. 22), the former attached to the gears 259 and the latter secured to the shafts 260 on the opposite side of the bar 1262, hold the shafts 260 in their proper positions. Secured to each of the shafts 260 and within the frames 261 and 1261 is a toothed segment 264, referring to Figs. 22 and 26. As has been previously described, there is one spiral gear 259 associated with each of the amount, department, and clerk's banks of keys, and two gears with the transaction bank, which it will be remembered has two differential mechanisms, and one gear with the total lever 7, and consequently with each of these key banks and total lever there is also associated a toothed segment 264, meshing with which are teeth 265 made on the lower edge of horizontally positioned racks 266 which are slotted at 267 and 268 to receive rods 269 and 270 which support them. Above the slot 268 each rack is provided with another slot 271 which receives a supporting rod 272. Above the slot 271 each of the racks is provided with teeth 273 which mesh with the teeth of gears 274 which are fast upon nested sleeves 275 and a shaft 276, the other end of the said sleeves 275 and shaft 276 carrying type wheels 277 as is illustrated in Figs. 21^A, 24, and 37. By the mechanism herein described, when the segments 130 are actuated commensurate with the positioning of the differential segments the spiral gears 259 are driven, which through the tooth segments 264 meshing with the teeth 265 of the rack 266 drive the said racks a distance sufficient, through the medium of the teeth 273 thereon and the gears 274 to set the type wheels associated with the racks so that the type thereon will be set in correspondence with the actuation of the differential segments determined by the keys depressed. In other words, each differential segment is provided with a rack 266 which is driven commensurate with the movement of the differential so that for each bank of keys a type wheel is set to print a character corresponding with the key in the key bank which is depressed.

In the printing mechanism a single set of type wheels 277 is provided, the wheels being of sufficient diameter to contain one series of type numerals or characters on the upper half of their peripheral edges and a similar series on the lower half of their peripheral edges. The type wheels are so formed for the reason that an impression mechanism, hereafter to be described, coöperates with the upper set of type carried by the wheels and a second impression mechanism, hereafter to be described, coöperates with the lower set of type carried by said wheels.

As is usual in the art, there are provided totalizer wheels for which no banks of amount keys are employed, these elements being of highest denomination and operated in adding operations only when transfers to them are necessary. Differential units like those controlled by the amount keys are provided to actuate these totalizer elements of highest denomination, and through the connections corresponding to those above described, as hereafter will be described to position type carriers and indicator targets of highest denomination during total and sub-total printing operations of the machine.

All of the racks 266 which are associated with the amount key banks, transaction banks, department banks, and clerk's banks are the same as far as the setting of the type wheels is concerned. There is also, however, one rack 278 which is set by the movement of the total lever so that a type will be positioned to print a letter to indicate whether the amount printed is a total or sub-total. The driving connection between the total lever 7 and the rack 278 comprises, referring to Figs. 19 and 70^A, a link 279 which is pivoted at 280 to the total lever 7 and at its other end is pivoted at the point 281 to an arm 128 loose upon the shaft 131, a spiral gear segment 130 being secured to the arm 128, all of which are similar to the ones operating with the beams that are controlled by the differential segments. The teeth of the spiral gear segment 130 meshes with a spiral pinion 259 which is fast upon a shaft 282, referring to Fig. 26, and rotatably mounted within the frameworks 261 and bar 1262, carrying on its other end a toothed segment 283 which meshes with gear teeth 284 made in the lower edge of a rack bar 278. This rack bar like the bars 266 is also provided with gear teeth 273 on its upper edge which mesh with a gear wheel 274 which is fast upon one of the nested sleeves 275, the other end of the sleeve carrying a type wheel 1277 (Fig. 37). The type wheel 1277 bears type having letters "X" and "Z" which are positioned commensurate with the setting of the total lever through the link 279, links, and gears just described. There is an "X" for each subtotal position of the lever 7 and a "Z" for each total position of said lever. When the total lever is moved to a sub-total position a letter "X" on the type wheel is set in printing position and when the total lever is moved to total position a letter "Z" is moved into printing position. When the total lever 7 is moved into adding position no letter is ever printed, there being no letter on the type wheel 1277 when it is set in printing position by the total lever 7 being moved into adding position. It will be seen by referring to Fig. 37 that there are thirteen type wheels 277, the first nine reading from the left controlled by and adapted to print totals and sub-totals commensurate with the setting of the totalizer wheels or keys depressed in the amount banks. The next wheel 277 reading to the right is set by the differentials controlled by the department key bank, the next two are set by the two differentials controlled by the transaction key bank, and the next wheel is set by the differential controlled by the clerk's key bank, each of these wheels bearing type corresponding to the inscriptions on the keys associated with each type wheel.

The rack bar 278 also has teeth 1288 on its upper edge which mesh with the lower teeth 1289 of a double toothed segment 1290 rotatably mounted on the shaft 1291 secured in the framework 261 and bracket 1262, the upper teeth of the segment meshing with the interlocking plate 1292 which is set by the actuation of the total lever (Figs. 5 and 26).

It will be noted by reference to Fig. 5 that the lower extremities of the pawls 32 of the three control banks project into slots 1293 formed in the frame of the machine. These slots are normally unobstructed as in the normal position of the plate 92 shown in Fig. 26, cut-away portions formed in the plate are in alinement with the notches 1293. It will be noted that the plate 1292 is formed with a plurality of notches and projections which are brought into play in the various positions of the plate 1292 so as to obstruct the proper ones of the slots 1293 when the total lever 7 is moved out of adding position. When the total lever is out of adding position only those keys in the bank appropriate to the position in which the lever is placed can be operated as only that slot 1293 appropriate to that bank of keys is unobstructed. Consequently the pawls 32 of the other two control banks are locked against movement thereby preventing the depression of the keys in their respective banks.

Four date wheels 2781 are provided, referring to Figs. 37, 38, and 39, rigidly mounted on members 2791 having nested hubs 2801 and loosely mounted on the shaft 276. The outermost hub 2801 is shaped to form at its forward end a hollow cylindrical knob 2811 having a knurled edge by which the corresponding date wheel can be adjusted. The hubs 2801 of the other members 2791 have projections 2821 (Fig. 39) coöperating with recesses 2831 formed in the hub of nested, cylindrical, hollowed knobs 2841 mounted within the knob 2811. It can be seen from this construction that the knob 2841 can be pulled forwardly relative to the hub 2801 so that the knob may be firmly gripped and turned, the projections 2821 not being moved out of engagement with the recesses 2831 when the knobs 2841 are moved forwardly. As can be seen from Figs. 37 and 38, the knurled portion of the knobs 2811 and 2841 are so close together when the knobs 2841 are in their inner positions that the desired one of the latter could not be easily gripped and therefore the knobs 2841 are constructed so that they may be pulled out to facilitate their turning.

An alining means is provided for each of the date wheels to insure that they should be in proper alinement for printing and this means comprises, referring to Figs. 24 and 60, toothed wheels 1279 meshing between the type of the type wheels 2781, the said toothed wheels being loosely mounted upon a horizontally disposed shaft 1280. Coöperating with the teeth of each of the wheels 1279 is a retaining pawl 1281 loosely mounted upon a shaft 1282 and held in engagement with the said teeth by means of a coiled spring 1283 compressed between the rear edge of the pawl and a spring housing 1284. The spring pressed pawls 1281 through the toothed wheels 1279 will insure at all times the proper movement of the type wheels 2781 so that they will always be in proper alinement for printing.

The printer type line is provided with eight type wheels 285 which are for the purpose of printing ledger numbers, stock sizes, stock numbers and the like, and these type wheels are loosely mounted upon a sleeve 286, referring to Fig. 37, which is secured against rotation by being attached to one of the frameworks 261. Meshing with each of the type wheels 285 is a bevel crown gear 287, referring to Fig. 40, these bevel crown gears being mounted upon nested sleeves 288 which are loosely mounted upon a stud shaft 289 carried by a bracket 290 supported by the printer framework. Also meshing with the bevel crown gears 287 are pinions 291 which are fast upon nested sleeves 292 loosely mounted upon a shaft 293 supported by one of the printer frameworks 261. Each of the nested sleeves 292 also carries rigidly secured thereto a gear wheel 294 and a ratchet wheel 295. Meshing with the gear teeth of each of the gears 294 are the teeth of a vertically movable rack 296 (Fig. 41) which is actuated by a handle 297 secured thereto which handle projects through a longitudinal slot 298 made in a framework 299. The lower end of each rack 296 is provided with a block 300 which fits against the outer face of the printer framework 261 and serves as a means for supporting the rack bar during its reciprocation. A bracket 301 is secured to the rear face of the framework 261 to which is pivoted at 302 retaining pawls 303 the noses of which coöperate with the ratchet wheels 295. Each pawl is held in engagement with its ratchet wheel by means of a coil spring 304 compressed between the tail of the pawl and the tail of a lever 305 which abuts against the bracket 301 and is pivotally supported to the said bracket at the point 302. It will be seen by referring to Fig. 1 that in the spaces between the slots 298, numbers and letters are inscribed to indicate stock numbers, ledger numbers, and stock sizes so that by raising the handles 297 through the gear connections just described, rack bar 296 may be set to print any desired stock size, stock number, or ledger number. To also assist in positioning the racks, sight openings 306 are made in the framework 299 through which numbers inscribed on the front edge of the racks 296 are visible, and these numbers are so arranged that when the handle 297 of a rack is moved opposite the desired graduation, the same number inscribed on the front edge of the rack 296 will be visible through the sight opening 306. In this way either of these indication means may be used in setting the type wheels 285 by the racks 296, additionally one indication may be used to check the other.

The machine is also provided with a consecutive number mechanism which comprises, referring to Figs. 24, and 37, five type wheels 306 which are loosely mounted upon the shaft 276. Secured to the side of each of the said type wheels is a ratchet wheel 307 (Fig. 59). Each of these ratchet wheels 307 is provided with two deep recesses 308 which coöperate with the graduated tine of a rotation counter pawl 309, the construction of the ratchet wheels 307 and pawl 309 being of the usual well known rotation counter type. Each of the ratchet wheels 307 is provided with two deep recesses 308 for the reason that the type wheels are rotated by the differentially tined pawls 309 twenty teeth spaces and during this complete rotation two transfers will take place. This construction is necessary for the reason that the type wheels themselves are provided with two sets of type each having ten characters as has been previously mentioned, the purpose of the two sets of type being to permit an impression to be taken both from the upper set and lower set. It is to be understood, that when the upper set of type on the wheels have been set to print a certain number or character the lower set of type will be correspondingly set so that the same impression will be taken from both the upper set and lower set of type. The differentially tined pawl 309 is supported by an ear 310 which is pivoted at 311 to one arm of a bell crank lever 312 which is loosely mounted upon the shaft 1280. The other arm of the bell crank lever 312 is pivoted at 313 to a link 314 the lower end of which is pivoted at 315 to an arm 316 which is fast upon the shaft 1282. The tines of the pawl 309 are held in engagement with the ratchet teeth 307 by a spring 317 compressed between the tail of the pawl and a portion of the housing 1284. Also fast upon the shaft 1282, referring to Figs. 24 and 25, is one end of a lever 318 the lower end of which is bifurcated at 319 to receive a pin 320 carried by the upper end of a lever 321 which is fast upon a horizontally disposed shaft 322. Rocking motion is imparted to the shaft 322 by means of an arm 323 (Fig. 24) fast upon the said shaft, the upper end of the arm being pivoted at 324 to one end of a link 325 being bifurcated at 326 (Fig. 6) to receive the shaft 242 of the printer drive line. An anti-friction roller 327 carried by the arm 325 fits within a cam groove 328 made in a plate 329 which is fast upon the shaft 242. When the shaft 242 is rotated in the direction indicated by the arrow the link 325 will be reciprocated back and forth which will impart a rocking motion to the shaft 322. This movement of the shaft through the arm 321 and levers 318 will rock the shaft 1282 a sufficient distance to cause the arm 316, link 314, and bell crank 312 to impart a clockwise movement to the differentially tined pawl 309 (Fig. 59) so that this pawl will move the ratchets 307 one tooth space during each rotation of the plate 329 which is driven one complete revolution during each operation of the printer and corresponding rotation of the register. Re-retaining pawls 330 are loosely mounted upon the shaft 1282 which coöperate with the ratchet wheels 307, being held in engagement therewith by means of coil springs 331 compressed between the tails of the said retaining pawls and the housing 1284.

Means is provided for turning the consecutive number type wheels 306 to zero and this means comprises turn to zero pawls 332 (Fig. 59) which are pivoted to each of the ratchets 307 and are held by springs 333 within notches made in the shaft 276. The shaft 276 is given a clockwise rotation to return the type wheels to zero, in the well known manner, by means of a key (Fig. 38) which may be inserted within a slot 334 made in the outer end of the shaft 276. The shaft 276 is normally held against rotation by means of spring pressed pins 335 which fit within openings made in the periphery of the shaft 276 and recesses 336 made in a hub 337 which is secured against rotation. As is shown in Fig. 38, the pins 335 project into the grooves 334 made in the shaft 276. The pins 335 are divided at the point 338 and when a key is inserted within the slot 334, as is shown in Fig. 38, the pins 338 will be lifted a distance sufficient to bring the point of their division on the periphery of the shaft 276 so that the said shaft may be rotated, the lower part of the pin being carried by the shaft and the upper part of the pin being left in the recesses 336 made in the hub 337. When the key has been turned sufficient to set the type wheels to zero it is arrested by a bushing, (not shown), so that the key must then be turned in the opposite direction until it is again stopped by the bushing after which it may be withdrawn.

After the racks 266 have been positioned by the actuation of the differential actuators as determined by the keys depressed in the various key banks, and before an impression is taken from the type wheels associated with these racks, a mechanism is operated which is for the purpose of preventing the printing of ciphers to the left of the highest denomination represented by a digit other than a cipher in any printed number and for permitting the printing of ciphers to the right. This mechanism which is known in the art as a "zero elimination mechanism" will not be specifically described herein; the mechanism being partially illustrated in Figs. 26, 27, 28, 29 and 35 reference is made for a detailed description thereof to the Fuller Patent No. 1,311,884, issued August 5, 1919, for the reason that the same zero elimination mechanism is used here as is shown and fully described in the said patent. This mechanism in general terms comprises hooked levers 1242 which coöperate with notches 1243 made in the upper edges of the racks 266. At the proper time during the operation of the machine these hooked levers 1242 are moved into engagement with the notches 1243 and the said levers given a backward movement through links 1244, 1245, and 1246 the last mentioned link having an anti-friction roller 1247 (Fig. 29) fitting within a cam groove 1248 made in a plate 1249 fast upon the shaft 242. Through this mechanism all of the racks 266, to the left of the rack which has been set to represent the highest digit in the number to be printed, are drawn backward to move the type wheels associated therewith from their normal zero printing position to a non-print position.

After the date type wheels 2781 have been positioned by the manipulation of the knurled edges 2841; after the ledger type wheels 285 have been positioned by the manipulation of the racks 296; and after the type wheels 277 have been positioned by the operation of the differential actuators determined by the keys depressed in the amount banks, transaction banks, department banks, and clerk's banks of keys, as has been heretofore fully described; an alining mechanism is operated to hold the type wheels 277, 1277, and 285 against movement during the time when several impressions are taken from the said type wheels.

This alining mechanism, referring to Figs. 26 and 34, comprises two aliner members 3381 and 339 fixed upon a shaft 340, the aliner 3381 coöperating with the gear wheels 275 which are actuated by the racks 266 and the aliner 339 coöperating with the ledger type wheels 285 themselves. At the proper time during the operation of the machine and after all of the various type wheels have been set these two aliners 3381 and 339 are rocked into engagement with the gear wheels 274 and ledger type wheels 285 respectively by the rocking of the shaft 340. Rocking movement is imparted to this shaft by a link 342 which is pivotally connected at 343 (Fig. 34) to a lever 344 which is pivotally mounted upon a stud shaft 345. The said lever 344 is forked to form two arms, the outer end of each of which carries an anti-friction roller 346 each coöperating with one plate of a double plate cam 347 which is fast upon the printer drive line shaft 242. It will be clear from the above that when the shaft 242 is rotated, through the medium of the cam 347, rollers 346, lever 344, and link 342, the shaft 340 will be rocked at the proper time to engage the aliner members 3381 and 339 with their respective gears and type wheels so that these will be held against movement during the time in which impressions are taken from the type on the said type wheels.

The detail strip 348, referring to Figs. 21ᴬ 21ᴮ, 24, and 25, is fed from a supply roll 349 rotatably mounted upon a shaft 350, over a guard bar 351, around a roller 352 rotatably mounted upon a shaft 353 carried by the innermost printer framework 261, around a roller 354 rotatably mounted upon a shaft 355 carried by the upper end of a lever 356, and then to the right over the top of a sleeve 357, loosely mounted upon a shaft 358 supported at one end in one of the printer frameworks 261 and at its other end in a vertical bracket 359 (Fig. 21ᴬ), the sleeve 357 carrying arms 360 which support at their forward end a housing 361 within which a printing platen 362 is supported and beneath which the detail strip is passed after leaving the sleeve 357 and after passing over a roll 3571. After passing beneath the platen 362 said detail strip is passed upwardly around two rolls 363 and 364 carried by a bracket secured to the housing 361 and then to the left around a roller 366 rotatably mounted upon a shaft 365 supported by one of the printer frameworks 261. From the roller 366 the strip is passed around a roller 367 rotatably mounted upon a shaft 368 carried by the lever 356 the said roller being positioned substantially opposite the roller 354 heretofore mentioned, as is clearly shown in Fig. 25. From the roller 367 the strip is fed onto the receiving roll 369 which is rotatably mounted upon a shaft 370 supported by one of the printer frameworks 261.

A glass 372, referring to Figs. 1, 24, and 25, is fastened within that portion of the printer cabinet 373 which closes the upper part of the printing mechanism, and is of a length to expose to view that portion of the detail strip 348 which extends between the roll 364 and roller 366. Due to this construction quite a number of transactions which have been printed upon the detail strip are visible to the user of the machine. An opening 374 is cut in the glass 372 which will permit the detail strip being used as an autographic device, the feed of the strip being so arranged, as will be hereinafter explained, that the last printed transaction is fed beyond the opening 374 so that any desired notation may be written with a pencil beneath this last printed transaction. This permits the inscription of any information relating to the transaction aside from that printed by the machine. The detail strip 348 beneath the opening 374 is supported on a flat portion 375 of the platen housing 361. As was previously stated the last printed transaction made on the detail strip is normally in a position slightly past the opening 374 made in the glass 372, and therefore a spacing mechanism is provided for moving the detail strip from this position to one in which the last printed transaction will be beneath the platen 362. This shifting is accomplished by the actuation of the lever 356 which carries the two rollers 354 and 367. This lever 356, referring particularly to Figs. 24 and 25, is pivoted upon a shaft 376 supported by one of the printer frameworks 261, the lower end of the lever being provided with a semi-circular cut out portion 377 within which fits the rounded end of an arm 378 which is loosely mounted upon a shaft 379 supported by one of the printer frameworks 261. The lower end of the arm 378 (Fig. 3) carries an anti-friction roller 380 which fits within a cam groove 381 made in a plate 382 fast upon the printer drive line shaft 242. At the proper time during the operation of the machine and previous to the time the platen 362 is actuated, the lever 356 through the arm 378 and cam groove 381 is given a counter clockwise movement. This movement of the lever 356 will cause the detail strip 348 to pass around its various rollers in a clockwise direction, the pull being exerted on the strip at the point where it passes around the roller 354 which is rotatably mounted upon a shaft carried by the lever 356, the slack in the paper needed for this movement being provided by the counter clockwise movement of the roller 367 which is also carried by the said lever. The movement of the lever 356 is sufficient to move the detail strip 348 a distance to move the last printed transaction from its position beneath the cut away portion 374 in the glass 372 to a position directly beneath the platen 362. It is to be pointed out here that the reason for normally having the detail strip in such a position that the last printed transaction is just beyond the opening 374 in the glass 372 is to permit the use of the detail strip as an autographic device and also to have the last printed transaction clearly exposed to the view of the operator and if the strip was not so spaced and was left in its position beneath the platen 362 the attainment of either of the purposes just explained would be impossible. After the detail strip 348 has been spaced by the lever 356, as previously described, so that the last printed impression is beneath the platen 362, a feed device is operated to feed the paper so that the next impression of the platen 362 will cause an impression to be made beneath the former impression and not on top of this impression as would be the case were no feeding mechanism provided. In other words the movement of the lever 356 is merely to shift the paper and does not feed the strip from the position in which the last impression of the platen 362 was made upon it. The mechanism for feeding the detail strip is operated independently of the shifting mechanism and after the said shifting mechanism has been actuated. This feeding mechanism for the detail strip to space between the printed items comprises, referring to Fig. 25, a lever 383 loosely mounted upon the shaft 370 and carrying clutch rollers 384 which are mounted to revolve in a drum 385 fast to the side of the receiving drum 369. The lever 383 is slotted at 1384 to receive a pin 1385 carried by the upper end of one arm 386 of a bell crank lever 387 loosely mounted upon a shaft 445 supported by one of the printer frameworks 261. The other arm 389 (Fig. 3) of the bell crank 387 carries an anti-friction roller 390 which coöperates with the outer cam shaped periphery of the cam 382. A coiled spring 391 stretched between a stud 392 carried by the arm 386 of the bell crank 387 and a stud 393 carried by one of the printer frameworks 261, serves to normally exert a tension on the arm 386 to rock it counter clockwise and rotate the lever 383 in a clockwise direction. The parts are held in the positions illustrated in Fig. 25 due to the fact that the roller 390 is on the true cylindrical surface of the cam 382 the counter clockwise movement of the lever 386 under the action of the spring 391 being permitted only when the cut away portion of the periphery of the cam 382 is rotated opposite the roller 390. The action of the clutch rollers 384, the one being carried by the arm 383 and the other by an arm 394 pivotally mounted upon the shaft 350, will not be specifically described herein for the reason that a very full disclosure and description of this mechanism is given in a former patent granted to the applicant F. L. Fuller, No. 1,182,999, dated May 16, 1916. It is sufficient here to state that during the operation of the machine and substantially contemporaneous with the operation of the lever 356 to space the detail strip 348 as previously described the cam 382 is rotated a distance sufficient to permit the arm 386 to be rocked counter clockwise by the spring 391. This movement of the arm 386 will rotate the lever 383 so that the clutch roller carried thereby is moved the distance which it is desired to feed the detail strip. Subsequently, during the operation of the machine and just previous to the operation of the platen 362, the cam 382 will rock the arm 386 clockwise so that the lever 383 will be returned to its normal position as is illustrated in Fig. 25. During this movement of the lever 383 the clutch roller 384 carried thereby becomes wedged between the inner surface of the drum 385 and a portion of the lever 383 so that the desired feeding of the detail strip will be accomplished. Near the completion of the operation of the machine and after the impressions of the platen 362 have taken place, the lever 356 through the cam groove 381, will be rocked in a clockwise direction so that the detail strip 348 will be spaced sufficient to position the last impression made thereon by the platen 362 just beyond the opening 374 made in the glass 372. Means is provided for varying the length of the feed through the movement of the lever 383. This variation is accomplished by varying the distance between a developed surface 395 made on the said lever and a pin (not shown) carried by the end of an arm 396 fast upon a stud shaft 397 carried upon a bell crank lever 398 which is loosely mounted upon a stud shaft 399 carried by one of the printer frameworks 261. A link 400 has one end pivoted at 401 to the bell crank 398 and its other end at the point 402 to a lever 403 loosely mounted upon a stud shaft 404 carried by one of the printer frameworks 261. The lever 403 is provided with a hand engaging handle 405 by which it may be rocked either clockwise or counter clockwise. By moving the hand lever 405 in a clockwise direction, through the link 400, bell crank 398 and arm 396, the distance between the pin carried by the said arm and the developed surface 395 of the lever 383 is shortened so that the subsequent feed of the lever will be short. Inversely, the counter clockwise movement of the hand lever 405 will increase the distance between the pin carried by the arm 396 and the developed surface 395 of the lever 383 so that the subsequent feed of the said lever will be increased. When the hand engaging lever 405 is moved to its limit in a clockwise direction the feed of the lever 383 will be set so that the impressions made upon the detail strip by the platen 362 will be made directly one beneath the other. When the lever 405 is moved in a counter clockwise direction however, the movement of the lever 383 will be so set that the impressions made on the detail strip by the platen 362 will be spaced apart varying distances dependent upon the movement of the lever 405 in this counter clockwise direction. The purpose of spacing the impressions made on the detail strip by the platen 362 various distances apart, is to provide a space beneath each impression for any autographic notation that the user of the machine may desire to make, this autographic notation being possible by the opening 374 made in the glass 372 as has been previously described. As will be seen by reference to Fig. 1 the hand engaging lever 405 protrudes outside of the cabinet 374 and is movable to its various positions through the provision of a slot 406 made in the said cabinet.

A fragmentary portion of a printed detail strip is illustrated in Fig. 62. The numbers at the extreme left hand side of the strip are the consecutive numbers of the operations of the machine. The column of impressions down the center of the strip indicate, reading from left to right, the amount of the sale, the department within which the sale was made, the number of the cashier, the kind of transaction and the clerk making the sale. As an example taking the first impression in this column, the numbers 5.50 indicate that the same amounted to five dollars and fifty cents, the abbreviation "Rub.," indicates that the article sold was rubbers, the number "2" following the abbreviation "Rub.," indicates that this sale was set up on the registering mechanism by cashier No. 2, the letters "A & X" indicate that the transaction was an allowance and exchange transaction, and the letter "H" indicates that the sale was made by clerk H. The column of impressions at the extreme right of the strip indicate the stock number and size of the stock sold. Taking the first impression in this column as an example the numbers 2A2003 indicate the stock number of the rubbers which were sold and the number 01 following the dash indicates size of the rubbers sold.

The check paper from which receipts are printed, cut, and ejected from the machine is in a supply roll 406 (Figs. 21$^B$ and 25) rotatably mounted upon a horizontally disposed stud 407 carried by an outwardly extending bracket 408 secured to one of the printer frames 261. The check paper 409 is led from the supply roll 406 through a horizontally disposed chute 410 which curves upwardly at one end so as to direct the paper between a printing cylinder 411 and a rubber feed roll 412 which are rotatably mounted upon stud shafts 413 and 414 respectively secured to the inner printer framework 261. After leaving the rolls 411 and 412 the strip 409 passes between another printing cylinder 415 and a rubber feed roll 416 which are rotatably mounted upon stud shafts 417 and 418 respectively supported by the innermost printer framework 261. The strip 409 is then passed through a paper chute 419 which is carried by a bracket 420 secured to the side of a cylinder 421 which is fastened at each end in the parallel printer frameworks 261 as is shown in Fig. 49. Revolubly mounted within the cylinder 421, is a rotary knife 422 which will be hereinafter described more in detail. This knife is provided with a passage 423 therethrough which is normally in register with the chute 419 so that the check paper may be passed through the opening 423 in the knife, deflected downwardly by a deflecting plate 424 secured to side of the cylinder 421, the deflection causing the paper to pass beneath the platen 362 by which impressions are made thereon as will be hereinafter explained. The check paper after receiving an impression from the platen 362 is ejected from the machine by mechanism which will be hereinafter described in detail.

The means for feeding the check paper in the path which has just been described comprises, the printing cylinders 411 and 415 and the feed rolls 412 and 416, the latter being idlers whereas the former are driven. The means for driving the printing cylinders 411 and 415 comprises a gear wheel 425 fast to the inner end of the printing cylinder 415, said gear meshing with a similar gear 426 secured to the inner end of the printing cylinder 411. The gear 426 meshes with a gear 427 rotatably mounted upon the shaft 376. The gear 427 meshes with a large gear 428 fast upon one end of a sleeve 429 (Fig. 22) which is loose upon a shaft 430 secured at each end within the printer frameworks 261. The outer end of the sleeve 429 has secured thereto a pinion 430 which meshes with the teeth of a large gear 431 fast upon the inner end of a sleeve 432 rotatably mounted upon the shaft 379 secured at each end in the parallel printer frameworks 261. Fast to the outer end of the sleeve 432 is a Geneva plate 434 more clearly shown in Fig. 32. Coöperating with the notches 435 of the Geneva plate 434 is a long pin 436 and a short pin 437 carried by a disk 438 adjacent its periphery, said disk being secured to a sleeve 1438 splined upon the printer drive line shaft 242 so that it may be slid longitudinally of the said shaft and yet be rotated therewith. When the parts are in the position shown in Fig. 22 and the drive shaft 242 is rotated through an actuation of the registering mechanism as has been heretofore explained, the Geneva plate 434 will not be actuated for the reason that both of the pins 436 and 437 are out of the same vertical plane as the Geneva plate 434 and as a consequence when the plate 438 is rotated the pins will not engage the Geneva plate. With the parts in these positions, then, when the register is operated no check paper will be fed and as a consequence no check will be issued by the machine. Means, however, is provided for sliding the plate 438 on the shaft 242 so that either the pin 436 will be moved into the same vertical plane with the Geneva plate 434 or so moved that both the pin 436 and the pin 437 will be moved into the same vertical plane with the said Geneva plate 434. The means for sliding the disk 438 comprises, referring particularly to Figs. 22, 44, 45, 46, and 47, a stud shaft 439 (Fig. 45) arranged above the shaft 242 and carried at its inner end by the outermost printer frameworks 261. The shaft 439 protrudes beyond the outermost printer framework 261 and upon this protruding portion thereof a sleeve 440 is rotatably mounted, the inner end thereof having a disk like portion 441 which is coupled to a tooth segment 442 loosely mounted on the shaft 439 and carrying a pin 443 which passes through an opening made in the disk 441. Due to this construction rotation of the sleeve 440 causes a rotation of the tooth segment 442. Meshing with the teeth of the said segment are the teeth of another segment 444 which is loosely mounted on the protruding end of a shaft 445 supported by the parallel printer frameworks 261. The segment 444 is provided with an arm 446 extending to the left (Fig. 22) to the outer end of which the forwardly extending arm 447 of a casting 448 loosely mounted on the shaft 445 is secured by means of screws 449. The casting 448 also has a rearwardly extending arm 450 which carries on its face adjacent the shaft 445 a pin 451 which fits within an irregularly shaped cam groove 452 (Fig. 23) made in a casting 453 which is pinned to the shaft 445. Due to this construction, when the sleeve 440 is turned, the end of the sleeve being knurled so as to facilitate this object, through the segments 442 and 444, and casting 447, the pin 451 is oscillated in the line of an arc concentric with the shaft 445. The cam slot 452 is so shaped that the oscillation of the pin 451 within the said slot will cause the casting 453 and hence the shaft 445 to be slid back and forth longitudinally. Loose upon the shaft 445, and held in place by a collar 4541 pinned to the shaft, is a sleeve 454 provided with an arm 455 which is forked to fit within an annular groove 456 made in the outer end of the sleeve 1438 which carries the disk 438. When the shaft 445 is slid back and forth by means of the oscillation of the pin 451, through the arm 455 and groove 456, the sleeve 1438 and consequently the plate 438 is slid black and forth upon the shaft 242. The shape of the cam slot 452 is such that when the sleeve 440 is so turned that a portion marked "Check" thereon is moved to the position where the point "No check" is shown in Figs. 22 and 47, the shaft 445 has been slid a distance sufficient to move the disk 438 so that its long pin 436 is in the same vertical plane as the Geneva plate 432. Means is provided for locking the sleeve 440 in its moved position and this means comprises, referring to Figs. 44 and 45, a series of holes 457 made in the disk 441 which are adapted to receive a pin 458 which is carried by and projects from the outermost printer framework 261. A coil spring 459 positioned between a shoulder made on the sleeve 440 and the outer end of a drum 460 surrounding the sleeve 440 and secured to a bracket 461 extending outwardly from the printer frameworks 261, normally holds the sleeve 440 in its innermost position in which the pin 458 projects through one of the openings 457 made in the disk 441. When it is desired to turn the sleeve 440 for shifting the plate 438 as above described, the sleeve 440 is slid outwardly sufficient to disengage the disk 441 from the pin 458, and when in this disengaged position is turned the desired distance. The pin 443 which provides the couple between disk 441 and the toothed segment 442 is long enough to permit the disk 441 to be slid outwardly to disengage the pin 458 without disengaging the pin 443. After the sleeve 440 has been turned so that the portion marked "Check" is above shaft 439 it is permitted to be returned to its normal inner position by the spring 459 so that one of the openings 457 in the disk 441 receives the pin 458 and thereby holds the sleeve 440 in this moved position. The spring 459 has one end connected to the sleeve 440 and its other end to the drum 460 so that turning of the sleeve 440 puts the spring under tension and when so tensioned and released the sleeve 440 will be returned by the spring 459 to its position in which no check will be issued.

Summing up this construction, when the knob 440 (Fig. 22) is turned to its "no check" position neither of the pins 436 nor 437 will be in the same vertical plane as the Geneva plate 434 so the subsequent rotation of shaft 242 will cause no actuation of the Geneva plate 432 and hence no feeding of the check paper. When, however the knob 440 is turned to the "check" position the plate 438 has been slid a distance sufficient to position its long pin 436 in the same vertical plane as the plate 434 so that when the drive shaft 242 is rotated this pin engages one of the notches 435 and rotates the Geneva plate 434 so that one check is fed. Should the sleeve 440 be turned to its "stub check" position the plate 438 would be moved a distance sufficient to place both its long pin 436 and its short pin 437 in the same vertical plane as the Geneva plate 434. As a consequence, when the drive shaft 242 is actuated both of these pins engage the notches 435 successively whereby the Geneva plate 434 will receive two actuations. The two actuations of the Geneva plate will feed a check having a length twice that of the check fed when the sleeve 440 was turned to the "check" position. This double length check receives two impressions by means hereafter to be described, and is partially severed equidistant its ends by the knife 422 as will be hereinafter described, so that a stub check is issued by the machine.

After the knob 440 has been turned so as to set the plate 438 to its desired position and before the shaft 242 is rotated to cause an operation of the Geneva plate 434 and a feed of the check paper, an alining mechanism is operated to correctly aline the plate 438 so that during its subsequent actuation the pins 436 and 437 carried thereby will correctly mesh with the notches 435 in the Geneva plate. This alining mechanism comprises, referring to Figs. 20, 52 and 66, a segment member 462 fast on the inner end of the shaft 445. The segment 462 has two notches 463 and 464 with which an aliner 465 (Fig. 20) coöperates. The aliner 465 is formed on one end of a lever 466 pivotedly mounted upon a stud 467 carried by an end frame 468 of the registering mechanism. The rear end of the lever 466 is shaped to form a cam surface 469 which coöperates with a lug 470 secured upon the outer face of a gear 471 fast upon the main drive shaft 100 of the registering mechanism. The gear 471, through an intermediate gear (not shown) receives its actuation from the electric motor (not shown). During the first part of the rotation of the shaft 100 the lug 470 strikes the lower portion of the lever 466 and rocks said lever counter clockwise and disengages the member 465 from either notch 463 or 464 as the case may be. At the proper time during the operation of the machine, the lug 470 engages the cam surface 469 of the lever 466 causing the said lever to rock clockwise (as viewed in Fig. 20) about its pivot 467 a distance sufficient to engage the alining member 465 with one of the notches 463 or 464 of the segment 462. When the alining member 465 is in engagement with the segment 462 the shaft 445 is held against oscillation.

The shaft 445 is not oscillated by the turning of the knob 440 therefore the member 465 coöperates with the notch 463 when the shaft 445 is under the control of the sleeve 440. However the shaft 445 is oscillated by an "automatic check control" mechanism to be described later, and when said shaft is rocked by this mechanism the member 465 coöperates with the notch 464.

The alining mechanism just described has been explained in connection with the manual setting of the sleeve 440 to its three positions but as a matter of fact the alining segment 462 is provided primarily to coöperate with the "automatic check control" mechanism which will be hereinafter explained. This automatic mechanism regulates the feed of the check independent of the hand control 440 and irrespective of what position the said hand control may occupy. Since the automatic control mechanism comprises a number of moving elements all of which are subject to both wear and strain it would be difficult in the absence of some alining mechanism to insure the accurate positioning of the shaft 445 with respect to the Geneva plate 434, the shaft 445 being set, as will be hereinafter explained, by the automatic mechanism.

The automatic check control mechanism which automatically determines when a check will be issued and what type check will be issued will now be described. Two of the printer racks 266 referring to Figs. 66, 67 and 68, which are associated with the "department" and "transaction" key banks are provided on their lower edge with teeth 472 in addition to the teeth 265. The teeth 265 it will be remembered through the segments 264 and shafts 260 provide the means for positioning these racks commensurate with the movement of the differential mechanism controlled by the keys in the "department" and "transaction" key banks. The teeth 472 formed on these racks are arranged to mesh with toothed segments 473 mounted upon sleeves 474 loosely mounted upon one of the shafts 260. The sleeves 474 as shown in Fig. 68 have secured thereto cams 475. Cooperating with these cams is an anti-friction roller 476 which normally lies adjacent the peripheries of the said cams and is of a length to engage the peripheries of both of them. The roller 476 is carried by one end of a lever 477 loosely mounted upon one of the shafts 260. When the roller 476 rides upon the circumferential periphery of the cams 475 the lever 477 is not actuated, but when either of the cams 475 is so set that the raised portion of its periphery engages the anti-friction roller 476 the lever 477 is rocked clockwise about its pivot 260. When the lever 477 is rocked clockwise as just described a condition is set up, as will be presently described, which causes the automatic operation of the shaft 445 to control the check paper feeding mechanism. From the foregoing it will be understood that the setting of the cams 475 determine whether or not the automatic control mechanism for the check feed will be actuated. The cams 475 are set through the positioning of the racks 266 as controlled by the keys of the "department" and "transaction" bank and as a consequence the keys of these two banks determine whether or not the automatic control for the check feeding mechanism is operated. The parts in the present machine are so arranged and constructed that the keys of the "transaction" bank marked "Paid out," "Goods received," and "Alt. & exchg." will position one of the cams 475 so that the automatic control will be operated and the key marked "P. M." of the "department" bank will position the other cam 475 to cause the actuation of the automatic control. It is to be understood that any other keys in any of the other banks might be constructed to control the automatic check feed, this control being dependent upon the shape of the raised portion on the cams 475 and the selection of the different racks for positioning these cams. As previously stated, the rocking of the lever 477 clockwise sets up a condition whereby the automatic control of the check feeding mechanism is accomplished. In order to accomplish this result, a lever 478 (Fig. 33) is pivoted at 479 to the lever 477. The lever 478 carries an antifriction roller 480 and is bifurcated at 481 to surround a pin 1445. The parts are shown in their normal position in Fig. 33 in which the antifriction roller 476 rests against a circumferential portion of the cams 475 and the lever 477 has not been moved. When the parts are in the position shown in Fig. 33 the center of roll 480 is on the line of an arc concentric with the shaft 483 which arc passes through the center of the crotch in the hook 482. Consequently when the hook 482 is rocked counter clockwise the antifriction roll 480 will not be moved by the said hook but will be engaged in the crotch of the hook. The means for rocking the hook 482 counter clockwise comprises a stub-shaft 483 secured to one of the printer frameworks 261 and upon which is loosely mounted the hooked lever 482. Secured to the said lever 482 and loose upon the shaft 483 is a lever 484 whose outer end is cut out at 485 to receive the pin 1445 and which also carries two antifriction rollers 486 which coöperate with the two plates 487 of a double plate cam which is fast upon the drive shaft 242. The cams 487 are rotated once during every operation of the machine since they are fast upon the printer drive line shaft 242. The rotation of these cams, through the antifriction roller 486, will cause a counter clockwise oscillation of the hooked lever 482 and then return this lever to its normal position. As previously stated, if the antifriction roller 480 has not been moved by an actuation of the lever 477, the counter clockwise oscillation of the lever 482 will not engage the antifriction roller 480 to move it. However, should one of the cams 475 be so set through the actuation of the racks 266 which coöperate with the "department" and "transaction" key bank that they engage the antifriction roller 476 and rock it clockwise, through the levers 477 and 478 the antifriction roller 480 will be raised. When the roller is in this raised position and the hook lever 482 is rocked counter clockwise the upper point of the hook of said lever will engage the roller 480 and move it downwardly. The downward movement of the roller 480 will rock the lever 478 counter clockwise about its pivot 479. As the lever 478 moves counter clockwise it will move the pin 1445, downward. Counter clockwise movement of the lever 484 occurs just before the downward movement of the pin 1445 thereby allowing said movement of the pin. This pin is fast upon the outer end of an arm 1487 (Figs. 52, 56 and 57) which is fast upon the shaft 445. As a consequence, the downward movement of the pin 1445 will cause a clockwise rotation of the shaft 445. This rotation of the shaft 445 through the cam 452 and pin 451 will position the cam one additional step from whatever position in which it had been set. In other words, assuming that the shaft 445 is set in its "no check" position and cams 475 are so positioned that the shaft 445 is rocked through the medium of the pin 1445 levers 484, 478, 477, and cams 475, the said shaft 445 will be slid rearwardly one step so that the plate 438 is positioned to cause the Geneva plate 434 to be actuated once by the pin 436 during rotation of the shaft 242. Then again, should the shaft 445 and the plate 438 be so set by the sleeve 440 that a check would be issued, and the pin 1445 moved downward through the mechanism just described, the shaft 445 and the plate 438 would be slid an additional step rearwardly so that both pins 437 and 436 would be moved into the same vertical plane as the Geneva plate 434 and as a consequence a stub-check would be issued by the machine although the hand operated knob 440 had been set to its "check" position. In other words, irrespective of what position the shaft 445 occupies as set by the knob 440, if the pin 1445 is moved downward through the setting of the cams 475, the Geneva plate 434 will receive one additional actuation in addition to the number to which the said plate would be subjected through the setting of the sleeve 440. Due to this construction the issuance of a check will always be insured whenever the selected keys of the "transaction" and "department" banks are depressed which were herein before mentioned. If by chance the hand knob should be set to the "check" position and one of these keys pressed and a stub-check issued by the machine when as a matter of fact only a single check was desired, a part of the stub-check might be torn off and thrown away. If the knob 440 is set in the "no check" position and one of these keys depressed a check will be issued under the control of the automatic check device. If the knob 440 is set in the "stub check" position and one of these keys operated a stub check will be issued because the plate 448 is in its rearmost position whereby both pins 436 and 437 engage and move the Geneva plate 434. When one of the keys controlling the "automatic check" mechanism is depressed the pin 1445, as before stated, is moved downward and rocks the shaft 445. The lever 484 is also rocked counter clockwise therefore the pin 1445 will be near the lower portion of the opening 485 when said pin is moved downward. During the clockwise movement of the lever 484 to normal the lower edge of the opening 484 engages the pin 1445 and moves it upward thereby rocking the shaft 445 counter clockwise to normal position. Should one of the keys which do not coöperate with "automatic check" mechanism be depressed the lever 484 is rocked just the same but the pin 1445 is not lowered because the roller 480 was not moved upward, the opening 485 being of sufficient height to allow the rocking of the lever 484 without affecting the pin 1445.

As shown is Fig. 66 the center of the pin 451 is substantially on the horizontal line drawn through the center of the shaft 445. When the arm 466 is given its maximum movement from the "no check" position in Fig. 66 to a "stub check" position, this movement is practically 57 degrees. The cam 452 is so shown that in the "stub check" position there still remains a sufficient portion of the cam slot to permit of more than 60 degrees relative movement between the pin 451 and the cam 452. As the clockwise rocking of the shaft 455 is less than 45 degrees, the cam slot can never be disengaged from pin 451.

Coöperating with the detail strip and with the check paper is a platen for making an impression on the detail strip and one or more impressions on the check paper from the type wheels after they had been positioned in the manner heretofore described. As previously stated, the type wheels 277 are of a size to contain one set of type on the upper half of their periphery and another set of type on the lower half of their periphery. The impressions made on the detail strip and also on the check paper are taken by a platen from the set of type on the upper half of the periphery of the type wheels. It is always desired that an impression be made on the detail strip during every operation in order to have a listing of all transactions. It is also desired at times to issue a single check or a stub-check and in some instances to issue no check at all. As a consequence means is provided for insuring an impression upon the detail strip during every operation of the printing mechanism and two impressions, one impression, or no impression on the check paper determinable as to whether a stub-check, a single check, or no check is to be issued. From the above it is apparent that the platen for printing on the detail strip and the check paper and which will be hereinafter termed the "upper platen" operates in unity with the feed for the detail strip and also with the feed for the check paper. As was previously described, the rubber platen 362, referring to Figs. 5, 24, and 25, is mounted within a housing 361 carried by two parallel arms 360 which are integral with a sleeve 357 loosely mounted upon the shaft 358. Both the detail strip and the check paper pass between the platen 362 and the type wheels 277 and as a consequence when the platen is brought down against the type wheels impressions are made upon these two mediums by an ink ribbon as will be hereinafter explained in detail. The mechanism for rocking the platen 362 for making impressions both on the detail strip and the check paper together with the control therefore for determining at what time and how many impressions the platen shall make, will now be described. Secured to the sleeve 357 is an arm 488 which extends substantially parallel to the arms 360 and projects outwardly beyond the platen housing 361. Pivoted to the projecting portion of the arm 488 at the point 489 is the upper end of a link 490, the lower end of which (Fig. 30) is pivoted at 491 to a lever 492 which is fast upon a shaft 493 to which is also secured two spaced and projecting arms 494 (Fig. 31) which carry at their outer ends anti-friction rollers 495 coöperating with the plates 496 of a double plate cam which is secured to one end of a sleeve 497 loose upon the shaft 379. A Geneva plate 498 is secured to the other end of the sleeve 497 and is held in spaced relation from the Geneva plate 434 by a collar 499 loose upon the shaft 433 (Fig. 22). The notches 500 of the Geneva plate 498 are adapted to receive three pins 501, 502, and 503 which are carried by a disk 504 which is fast to the sleeve 1438 that carries the plate 438. As was previously described, the plate 438 is slid lengthwise of the shaft 242 either by the setting of the hand knob 440 or by the actuation of the automatic control which actuates the shaft 445 through the pin 1445. The sliding of the shaft 445 and the sleeve 1438 will at the same time slide the disk 504 a distance sufficient to position either the pin 502 or the pin 503 in the path of or, in other words, in the same vertical plane as the Geneva plate 498, the pin 502 being moved into this position or both this pin 502 and the pin 503 determinable upon how far the sleeve 1438 is slid. The pin 501 is of a length sufficient to always be in the path of the Geneva plate 498 whether the sleeve 1438 is slid or not. As a consequence the pin 501 will operate the Geneva plate 498 one step during every rotation of the shaft 242 and this rotation of the Geneva plate through the arms 494, shaft 493, lever 492, link 490, and lever 488 will rock the platen 362 clockwise against the type wheels 277. The rocking movement of the arms 494 is occasioned by the cam 496 and when the Geneva plate 498 is actuated by the pin 501 as above described, the cam 496 will cause first a clockwise movement of the platen 362 against the type wheels 277 and then a counter clockwise movement of the platen away from the type wheels. The movement of the platen 362 through the pin 501 occurs subsequent to the shifting of the detail strip so that the previous printed impression is beneath the platen and also subsequent to the feed of the detail strip so that the impression of the platen through the pin 501 will cause an impression to be made on the detail strip beneath the previous impression. Attention is again called to the fact that the pin 501 will engage the Geneva plate 498 although the sleeve 1438 has not been shifted. As a consequence when the platen 362 is actuated to make an impression upon the detail strip the check paper is not fed beneath the platen for the reason that neither of the pins 436 and 437 will engage the Geneva plate 434 for feeding the check paper. When, however, either through setting the hand knob 440 or through the automatic control of the shaft 445 through the pin 1445, the sleeve 1438 is slid to position the pin 436 in the same vertical plane as the Geneva plate 434, the pin 502 will at the same time be slid so as to be in the same vertical plane as the plate 498. When the parts are in these positions and the shaft 242 is rotated, the plate 438 through the pin 436 will actuate the Geneva plate 434 once to feed the check strip and during the same rotation of the shaft 242 the pins 501 and 502 will actuate the Geneva plate 498 two steps so that the platen 362 will be actuated twice. The first actuation of the platen 362 will cause an impression on the detail strip and the second impression thereof will cause an impression to be made upon the check paper which is fed just previous to the second impression of the platen 362 or in other words just previous to the impression of the platen 362 occasioned by the pin 502. By this it will be seen that when the sleeve 1438 is set in "check" position, the check paper is fed one step and the upper platen is given two actuations the first making an impression on the detail strip and the second an impression on the check paper. When the sleeve 1438 is slid so that both the pins 437 and 436 on the plate 438 are positioned in the same vertical plane as the Geneva plate 434 and the check paper receives two feeding actuations during one rotation of the shaft 242, during the same rotation of the said shaft, through the three pins 501, 503 and 502 the Geneva plate 498 is actuated three times which will cause three actuations of the platen 362, the first actuation making an impression on the detail strip and the two following actuations thereof causing two impressions to be made upon the check paper. The check paper however is fed alternately with the actuation of the platen 362 so that the impressions made upon the check paper are spaced a distance apart. Since the plates 438 and 504 are tied together by the sleeve 1438 they are always set together and commensurate with each other either through the manipulation of the sleeve 440 or through the automatic control through the shaft 445, pin 1445, and racks 266.

It is not desired that an impression should be taken from the date type wheels upon the detail strip and as a consequence the detail strip is made narrower than the check strip, there being no portion of the detail paper above the date type wheels. However it is both desirable and imperative that an impression should be taken from them upon the check paper. Since the detail strip is printed in advance of the check paper, and mechanism is provided for preventing that portion of the upper platen from engaging the ribbon above the date wheels, this portion of the platen only coöperates with the check paper. This mechanism is shown in normal rest position in Fig. 24 and will now be described. By referring to Fig. 37 it will be seen that the date type wheels 2781 are the four outermost type wheels mounted upon the shaft 276. The platen 362 is cut at the point 505 (Fig. 5) so that a small portion 506 thereof is separate from the remaining portion of the platen. This portion 506 is carried in a V shaped framework 507 (Fig. 24) to the upper end of which a plunger 508 is secured. Fig. 24 shows the portion 506 in effective position. The plunger 508 is vertically movable within an opening made in the platen housing 361, and is provided with a cut out portion 509 as shown in Fig. 24 within which the rounded end 510 of a lever 511 fits. The lever 511 is loosely mounted upon a shaft 512 carried at its ends in two parallel arms 360, the other end of the lever carrying an anti-friction roller 513 which fits within a cam slot 514 made in a lever 515 one end of which is bifurcated at 516 to receive the shaft 512 and is slotted at 517 to receive the shaft 358, the slot 517 permitting the lever 515 to be slid back and forth using the shaft 358 as a support but is normally in the position shown in Fig. 24. When the lever 515 is moved to the left the slot 514 will rock the arm 515 counter-clockwise thereby raising the portion 506 out of effective position. The lever 515 is provided with an arm 518 which has a vertical slot 519 therein to receive a pin 520 carried by the upper end of an arm 521 fast upon the outer end of a sleeve 522 which is loose upon a stud shaft 523 secured to one of the printer frameworks 261. Secured to the other end of the sleeve 522 is an arm 524 to which the upper end of a link 525 is pivotally connected, the lower end of the link being pivoted to the end of an arm 526 which is pinned to the shaft 379. Also pinned to the shaft 379 is an arm 527 (Fig. 58) the outer end of which carries an anti-friction roller 528 which fits within a cam groove 529 made in a cam 329 fast upon the printer drive line shaft 242. The cam groove 529 is so shaped that when the printing mechanism is in its normal home position through the lever 427, link 525, arms 524 and 521, the sliding arm 518 and lever 511 rocked thereby, the plunger 508 is held lowered so that the portion 506 of the platen is in alinement with the remaining portion of the platen 362. As soon as the operation of the machine begins the cam 329 is rotated counter-clockwise causing the roll 528 to ride down off of the high portion of the cam slot 529 thus rocking the shaft 379 counter-clockwise as viewed in Fig. 58. Counter-clockwise movement of the shaft 379 will move the arm 526 in a like direction and through the medium of the link 525 and arm 524 will also rock the shaft 523 and arm 521 counter clockwise. This movement of the arm 521 will, through the engagement of the pin 520 with the notch 519 affect a movement of the lever 515 to the left, and through the medium of slot 514 formed in said lever and the roll 513, rock the lever 515 counter-clockwise, thus elevating the portion 506 of the upper platen. This takes place prior to the time that the platen 362 is lowered to take an impression on the detail strip and occurs during the time of the adjustment of the type carriers to a position representing the set-up on the keyboard. As a consequence when the operation of the platen 362 takes place for printing on the detail strip, which occurs shortly after the machine begins its operation no portion of the platen will engage the ribbon above the date type wheels. When, however, the impression on the detail strip has been taken and before the platen 362 is rocked for making an impression on the check strip the cam groove 529 rocks the arm 527 so that, through the links and arms just mentioned, the arm 518 is slid to the right (as viewed in and to the position shown in Fig. 24) which movement through the slot 514 and anti-friction roller 513 will rock the rounded portion 510' of the lever 511 clockwise. The clockwise movement of the rounded portion 510 will move the plunger 508 downwardly so that the portion 506 of the platen 362 will be brought in the same horizontal plane as the remainder of the platen 362 so that when the said platen is operated to make an impression upon the check strip an impression will be taken from the date type wheels 278.

Shafts 414 and 418 which support the rubber feed rolls 416 and 412 are mounted at their outer ends eccentrically on disks 532 (Figs. 21^A and 21^B) which are rotatably mounted on a bracket 533. The bracket 533 is supported through the support given the inner ends of the shafts 418 and 414 where they fit within openings made in the innermost printer frameworks 261 and also by means of holes made therein to permit its resting upon the outer ends of the shafts 413 and 417 which support the two printing rolls. The bracket 533 is also provided with two arms 534 and 535 which have openings to permit their fitting on the outer end of shafts 536 and 537 supported at their inner ends by the innermost printer frameworks 261. The face of the plate or bracket 533 is provided with a slot 538 within which a lever 539 is slidably mounted this lever having openings 540 and 541 to receive the shafts 413 and 417. One end of the slide 539 carries a pin 542 which fits within a slot 543 made in a lever 544 pivotally mounted upon the bracket 533. The lever 544 is provided with a hand engaging member 545 by means of which the said lever may be oscillated. A spring pressed pawl 546 having its nose adapted to engage notches 547 made in the edge of the bracket 533 provides means for locking the lever 544 in its set positions. Movement of the lever 545 from the position shown in Fig. 21ᴮ to a position in which the pin 542 occupies the lower end of the horizontal portion of the slot 543 causes the slide 539 to be moved to the right a distance sufficient to disengage the edges of the openings 541 and 540 from notches (not shown) made in the shafts 413 and 417. When the slide 539 is so disengaged from the shafts 413 and 417 the bracket 533 together with the shafts 414 and 418 and the feed rolls mounted thereon may be entirely removed from the machine. When the lever 544 is moved from the position that it occupies in Fig. 21ᴮ to a position in which the pin 542 is at the extreme lower end of the substantially vertical portion of the slot 543, through the engagement of teeth 548 made on the lever 544 with the teeth 549 of the disks 532, the said disks have been rotated a distance sufficient to lift the feed rolls 416 and 412 out of engagement with the printing cylinders 411 and 415. The rollers 416 and 412 are lifted out of engagement with the printing cylinders for the reason that they are mounted eccentrically upon the disks 532, the rotation of the disks causing them to be moved toward or way from the printing rolls. The feed rolls 412 and 416 are moved away from the printing cylinders 411 and 415 to permit the threading of the check strip between them.

After the check strip 406 has been fed and printed upon by the platen 362 in the manner just described the knife 422 is actuated to sever the printed check from the strip so that it may be ejected from the machine. The knife 422 has already been briefly described as being in the form of a cylinder mounted within a cylinder 421. The knife 422 has its cutting edge 550 shaped as illustrated in Fig. 48. This edge it will be seen is shaped to have a high point at its center and one at each extreme edge, the blade sloping downwardly from the high spot 551 on each side to a low spot 552 and upwardly to a high spot 553 on each edge thereof. The cutting edge is so shaped for the reason that the low spots 552 will first pierce the paper and then the edges between these low spots and the high spots 551 and 553 will shear the paper allowing the cutting action to be more easy than should a knife of the stamping type be employed. Furthermore, should the knife 422 be given but a partial rotation the low spots would perforate the paper but not shear it entirely off. When a stub-check is to be printed as will be hereinafter explained the knife is rotated to merely perforate the check paper between the two impressions and shear it completely off after the second impression. The means for rotating the knife 422 comprises an arm 554 fast on the inner end thereof (Fig. 25) to the free end of which is pivoted the upper end of a link 555 the lower end of the link being pivoted at the point 556 to a lever 557 which is fast upon the shaft 430. Also fast upon the said shaft referring to Fig. 24 is an arm 558 to the lower end of which a link 559 is pivoted this link also being pivoted at 560 to one corner of a substantially triangular shaped lever 561 which is loose upon the shaft 379. The other two corners of the lever 561 carry anti-friction rollers 562 which rest upon the peripheries of two plates forming a double plate cam 563 which is fast upon the printer drive line shaft 242. The plates of the cam 563 are so shaped that the knife 422, through the lever 561, link 559, arm 558, lever 557, link 555, and arm 554 receives a rotation to move it sufficiently to engage the low spots 552 with the check paper if any is present and then rotate back to its normal position shown in Fig. 25. During the same operation of the shaft 242 the cam 563 causes a second rotation of the knife 422 which in this second instance is sufficient to cause a complete severance of the check paper if any is present within the knife. The paper is cut between the rotary knife edge 550 and a stationary knife edge 1560 (Figs. 25 and 49) carried by the cylinder 421. To repeat during every operation of the machine, or in other words during every rotation of the printer drive line shaft 242, the knife 422 receives a small rotation in a clockwise direction sufficiently to perforate the paper and subsequently another clockwise rotation which is sufficient to shear the paper entirely. The feeding mechanism for the check paper is so timed with the operation of the knife that if a single check is to be issued the feed of the check paper does not take place until after the first operation of the knife so that after the check is fed, the second operation of the knife will entirely sever it from the strip. Since in this instance, (that is when a single check is fed) the first and partial operation of the knife does not engage the paper whatever in this instance the knife may be said to idly rock. On the other hand, if the machine is set to issue a stub-check the check paper is fed half way previous to the first operation of the knife, as a consequence the first operation of the knife will perforate the paper. Following this perforating operation of the knife the check strip is fed a second time and after this second feeding thereof and after an impression has been made thereon by the platen 362 the knife 422 is operated a second time to entirely sever the check from the strip. In other words when a stub-check is to be issued the check is fed before each operation of the knife.

A stub-check of the type issued by this machine is illustrated in Fig. 61 in which it will be seen that the printed matter is duplicated upon the check and a partial severance or a perforation 564 is made between the two portions of the check. By means of the perforations or partial severance 564 the two portions of the stub-check may be separated and used as may be desired. It is to be understood that a single check would be one half the size of the stub-check illustrated in Fig. 61, since a single check issued by the machine would have been completely severed at the point 564.

After a check, whether it be a single check or stub-check has been printed and severed from the check strip by the knife, means is provided for ejecting it from the machine. This means comprises, referring particularly to Figs. 21ᴬ, 21ᴮ, 36, 37, 57, a sleeve 565 loosely mounted on the outermost sleeve of the type line and to the right of the ledger type wheels 285. A disk having teeth 566 on a portion of its periphery (Fig. 36) is secured to one end of the sleeve 565 and another disk having a segmental portion 567 is secured to the other end of the said sleeve. The segmental portion 567 has its peripheral edge knurled to coöperate with a knurled roller 568 revolubly mounted upon a stud shaft 569 carried by a bracket 570 which is secured to the innermost printer frameworks 261. Another disk 572 is loosely mounted upon the sleeve 281 and to the left of the date type wheels 2781 (Fig. 37). This disk has gear teeth 573 on a portion of its peripheral edge (Fig. 21ᴬ) and a segmental knurled portion 574 on another part of its peripheral edge. Meshing with the gear teeth 573 is a pinion 575 fast upon a shaft 576 supported by one of the printer frameworks 261. Also fast upon the shaft 576 is another pinion 577 (Fig. 36) meshing with the gear teeth 566. The pinion 575 (Figs. 21ᴬ and 21ᴮ) meshes with the teeth of a toothed segment 578 loosely mounted upon a stud shaft 579 carried by the innermost printer frameworks 261. A link 580, at one end is pivotally connected to the segment 578, at the point 581 and its other end is forked at 582 to surround the printer drive line shaft 242. The forked end 582 of the link 580 carries an anti-friction roller 583 which fits within a cam groove 584 made in a cam 585 fast upon the printer drive line shaft 242 (Fig. 57). At the proper time during an operation of the machine and previous to the time that the check strip 406 is fed the arm 580 through the anti-friction roller 583 and cam groove 584 in the cam 585 causes the link 580 to move the segment 578 counter clockwise. This movement through the pinions 575 and gear teeth 573 and 566 moves the two knurled portions 567 and 574 to the limit of their movement in a counter clockwise direction. When the parts are in this position the check strip 406 is fed to be both printed and severed. The feeding of the check strip projects it between the knurled segmental members 567 and 574 and their associated knurled rollers 568 and 586, the latter roller being mounted upon a stud shaft 587 carried by a bracket 359 (Fig. 21ᴬ). Both knurled portions 567 and 574 are provided with a flattened portion 588, which when the said portions have been actuated to the limit of their counter clockwise movement, will be positioned beneath the knurled rollers 568 and 586 to permit a space between the knurled segmental portions and the knurled rollers for the feeding of the check strip 406. Near the completion of the operation of the machine and after the check strip has been fed, printed, and severed, the link 580 through the cam groove 584 and anti-friction roller 583 is given a movement toward the right, as viewed in Fig. 21ᴮ, which will cause the segment 578 to be rocked clockwise. The clockwise movement of the segment 578 will, through the pinions 575 and 577, rock the knurled segmental portions 574 and 576 clockwise. Since the check is between these knurled segmental portions and the knurled rollers 568 and 586 the clockwise movement of the segmental portions will engage the check and eject it from the machine. Since the time permitted for the operation of this ejecting mechanism is very small and in order to insure a full movement of the link 580 within the time allotted to it a spring 589 (Figs. 21ᴬ and 21ᴮ) is stretched between a hook 590 formed on the lower end of the segment 578 and a downwardly extending arm 591 made integral with the link 580.

The printing mechanism herein has an impression device provided with means whereby it may be set to make either one or two impressions upon an inserted slip or other paper and the impression means is so controlled by the slip that should no slip be inserted in the machine the impression device would not be actuated. A feeding mechanism for the slip is also provided so that when the parts are set to make two impressions upon the slip these impressions will be spaced the desired distance apart. This mechanism for printing upon a slip or other paper inserted in the machine will now be described in detail. A horizontally disposed table 592 (Figs. 1 and 21ᴬ) is arranged beneath the type wheels 277, the table forming a support for the inserted slip or other paper while it is being printed.

A curved plate 593 is secured to a vertically disposed bracket 594 and provides means for directing the slip beneath the type-wheels when it is being inserted. The bracket 594 is supported by a cross bar 5940 (Fig. 21ᵃ) which is secured to the innermost printer frameworks 261. The table 592 is provided with an opening 5922 (Fig. 69) to receive a platen 595 (Figs. 24, 25 and 30) when the platen is moved upwardly by means hereafter to be described to force the inserted slip or other paper against the type-wheels 277. The platen 595 is mounted in a U shaped framework 596 carried by a U shaped housing 597 made integral with the end of two horizontally disposed arms 598 which are connected at their other ends by a sleeve 599 which is loosely mounted upon the shaft 493. The U shaped housing 597 (Fig. 30) is provided with a downwardly extended ear 601, to which, at the point 602 a link 603 is pivoted, the other end of the link being pivoted at 604 to another link 605 which in turn is pivoted upon a pin 606 carried by the forward end of a lever 607 which is loosely mounted upon the shaft 493. The arm 607 extends to the left, as viewed in Fig. 30, beyond its pivotal connection with the shaft 493 to form an arm 608 which is forked to form two arms 609 each of which carry at their outer end an anti-friction roller 610. The rollers 610 coöperate with the peripheries of two cam plates 611 which together form a double plate cam, that is secured to one end of a sleeve 612 (Fig. 22) loosely mounted upon the shaft 379. The other end of the sleeve 612 carries a Geneva plate 600. With the notches 6001 of the Geneva plate 600 (Fig. 30), two pins 613 and 614 carried adjacent the periphery of a disk 615 fast upon a sleeve 616 splined upon the printer drive line shaft 242 are adapted to coöperate. The sleeve 616 is adapted to be slid back and forth upon the shaft 242 so as to position the pin 613 in the same vertical plane as the Geneva plate 600, or to move it out of such position. The pin 614 is of a length to always be in the same vertical plane as the Geneva plate 600 irrespective of whether or not the plate has been shifted to position the pin 613 in the path of or in the same vertical plane as the said Geneva plate. When the parts are in the position shown in Figs. 22 and 30 and the machine is operated, the plate 615 will be rotated by the rotation of the shaft 242, and the two pins 613 and 614 will engage the Geneva plate 600 to move it two steps. The two steps of movement of the Geneva plate 600 will actuate the plate cam 611 to rock the lever 608 up and down twice. Each upward movement of the lever 607 through the links 605, 603 and ear 601 of the platen housing 597 will lift the platen 595 against the type wheels 277.

An upward movement of the lever 607 will lift the platen 595 as just described for the reason that the two links 603 and 605 are held in substantial direct alinement by a spring 622 hereafter to be described and hence will move together as a substantially solid piece. These links are normally in the position, illustrated in Fig. 30, and are only shifted from this normal position when no slip is inserted upon the table 592 as will be hereinafter explained. In order to keep the links 603 and 605 in substantially direct alinement irrespective of the character or thickness of the paper which is to be printed upon, a pawl 617 is pivotally mounted upon a pin 618 carried by the lever 607. This pawl is provided at its upper end with a cam surface 619 which engages the pin 604, the lower end of the pawl being provided with a screw 620 projecting through a slot 621 made in the lever 607 so that by moving the screw 620 within the slot 621 the cam surface 619 of the pawl 617 may be forced against the stud 604 to move it a distance sufficient to correctly aline the links 603 and 605. A coil spring 622 stretched between the stud 604 and a pin held by the lever 607 holds the stud 604 in contact with the cam surface 619 so that normally the links 603 and 605 are in alinement.

The means for sliding the sleeve 616 so as to position or remove the pin 613 from the path of the Geneva plate 600 so that either one or two impressions may be made by the platen 595 comprises, referring to Figs. 22, 44 and 45 an annular groove 623 made in the forward end of the sleeve 616 within which the bifurcated and vertically extending portion 624 of an arm 625 fits. The arm 625 extends forwardly and is provided with a slot 626 receiving a pin 627 carried by the top edge of the front printer framework 261. The pin 627 and slot 626 insure a straight reciprocation of the arm 625 when it is slid back and forth. The arm 625 projects forwardly beyond the front printer framework 261 and carries a downwardly extending pin 628 which fits within a spiral groove 629 (Fig. 44) made upon the periphery of the drum 460. When the drum 460 is rotated, the slot 629 engages the pin 628 and moves the arm 625 in and out, which movement through the bifurcated end 624 of the arm and the slot 623 in the sleeve 616 slides the plate 615 to move the pin 613 in or out of the same vertical plane as the Geneva plate 600. The means for moving the drum 460 as just described comprises a sleeve 630 (Fig. 44) surrounding the drum 460 and having a slot 631 which receives a pin 632 carried by the drum 460. A coil spring 633, compressed between a shoulder formed on the outer edge of the hub 460 and a shoulder made in the sleeve 630, normally holds the inner face of the sleeve 630 against the bracket 461. This bracket carries a pin 634 which is adapted to fit within either of two recesses 635 made adjacent the peripheral edge of the inner face of the sleeve 630. The sleeve 630 has its outer surface knurled to provide means whereby it may be rotated by hand after it has been moved lengthwise of the drum 460 a distance sufficient to disengage the pin 634 from the recess 635 within which it may happen to be fitting. The slot 631 and pin 632 are provided as a connecting means between the drum 460 and the sleeve 630 for the reason that the said sleeve 630 may be moved outwardly to disengage the pin 634 from the recesses 635 without disengaging the driving connection between the drum 460 and the sleeve 630. Inscribed upon the knurled portion of the sleeve 630 and spaced apart thereon are the words "One print" and "Two print." These indicate the position to which the sleeve 630 should be turned to slide the arm 625 a distance sufficient to position the pin 613 in or out of the same vertical plane as the Geneva plate 600. It is, of course, understood that when the inscription "One print" is on top of the drum 460, the pin 613 is not in the same vertical plane as the Geneva plate 600, but when the words "Two print" is moved to a position on top of the drum 460 the pin 613 has been moved into the same vertical plane as the Geneva plate 600. The two recesses 635 are so positioned that when the sleeve 630 is turned in either the "one print" or "two print" position, it may be permitted to move inwardly under action of the spring 633 until the pin 634 fits within one of the recesses 635 to hold the drum 460 in its set position. The ends of the spring 633 are connected, one to the drum 460, and the other to the sleeve 630, so that turning of the sleeve will place the spring under tension. This spring normally will, when permitted to exert its torsional effect on the sleeve 630, return the sleeve to its "one print" position. It will be noted that the automatic control feature which is used in connection with the check strip has no connection with the sliding of the sleeve 616 to position the plate 615. The only means for sliding the sleeve 613 is the manually operated sleeve 630.

Mechanism is provided for preventing any operation of the platen 595 when no slip is present upon the table 592. This means comprises, referring to Figs. 21ᴬ and 21ᴮ a vertically disposed feeler arm 636 which is adapted to project through an opening 5920 (Fig. 69) in the table 592 so as to come into engagement with the under side of a slip placed upon the table. The feeler arm 636 is carried by one end of a bell crank lever 637 loosely mounted upon the shaft 493. The other arm 638 of the bell crank 637 extends downwardly and has pivoted thereto at 655 one end of a link 639. The other end of the link 639 is pivoted at 640 to an arm 641 fast upon the outer end of a shaft 642 carried within the parallel printer framework 261.

Also pivoted to the lower end of the arm 638 at the point 655 is a link 656 which extends to the left, as viewed in Fig. 24, and is curved at 6561 to straddle the printer drive line shaft 242. Mounted upon the portion 6561 is an anti-friction roller 6562 which is held upon the periphery of a cam 6571 fast upon the shaft 242 by a spring 643 stretched between the arm 638 and a stud 644 carried by the outer printer framework 261. At the proper time during the operation of the machine and previous to the operation of the platen 595 the cam 6571 is rotated to move its high point away from the roller 6562 carried by the link 656 and thereby permitting the said link and lower end of the lever 638 to be moved toward the right, as viewed in Figs. 21ᴬ and 21ᴮ, under the action of the spring 643. This movement of the arm 636 will cause the other arm 637 of the bell crank and the feeler arm 636 to be rocked counter clockwise and lift the upper end of the said feeler arm through the opening 5920 in the table 592. If a slip or other paper is present upon the said table the feeler arm will be stopped thereby and held in engagement with the lower surface thereof by the spring 643. If, however there is no slip present upon the table 592 the feeler arm 636 will be rocked upwardly by the spring 643 to the limit of its clockwise movement as determined by the cam 6571. This action of the feeler arm 636 will, through the arm 638, link 639 and arm 641 rock the shaft 642 counter clockwise, so that a pin 657, (Fig. 30) carried by the upper end of an arm 658 fast on the shaft 642 will be rocked into the path of a projecting arm 659 made integral with the link 605. When the parts are in this position and the lever 607 is actuated to lift the platen 595 to make an impression, the projecting arm 659 of the link 605 will engage the pin 657 and cause the said arm to be rocked clockwise thereby breaking the toggle between the lever 607 and the ear 601 of the platen housing 597, this toggle comprising the links 605 and 603. When the toggle is broken as just described the movement of the lever 607 is taken up by the clockwise rocking of the link 605 and the platen housing 597 receives no actuation. When a slip is present upon the table 592 the shaft 642 is not rocked and as a consequence the pin 657 will not provide an interference for the arm 659 and the toggle comprising the links 605 and 603 will not be broken.

Means is provided for printing a character on the detail strip to indicate during what operation a slip was present in the machine and during what operations no slip was inserted in the machine. This character is a letter "S" which is printed alongside the consecutive number as is shown in the last impression made upon the detail strip illustrated in Fig. 62. When this letter "S" has been printed upon the detail strip the operator knows that during this particular operation of the machine a slip was printed. Where, however, the letter S does not appear the operator knows that during these particular operations no slip was present in the machine. By referring to Fig. 62 it will be seen that only the tenth operation was one in which a slip was inserted in the machine which is indicated by the presence of the letter "S" printed to the right of the consecutive numbers. The means for printing the letter "S" on the detail strip when a slip was printed during the registering operation and to prevent the printing of the "S" when no slip was present in the machine will now be described. Fast upon the shaft 642 (Fig. 26) is a downwardly extending arm 661 to which one end of a link 662 is pivotally connected. The other end of the link 662 is pivoted at 663 to an arm 664 fast upon a shaft 665 supported within the parallel printer frameworks 261. Also fast upon the shaft 665 is an upwardly extending member 666 whose peripheral edge is segment shaped and provided with a single tooth 667 which coöperates with a notch 668 made in a horizontally disposed link 669 reciprocatably mounted upon studs 670 (Fig. 26) carried by the back face of the printer framework 261. The link 669 is slotted at 671 where it fits over the studs 670 to permit a reciprocation of the said link. The left end of the link 669 is provided with a pin 672 which is flattened, the pin being so positioned that when the link 669 is in the position illustrated in Fig. 26 the flattened portion thereof will be in the same horizontal plane as the upper edge of the rack 266 which is associated with the amount type wheel of highest denomination. The hook lever 1242 for the rack teeth 266 associated with the amount type of highest denomination is formed with a flange 2242 shown in dotted lines in Fig. 26 which flange is turned toward the rear of the machine. When the flattened stud 672 is in the position shown in Fig. 26 and the hook lever 1242 is lowered, the flange 2242 will strike the flattened portion of the stud so that when the hook lever is moved to the left in said figure, the hook will not engage in the notch 1243. Consequently the rack 266 of highest denominational order will not be moved. The parts are shown in their positions in Fig. 26 that they would occupy when a slip was present upon the table 592, in which case the shaft 642 is not rocked and as a consequence the links 662 and 669 would not be moved but would occupy what may be termed a normal position. The amount type wheel 277 of highest denomination is provided with a letter "S" on its zero position. That is, that portion of the type wheel which would normally be provided with a zero is instead of a zero provided with the letter "S". This however is only true of the set of type upon the upper half of the periphery of the type wheel. It will be remembered that during every operation of the machine the "zero elimination mechanism" comprising the notches 1243 in the racks 266 and the hook levers 1242 are operated so as to move all of the racks 266 to the left of the rack of the highest denomination of the number to be printed out of their zero position into their non-print position. Remembering now that the parts are in the position shown in Fig. 26 when a slip is present within the machine, when the arm 1242 associated with the rack 266 which controls the amount type wheel of the highest denomination is operated, the said hook lever can not engage the hook 1243 of the rack 266 to move it backward as the flange 2242 thereof will engage the flattened portion of the pin 672 and slide thereupon. As a consequence the movement of the hook lever 1242 will not actuate the rack 266 so that it will move its type wheel into non print position. It will on the contrary leave the type wheel associated with this rack in its zero position in which position the letter "S" will be printed. However, if no slip is present in the machine the shaft 642 will be rocked through the mechanism previously described so that, through the link 662, arm 664, pin 665 and lever 666, the link 669 will be moved to the right, as viewed in Fig. 26, so that the pin 672 will be moved to the right a distance sufficient to pass from beneath the flange 2242 and thereby allow the hook lever 1242 to engage the notch 1243 in the rack 266 and move it from its zero to its non print position during the operation of the machine. From this it will be seen that when no slip is present on the table 592 the pin 672 does not set up an interference for the hook lever 1242 but said lever may at this time engage the rack 266 associated with the type wheel of highest denomination to move it from its zero position to its non print position. When the type wheel has been so moved an "S" will not be printed on the detail strip and as a consequence this will indicate that no slip was present in the machine during the operation thereof.

Mechanism has previously been described which is for the purpose of causing one or two impressions to be made by the platen 595 upon a slip or other paper inserted and resting upon the table 592. Since two impressions may be made upon the slip inserted, means must be provided for feeding the slip so that these impressions will be spaced apart. This mechanism, referring to Fig. 25, comprises a knurled feed roller 674 rotatably mounted upon a stud shaft 675 carried by one corner of a lever 676 which is loosely mounted upon the shaft 493. An arm 677 integral with the lever 676 and projecting toward the left, as viewed in Fig. 25, carries on its end an anti-friction roller 678 which coöperates with the periphery of a cam 679 fast upon the printer drive line shaft 242. A spring 1676 stretched between a stud 1677 carried by an arm 1678 integral with the lever 676 and a stud 1679 carried by the innermost printer framework 261 serves to normally rock the lever 676 clockwise and hold the anti-friction roller 678 carried by the arm 677 against the periphery of the cam 679. At the proper time during the operation of the machine the cam 679 engaging the anti-friction roller 678 rocks the arm 677 counter clockwise. This movement of the arm 677 will rock the lever 676 counter clockwise and thereby move the feed roller 674 into contact with the lower surface of a slip resting upon the table 592. The table is provided with a slot 5921 (Fig. 69) to permit the engagement between the feed roller 674 and the slip. Coöperating with the feed roller 674 is a small knurled feed roll 680 rotatably mounted upon a stud 681 carried by the left hand end of a lever 682 loosely mounted on the shaft 1282. A link 683 has its upper end pivoted to a lever 682 and its lower end provided with a slot 684 surrounding a stud 685 projecting from the innermost printer framework 261. The stud 685 and slot 684 permit a reciprocation of the link 683 vertically. A coil spring 686 stretched between the stud 685 and a pin 687 carried on the lower end of the link 683 tends to draw the said link upwardly to the limit of its movement thereby rocking the lever 682 counter clockwise and pressing the feed roller 680 against the upper face of a slip placed upon the table 592. It is to be understood that when the lever 676 is rocked counter clockwise and the lever 682 rocked in the same direction a slip upon the table 592 is clamped between the rollers 674 and 680 carried by these two levers. Means is provided for normally holding the feed roller 680 above the table 592 so that a slip may be inserted beneath this feed roller. This means comprises an arm 688 fast upon the shaft 322 and engaging the pin 687 carried by the lower end of the link 683. The parts are in their normal position as illustrated in Fig. 25 in which the arm 688 engages the pin 687 and thereby holding the link 683 to the limit of its downward movement so that the feed roller 680 is raised above the table 592. When however, the machine is operated the shaft 322 receives a counter clockwise oscillation through the link 325 (Fig. 24) as was previously described. When the shaft 322 is rocked counter clockwise the arm 688 is lifted off of the pin 687 so that the link 683 is free to move upwardly under the influence of the spring 686 to engage the roller 680 with the surface of a slip placed upon the table 592. After the feed rollers 680 and 674 are brought in contact with the upper and lower surface of a slip upon the table 592 in the manner just explained, means is provided for rotating the feed rollers 674 at the proper time during the operation of the machine in order to feed the slip. This means, referring to Fig. 25, comprises a pinion 689 fast to the side of the feed roller 674, the teeth of which mesh with the teeth of a segment 690 loosely mounted upon a pin 691 carried by another corner of the lever 676. The segment 690 is provided with an elongated slot 692 within which a pin 693 is reciprocatably mounted. The pin 693 is clamped within a slot 694 formed in a downwardly extending portion 695 of a lever 696 loosely mounted upon a stud 697 carried by the lever 676. The lever 696 carries a stud 1697 to which one end of a link 698 is pivoted. This link extends to the left as viewed in Fig. 25, and has its other end forked so as to straddle the printer drive line shaft 242. An anti-friction roller 699 is carried by the bifurcated end of the link 698, which roller fits within a cam groove 700 made in the cam 585 which is fast upon the printer drive line shaft 242. At the proper time during the operation of the machine the shaft 242 rotating the cam 585, through the cam slot 700, anti-friction roller 699 and link 698, gives the lever 696 a counter clockwise rotation about its pivot 697. This movement of the lever 696 through the engagement of the pin 693 carried thereby with the slot 692 made in the segment 690 will oscillate the said segment clockwise whereby the pinion 689 will rotate the feed roller 674 to feed the slip with which it is in engagement toward the left as viewed in Fig. 25. The length of the feed caused by the roller 674 may be adjusted by moving the position of the pin 693 in the slot 694. As illustrated in Fig. 25 the segment 690 will be given the limit of its possible movement and this actuation of the segment 690 may be shortened by moving the pin 690 upwardly within the slot 694. From the foregoing it will be seen that when a slip has been placed upon the table 592, at the proper time during the operation of the machine, the feed rollers 680 and 674 are brought in contact with the upper and lower surface of the said slip respectively, after which the feed roller 674 is driven through the pinion 689 in a counter clockwise direction and thereby feeding the slip toward the left as viewed in Fig. 21ᴬ. It is to be understood that the cams are so timed that the feed of the slip occurs between the two impressions of the platen 595. This operation of the feed rollers 680 and 674 will occur whether or not a slip is present upon the table 592 and also whether or not the sleeve 630 is set to its "one print" or "two print" position.

A slip of the type printed by this machine is illustrated in Fig. 63 in which it will be seen that the slip has received two impressions along the upper end thereof, the original sheet of the slip being shorter than the carbon sheet to permit the exposure of the latter to the platen 595.

It will be remembered that during the time in which a slip is present upon the table 592 the feeler arm 636 (Fig. 21A) is held against the lower surface thereof by means of the spring 643. When the feed roll 674 is operated to feed a slip, means is provided for lowering the feeler arm 636 out of contact with the slip on the table 592 so that there will be no interference presented when the slip is fed which would otherwise be the case should the feeler arm 636 be in engagement with the lower surface thereof at the time the feed roller 674 was operated. The means for lowering the feeler arm 636 comprises, referring to Fig. 21A an arm 702 fast upon the outer end of the shaft 322. When this shaft is rocked counter-clockwise as previously explained to operate the consecutive number pawl and also the link 683 for permitting the lowering of the feed roll 680, a rearwardly extending portion 703 of the arm 702 engages a hook 704 made on the lower end of the feeler arm 636 and holds the said feeler arm 636 out of contact with the lower surface of the slip during the time in which the slip is fed.

An ink ribbon is passed around the type wheels mounted upon the shaft 276 so that it is positioned between the type upon the type wheels and the two platens 362 and 595. Referring to Fig. 25, the ink ribbon 705 is continuous and passes over guard rods 706 and 707 carried by the innermost printer framework 261, bracket guides 708 which position the ribbon between the platen 362 and the type wheels, and around an ink roller 709 rotatably mounted upon a stud shaft 710 carried by the innermost printer framework 261. Where the ribbon 705 passes from the ink roll 709 to the guard bar 706 it is positioned above the platen 595 and beneath the type wheels mounted upon the shaft 276. Means is provided for feeding the ribbon, which comprises a ratchet 711 fast upon the shaft 710 coöperating with the teeth of which is a spring pressed pawl 712 pivoted to an arm 7121 which is pivoted to the left hand end of a link 713 which is pivoted at 714 to the lever 318. When the lever 318 is actuated to feed the consecutive number pawl the link 713 is moved toward the left which causes the pawl 712 to feed the ratchet 711 one step, the feeding of the ratchet through the ink roller 710 feeding the ink ribbon 705 also one step. A roller 715 (Fig. 21A) rotatably mounted upon a shaft 716 carried by parallel arms 717 which are pivoted upon a shaft 718 carried by the innermost printer framework 261, is held in engagement with the upper surface of the ribbon 705 by a spring (not shown) so that a tension is placed upon the said ink ribbon in the usual and well known manner. Ink rollers 719 and 720 (Fig. 25) rotatably mounted upon stud shafts 721 and 722 roll against the printing cylinders 411 and 415 respectively for engaging and inking the electros carried thereby.

*Operation.*

Let us assume now that cashier No. 2 inserted his key in one of the locks 741 and has turned it so that the key 10 may be depressed to release the machine. Let us also assume that previous to the depression of the key 10 certain of the amount keys 3 have been pressed, the key marked "Boys" in the department bank has been depressed, the key of the transaction bank marked "Cash" has been depressed and the clerk's key "A" in the clerk's key bank has been depressed. Now let us also assume that the ledger type wheels have been set by the manipulation of the hand knobs 297 and that the sleeves 440 and 630 have been set to their "stub-check" and "two print" position. The depression of the cashier's key 10 releases the machine so that the main drive shaft 100 may be actuated by means of the crank handle 1 or by an electric motor. If an electric motor is applied to the machine it is understood that the depression of the cashier key 10 to release the machine also operates a switch to turn the current to the electric motor. The operation of the drive shaft 100 turns the segments 114 counter clockwise, as viewed in Fig. 4, until the latches 122 are broken either upon a zero stop pawl 22 or upon the shanks of the depressed keys. Simultaneous with the counter clockwise rotation of the segments 114, through the links 127, the sleeves 133 are positioned to set the indicators commensurate with the keys depressed and at the same time through the said beams, arms 128, segments 130, and gears 259, the printer racks 266 are also set commensurate with the keys depressed. While the indicators and printer racks are being set as just described by means of links 156 (Fig. 55) the cams 152 are oscillated to slide the brackets 138 which carry the sleeve 137 supporting the totalizer wheels 112. At about the same time the brackets 138 and totalizer wheels 112 are being shifted to select totalizers commensurate with the keys depressed, through the links 171 (Figs. 19, 70ᴬ and 70ᴮ) the plates 168 and 169 are set commensurate with the keys depressed so that their peripheries will determine through the medium of the pins 167 which of the counter lines will be rocked into engagement with the teeth 110 which are positioned through the actuation of the segments 114 commensurate with the keys depressed. After the selected totalizers have been rocked into mesh with the teeth 110 and during the time in which the said selected totalizers are accumulating the amount set up on the key banks through the return of the gear teeth 110 to their home positions, the printer drive line shaft 242 through the gears 246 and 247 (Fig. 50) is being actuated. This operation of the printer drive line shaft 242 will through the lever 356 (Fig. 24) space the detail strip and through the lever 386 (Fig. 25) and cams associated with these levers feed the detail strip so that an impression will be made beneath the impression made thereupon by the preceding operation of the machine. The actuation of the printer drive line shaft 242 through the plate 438 (Fig. 32) and the Geneva plate 434 moves the check paper two spaces for issuance of a stub-check. The upper platen 362 is actuated twice through the medium of the plate 504 and Geneva plate 498 (Fig. 31) to make two impressions upon the check paper. After the printing of the check paper has taken place the knife 422 through the lever 567 is operated twice during the rotation of the printer drive line shaft 242 to first partially sever the said check and then completely sever it from the check roll. Substantially at the same time the said check is being printed by the upper platen 362 the slip which is present upon the platform 592 receives two impressions from the lower platen 595 through the medium of the plate 615 and Geneva plate 600 (Fig. 30). The slip, however, is fed between the impressions made by the lower platen 595 by means of the feed roller 674 (Fig. 25) which is actuated by the segment 690. Following these operations the printed and severed stub-check is ejected from the machine by the actuation of the segment 578 pinions 575 and knurled segmental portions 574 and 567 (Figs. 21ᴬ and 36).

When the total lever 7 is set to total or re-set position the automatic selection of the counter lines through the plates 168 and 169 is crippled and the counter line is selected for engagement with the set differential mechanism by the movement of the total lever 7 itself. The other functions of the registering part of the machine during this total taking operation are the same as that described in the Fuller application herein before mentioned and as a consequence a repetition of this operation will not be given herein.

During a total taking operation the actuation of the printer is the same as during an adding operation except however that the setting of the total lever through the link 255 and arm 257 disconnects the printer drive line shaft 242 from the main register drive shaft 100 so that during the first cycle of the registering mechanism during the total taking operation the printer is not driven. However, during the second operation of the registering mechanism during which time the printer racks 266 are set, the connection between the printer drive line shaft 242 and the main register drive shaft 100 is restored so that during the second cycle of the operation of the register, the printing mechanism is operated in the same manner as was described in connection with its actuation during an adding operation of the register.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:—

1. In a machine of the class described, the combination of a single group of type carriers, a main operating mechanism, means operated by the main operating mechanism for moving said type carriers differentially, manipulative means controlling the extent of movement of the differential means, and means operated by the main operating mechanism for taking a single impression upon a detail strip, and a check, and a double impression upon a slip from said group of type carriers during an operation of the main operating mechanism.

2. In a machine of the class described, the combination of a plurality of type carriers, a main operating mechanism, means operated by the main operating mechanism for moving the type carriers differentially, manipulative means controlling the extent of movement of the differential means, printer control means, and means operated by the main operating mechanism for taking an impression upon each of three printing mediums during an operation of said operating mechanism, one of which is always a single impression while the other two may be double impressions at will under the influence of the printer control means.

3. In a machine of the class described, the combination of a plurality of type carriers, a main operating mechanism, means operated by the main operating mechanism for moving the type carriers differentially, manipulative means controlling the extent of movement of the differential means, printer control means, and impression means actuated by the main operating mechanism for taking an impression upon one printing medium and one impression upon each of two other printing mediums in accordance with the printer control position, said single impression on said other two printing mediums being varied at will under the influence of the printer control means to become other than a single impression.

4. In a machine of the class described, the combination of a plurality of type carriers, a main operating mechanism, means operated by the main operating mechanism for moving the type carriers differentially, manipulative means controlling the extent of movement of the differential means, printer control means, and means operated by the main operating mechanism for taking at certain times one impression and at other times more than one impression upon each of two printing mediums during an operation of the main operating mechanism under the influence of the printer control means.

5. In a machine of the class described, the combination of a single group of type carriers, a main operating mechanism, means operated by the main operating mechanism for moving said type carriers differentially, manipulative means controlling the extent of movement of the differential means, and means operated by the main operating mechanism for taking a single impression upon each of two printing mediums from one side of the type carriers, and a double impression upon another printing medium from the opposite side of the said type carriers, during an operation of the main operating mechanism.

6. In a machine of the class described, the combination of a plurality of type carriers having duplicate sets of type, a main operating mechanism, means operated by the main operating mechanism for moving the type carriers differentially, manipulative means controlling the extent of movement of the differential means, a printer control member, and means operated by the main operating mechanism for taking an impression upon each of two printing mediums from one set of type and sometimes two impressions on one of said printing mediums determined by the position of the printer control member, and for taking two impressions from the other set of type during an operation of the main operating mechanism.

7. In a machine of the class described, the combination of a single group of type carriers, a main operating mechanism, means operated by the main operating mechanism for moving said type carriers differentially, manipulative means controlling the extent of movement of the differential means, and means operated by the main operating mechanism for taking a single impression upon a detail strip and a check, and a double impression upon a slip, all impressions being taken from the single group of type carriers.

8. In a machine of the class described, the combination of a single group of type carriers, a main operating mechanism, means operated by the main operating mechanism for moving said type carriers differentially, manipulative means controlling the extent of movement of the differential means, means operated by the main operating mechanism for taking impressions from the single group of type carriers upon three printing mediums of which one always receives a single impression while the others may receive a plurality of impressions, and manipulative means for controlling the number of impressions on said other mediums.

9. In a machine of the class described, the combination of a plurality of type carriers, a main operating mechanism, means operated by the main operating mechanism for moving said type carriers differentially, manipulative means controlling the extent of movement of the differential means, printer control means, means actuated by the main operating mechanism for taking one impression upon one printing medium and at will under the influence of the printer control means a single impression upon a plurality of other printing mediums, said printer control means being adjustable and thus influencing the printing upon said other printing mediums so that in each case the number of impressions changes from unity to a plurality of impressions.

10. In a machine of the class described, the combination of a plurality of type carriers having duplicate sets of type, a main operating mechanism, a printer control member, means operated by the main operating mechanism for taking an impression upon each of two printing mediums from one set of type when the printer control member is in normal position and for taking an impression upon another printing medium from the other set of type carriers, the impression upon one of the first mentioned printing mediums never varying in number while the number of impressions upon the other of the first mentioned printing mediums is more than one when the printer control member is moved out of normal position.

11. In a machine of the class described, the combination of a plurality of type carriers, a main operating mechanism, means operated by the main operating mechanism for moving the type carriers differentially, manipulative means controlling the extent of movement of the dfferental means, two impression devices coöperating with the type carriers for taking an impression upon a plurality of printing mediums, and means controlled by one of the printing mediums for crippling its respective impression device when there is no printing medium present to receive an impression therefrom and for simultaneously controlling the adjustment of one of said type carriers.

12. In a machine of the class described, the combination of a single group of type carriers, a main operating mechanism, means operated by the main operating mechanism for moving said type carriers differentially, manipulative means controlling the extent of movement of the differential means, two impression devices coöperating with said type carriers, means for feeding two printing mediums across one impression device, and means for feeding one printing medium across the other impression device and means for varying the number of impressions on some of said printing mediums while on one printing medium the number of impressions is not varied.

13. In a machine of the class described, the combination of a plurality of type carriers, a main operating mechanism, means operated by the main operating mechanism for moving the type carriers differentially, manipulative means controlling the extent of movement of the differential means, printer control means, two impression devices coöperating with said type carriers, and means under the influence of the printer control means causing the impression devices to change at will from their single printing operation to a plurality of operations during an operation of the main operating mechanism.

14. In a machine of the class described, the combination of a plurality of type carriers, a main operating mechanism, means operated by the main operating mechanism for moving the type carriers differentially, manipulative means controlling the extent of movement of the differential means, printer control means, two impression devices coöperating with said type carriers, and means under the influence of the printer control means for actuating the impression devices so that they shall print a corresponding number of times and at other times they shall print a different number of times, one printing singly and the other printing doubly and the reverse.

15. In a machine of the class described, the combination of a plurality of type carriers, a main operating mechanism, means operated by the main operating mechanism for moving said type carriers differentially, manipulative means controlling the extent of movement of the differential means, a plurality of impression devices coöperating with said type carriers, a plurality of paper feeding mechanisms, said impression devices and feeding mechanisms being actuated a variable number of times during one operation of the main operating mechanism and means for determining the number of operations to be given said impression devices.

16. In a machine of the class described, the combination of a plurality of type carriers, a main operating mechanism, means operated by the main operating mechanism for moving the type carriers differentially, manipulative means controlling the extent of movement of the differential means, a printer control member, a plurality of impression devices coöperating with said type carriers, a plurality of paper feeding mechanisms, said impression devices and feeding mechanisms being actuated during an operation of the main operating mechanism, and means for controlling one of said impression devices whereby under the influence of the printer control member it may be actuated the same as the other impression device and at will be varied to print a plurality of times while the other impression device is printing only once.

17. In a machine of the class described, the combination of a plurality of type carriers, a main operating mechanism, means operated by the main operating mechanism for moving said type carriers differentially, manipulative means controlling the extent of movement of the differential means, a plurality of impression devices coöperating with said type carriers, a plurality of paper feeding mechanisms, said impression devices and feeding mechanisms actuated during an operation of the main operating mechanism, and means for controlling one of the feeding mechanisms and one of the impression devices whereby they may be actuated at times the same as the other feeding mechanism and at other times may be actuated differently regardless of changes of the first feeding mechanism from single to multiple actuation.

18. In a machine of the class described, the combination of a plurality of type carriers, a main operating mechanism, means operated by the main operating mechanism for moving said type carriers differentially, manipulative means controlling the extent of movement of the differential means, two impression devices coöperating with said type carriers, and means controlled by the paper to be printed for determining whether one of said impression devices will be operated during an actuation of the main operating mechanism and for simultaneously controlling the adjustment of one of said type carriers whereby an impression will be taken therefrom by the other impression means.

19. In a machine of the class described, the combination of a plurality of type carriers, a main operating mechanism, means operated by the main operating mechanism for moving said type carriers differentially, manipulative means controlling the extent of movement of the differential means, an impression device coöperating with said type carriers, automatic means controlled by said manipulative devices for determining whether the said impression device will be actuated once or a plurality of times during one operation of the main operating mechanism.

20. In a machine of the class described, the combination of a plurality of type carriers, a main operating mechanism, means operated by the main operating mechanism for moving said type carriers differentially, manipulative means controlling the extent of movement of the differential means, a plurality of impression devices coöperating with said type carriers, automatic means controlled by said manipulative devices for determining whether one of said impression devices will be actuated once or a plurality of times during an operation of the main operating mechanism.

21. In a machine of the class described, the combination of a plurality of type carriers, a main operating mechanism, means operated by the main operating mechanism for moving said type carriers differentially, manipulative means controlling the extent of movement of the differential means, a plurality of impression devices coöperating with said type carriers, a plurality of paper feeding mechanisms, automatic means controlled by said manipulative devices for determining whether one of said impression devices and one of said paper feeding mechanisms will be actuated once or a plurality of times during an operation of the main operating mechanism.

22. In a machine of the class described, the combination of a plurality of type carriers, a main operating mechanism, means operated by the main operating mechanism for moving said type carriers differentially, manipulative means controlling the extent of movement of the differential means, a plurality of impression devices coöperating with said type carriers, a plurality of paper feeding mechanisms, automatic means controlled by said manipulative devices for determining whether one of said impression devices and one of said paper feeding mechanisms will be actuated once or a plurality of times during an operation of the main operating mechanism.

23. In a machine of the class described, the combination of a plurality of type carriers, a main operating mechanism, means operated by the main operating mechanism for moving said type carriers differentially, manipulative means controlling the extent of movement of the differential means, two impression devices coöperating with said type carriers, and manually set means for controlling one of said devices whereby it may be actuated once or a plurality of times during one operation of the main operating mechanism.

24. In a machine of the class described, the combination of a plurality of type carriers, a main operating mechanism, means operated by the main operating mechanism for moving said type carriers differentially, manipulative means controlling the extent of movement of the differential means, two impression devices coöperating with said type carriers, and manually set means for controlling both of said devices whereby they may be actuated once or a plurality of times during one operation of the main operating mechanism.

25. In a machine of the class described, the combination of a plurality of type carriers, a main operating mechanism, means operated by the main operating mechanism for moving said type carriers differentially, manipulative means controlling the extent of movement of differential means, means for taking impressions from said type carriers, a manipulative printer controlling means for determining the number of operations of the impression means at each operation of the machine, and means controlled by the paper to be printed upon for determining whether said printer controlling means will be effective.

26. In a machine of the class described, the combination of a plurality of type carriers, a main operating mechanism, means operated by the main operating mechanism for moving said type carriers differentially, manipulative means controlling the extent of movement of the differential means, an impression device coöperating with said type carriers, manually set means for controlling said device whereby it may be actuated once or a plurality of times during an operation of the machine, and means controlled by the manipulative devices for determining whether the manual control will be effective.

27. In a machine of the class described, the combination of a plurality of type carriers, a main operating mechanism, means operated by the main operating mechanism for moving said type carriers differentially, manipulative means controlling the extent of movement of the differential means, an impression device coöperating with said type carriers, a paper feeding mechanism, manually set means for controlling said impression device and feeding mechanism whereby they may be actuated once or a plurality of times during an operation of the machine and means controlled by the manipulative devices for determining whether said manual control shall be effective.

28. In a machine of the class described, the combination of a plurality of type carriers, a main operating mechanism, means operated by the main operating mechanism for moving said type carriers differentially, manipulative means controlling the extent of movement of the differential means, a plurality of impression devices coöperating with said type carriers, manually set means for controlling one of said devices whereby it may be actuated once or a plurality of times during an operation of the machine, an automatic means for determining whether said controlling means will be effective.

29. In a machine of the class described, the combination of a plurality of type carriers, a main operating mechanism, means operated by the main operating mechanism for moving said type carriers differentially, manipulative means controlling the extent of movement of the differential means, a plurality of impression devices coöperating with said type carriers, a plurality of paper feeding mechanisms, manually set means for controlling one of the impression devices and one of the feeding mechanisms whereby they may be actuated once or a plurality of times during an operation of the machine, and automatic means for determining whether said controlling means will be effective.

30. In a machine of the class described, the combination of a plurality of type carriers, a main operating mechanism, means operated by the main operating mechanism for moving said type carriers differentially, manipulative means controlling the extent of movement of the differential means, an impression device coöperating with said type carriers, a paper feeding mechanism, a severing mechanism, and means for controlling the feeding mechanism whereby it is operated before severing and again after the operation of the severing mechanism.

31. In a machine of the class described, the combination of a plurality of type carriers, a main operating mechanism, means operated by the main operating mechanism for moving said type carriers differentially, manipulative means controlling the extent of movement of the differential means, an impression device coöperating with said type carriers, a paper feeding mechanism, a severing mechanism, means for giving the said severing mechanism a partial and a complete actuation, and means for controlling the feeding mechanism whereby it is operated alternately with each actuation of the severing mechanism.

32. In a machine of the class described, the combination of a plurality of type carriers, a main operating mechanism, means operated by the main operating mechanism for moving said type carriers differentially, manipulative means controlling the extent of movement of the differential means, an impression means coöperating with said type carriers, a paper feeding mechanism, a severing mechanism, means for giving the said severing mechanism a partial and a complete actuation, and means controlling the feeding mechanism whereby it is operated before and after the partial actuation of the severing mechanism in connection with the issuance of each portion of the fed material.

33. In a machine of the class described, the combination of a plurality of type carriers, a main operating mechanism, means operated by the main operating mechanism for moving said type carriers differentially, manipulative means controlling the extent of movement of the differential means, an impression device coöperating with said type carriers, a paper feeding mechanism, a severing mechanism, means for giving the said severing mechanism a partial and a complete actuation, and settable means for controlling the feeding mechanism whereby it will be actuated only after the partial actuation of the said severing mechanism.

34. In a machine of the class described, the combination of a plurality of type carriers, a main operating mechanism, means operated by the main operating mechanism for moving said type carriers differentially, manipulative means controlling the extent of movement of the differential means, an impression device coöperating with said type carriers, a paper feeding mechanism, a severing mechanism, means for giving the said mechanism a partial and a complete actuation, and manually settable means for controlling the feeding mechanism whereby it will be actuated before and after the partial actuation of the severing mechanism or will be actuated only after the partial actuation of the said severing mechanism.

35. In a machine of the class described, the combination of a plurality of type carriers, a main operating mechanism, means operated by the main operating mechanism for moving said type carriers differentially, manipulative means controlling the extent of movement of the differential means, an impression device coöperating with said type carriers, a paper feeding mechanism, a severing mechanism, means for giving the said mechanism a partial and a complete actuation, and manually settable means for controlling the feeding mechanism whereby it will be actuated before and after the partial actuation of the severing mechanism or will be actuated only after the partial actuation of the said severing mechanism, and automatic means for determining whether said controlling means will be effective.

36. In a machine of the class described, the combination of a plurality of type carriers, a main operating mechanism, means operated by the main operating mechanism for moving said type carriers differentially, manipulative means controlling the extent of movement of the differential means, an impression device coöperating with said type carriers, a paper feeding mechanism, a severing mechanism, means for giving the said mechanism a partial and a complete actuation, manually settable means for controlling the feeding mechanism whereby it will be actuated before and after the partial actuation of the severing mechanism or will be actuated only after the partial actuation of the said severing mechanism, and means controlled by the manipulative devices for determining whether said controlling means will be effective.

37. In a machine of the class described, the combination of a plurality of type carriers, a main operating mechanism, means operated by the main operating mechanism for moving said type carriers differentially, manipulative means controlling the extent of movement of the differential means, an impression device coöperating with said type carriers, a paper feeding mechanism, a severing mechanism, means for giving the said mechanism a partial and a complete actuation, and manually settable means for controlling the feeding mechanism whereby it will be actuated before and after the partial actuation of the severing mechanism or will be actuated only after the partial actuation of the said severing mechanism.

38. In a machine of the class described, the combination of a plurality of type carriers, a main operating mechanism, means operated by the main operating mechanism for moving said type carriers differentially, manipulative means controlling the extent of movement of the differential means, impression means coöperating with said type carriers, means controlled by the printing medium for determining whether said impression means will be operated during the operation of the main operating mechanism, and means for indicating whether the said means controlled by the printing medium is actuated.

39. In a machine of the class described, the combination of a plurality of type carriers, a main operating mechanism, means operated by the main operating mechanism for moving said type carriers differentially, manipulative means controlling the extent of movement of the differential means, impression means coöperating with said type carriers, means controlled by the printing medium for determining whether said impression means will be operated, and means for indicating in print when the said means controlled by the printing medium is actuated.

40. In a machine of the class described, the combination of a plurality of type carriers, a main operating mechanism, means operated by the main operating mechanism for moving said type carriers differentially, manipulative means controlling the extent of movement of the differential means, a plurality of impression means coöperating with said type carriers, means controlled by one of the printing mediums for determining whether one of the impression means will be operated, and means for indicating in print when the said means controlled by the printing medium is actuated.

41. In a machine of the class described, the combination of a plurality of type carriers, a main operating mechanism, means operated by the main operating mechanism for moving said type carriers differentially, manipulative means controlling the extent of movement of the differential means, a plurality of impression means coöperating with said type carriers, a plurality of paper feeding mechanisms, means controlled by one of the printing mediums for determining whether one of the impression means will be operated, and means for indicating in print on another printing medium when the said means controlled by the said printing medium is actuated.

42. In a machine of the class described, the combination of a plurality of type carriers, a main operating mechanism, means operated by the main operating mechanism for moving said type carriers differentially, manipulative means controlling the extent of movement of the differential means, an impression device coöperating with said type carriers, a zero elimination mechanism, means controlled by the printing medium for determining whether the impresison means will be operated and means coöperating with the zero elimination mechanism for indicating when the said controlling means is actuated.

43. In a machine of the class described, the combination of a plurality of type carriers, a main operating mechanism, means operated by the main operating mechanism for moving said type carriers differentially, manipulative means controlling the extent of movement of the differential means, an impression device coöperating with said type carriers, a zero elimination mechanism, means actuated by the printing medium for controlling the operation of the impression device, and means actuated by the zero elimination mechanism for indicating when the said controlling means is actuated.

44. In a machine of the class described, the combination of a plurality of type carriers, a main operating mechanism, means operated by the main operating mechanism for moving said type carriers differentially, manipulative means controlling the extent of movement of the differential means, an impression device coöperating with the said type carriers, a zero elimination mechanism, means actuated by the printing medium for controlling the operation of the impression device, and means actuated by the zero elimination mechanism for indicating in print when the said controlling means is actuated.

45. In a machine of the class described, the combination of a plurality of type carriers, a main operating mechanism, means operated by the main operating mechanism for moving said type carriers differentially, manipulative means controlling the extent of movement of the differential means, an impression device coöperating with said type carriers, and a paper shifting and feeding mechanism coöperating with the said impression device and acting in connection with a printing action, said shifting movement acting to bring a different portion of the printing medium in position to be printed upon than that which was in printing position at the beginning of the operation of the machine.

46. In a machine of the class described, the combination of a plurality of type carriers, a main operating mechanism, means operated by the main operating mechanism for moving said type carriers differentially, manipulative means controlling the extent of movement of the differential means, an impression device coöperating with said type carriers, and a mechanism for first shifting and then feeding the printing medium in conjunction with the printing action, said shifting movement acting to bring a different portion of the printing medium in position to be printed upon than that which was in printing position at the beginning of the operation of the machine.

47. In a machine of the class described, the combination of a plurality of type carriers, a main operating mechanism, means operated by the main operating mechanism for moving said type carriers differentially, manipulative means controlling the extent of movement of the differential means, an impression device coöperating with said type carriers, a shifting mechanism for the printing medium for normally exposing the last impression to view and a feeding mechanism coöperating with said shifting mechanism.

48. In a machine of the class described, the combination of a plurality of type carriers, a main operating mechanism, means operated by the main operating mechanism for moving said type carriers differentially, manipulative means controlling the extent of movement of the differential means, an impression device coöperating with said type carriers, a shifting mechanism for moving the printing medium so that the last impression is adjacent or remote from the impression device, and a feeding mechanism coöperating with said shifting mechanism.

49. In a machine of the class described, the combination with a plurality of type carriers, of a main operating mechanism, means operated by the main operating mechanism for moving said type carriers differentially, manipulative means controlling the extent of movement of the differential means, an impression device coöperating with said type carriers, a shifting mechanism for moving the printing medium so that the last impression is moved from a point above the impression device to a point beneath the same, and a feeding mechanism coöperating with said shifting mechanism.

50. In a machine of the class described, the combination of an accounting device, an invariably movable member, two latches operatively associated therewith, two type carriers, both of said latches operatively associated with the type carriers and only one of said latches operatively associated with the accounting device.

51. In a machine of the class described, the combination of a totalizer element, two type carriers, an actuator for setting the type carriers and the totalizer element, manipulative means for controlling said actuator, means for driving the actuator and connections including one of said type carriers whereby the totalizer element independently of said manipulative means renders the driving means ineffective upon the actuator.

52. In a machine of the class described, the combination of an accounting device actuating mechanism, a plurality of accounting devices arranged in a unit differentially movable with respect to the actuating devices, means for differentially positioning said accounting device unit, a plurality of operation counters, an actuator for each of said counters having an operating movement at each operation of the machine, said positioning means for the accounting device determining what operation counter will be operated by its actuator.

53. In a machine of the class described, the combination of an accounting device actuating mechanism, a plurality of accounting devices arranged in a unit differentially movable with respect to the actuating devices, a cam differentially positioning said accounting device unit, a plurality of operation counters, an actuator for each of said counters having an operating movement at each operation of the machine, and means carried by the said cam for determining what operation counter will be operated by the actuator.

54. In a machine of the class described, the combination of an accounting device actuating mechanism, a plurality of accounting devices arranged in a unit differentially movable with respect to the actuating devices, a cam for differentially positioning said accounting device unit, a plurality of rotation counters, a common actuator therefor, and means carried by the said cam for determining what rotation counter will be operated by the common actuator.

55. In a machine of the class described, the combination of an accounting device actuating mechanism, a plurality of accounting devices arranged in a unit differentially movable with respect to the actuating devices, means for differentially positioning said accounting device unit, a plurality of rotation counters, toggle actuators therefor, a common operating element for said toggles, and means operated by the means for positioning the accounting device for placing an obstruction in the path of a toggle and thereby causing an actuation of the rotation counter operated thereby when said common operating element is actuated.

56. In a machine of the class described, the combination of an accounting device actuating mechanism, a plurality of accounting devices arranged in a unit differentially movable with respect to the actuating devices, a cam for differentially positioning said accounting device unit, a plurality of rotation counters, toggle actuators therefor, a common operating element for said toggles, an arm carried by said cam and movable into the path of said toggles and thereby causing an actuation of the rotation counter associated therewith when said common operating element is actuated.

57. In a machine of the class described, the combination of an accounting device actuating mechanism, a plurality of accounting devices arranged in a unit differentially movable with respect to the actuating devices, a cam for differentially positioning said accounting device unit, a rotation counter for each of said accounting devices, a common actuator for all of said operation counters, and means carried by the said cam for selecting a rotation counter for actuation by the actuator said rotation counter corresponding with the differential positioning of the accounting device unit.

58. In a machine of the class described, an accounting mechanism, an operating mechanism therefor, total taking mechanism, said operating mechanism making two cycles during a total taking operation, a printing mechanism, said printing mechanism actuated by the said operating mechanism, and means for disconnecting the operating mechanism from the printing mechanism during one cycle thereof during a total taking operation.

59. In a machine of the class described, an accounting mechanism, an operating mechanism therefor, total taking mechanism said operating mechanism making two cycles during a total taking operation, a printing mechanism, said printing mechanism actuated by the said operating mechanism, and means for disconnecting the operating mechanism from the printing mechanism during the first cycle thereof during a total taking operation.

60. In a machine of the class described, an accounting mechanism, an operating mechanism therefor, total taking mechanism, said operating mechanism making two cycles during a total taking operation, a printing mechanism, said printing mechanism actuated by the said operating mechanism, and means for disconnecting the operating mechanism from the printing mechanism during the first cycle thereof during a total taking operation and a manipulative device for controlling said disconnecting means.

61. In a machine of the class described, an accounting mechanism, an operating mechanism therefor, total taking mechanism, said operating mechanism making two cycles during a total taking operation, a printing mechanism, said printing mechanism actuated by the said operating mechanism, and means for disconnecting the operating mechanism from the printing mechanism during the first cycle thereof during a total taking operation and a manipulative device for controlling said disconnecting means and causing an actuation of the total taking mechanism.

62. In a machine of the class described, a plurality of manipulative devices, an actuator associated therewith, a main operating mechanism, a locking mechanism therefor, means operated by some of said manipulative devices for releasing the locking mechanism and all of said devices controlling the movement of the actuator.

63. In a machine of the class described, manipulative devices, an actuator, a main operating mechanism, locking means therefor, means operated by some of said manipulative devices for releasing the locking mechanism, and two elements operatively associated with the actuator and differentially positioned by the manipulative devices.

64. In a machine of the class described, manipulative devices, an actuator, a main operating mechanism, locking means therefor, means operated by some of said manipulative devices for releasing the locking mechanism, and two elements operatively associated with the actuator and differentially positioned by the simultaneous operation of two of the manipulative devices.

65. In a machine of the class described, manipulative devices arrestable and depressible, an actuator, and two elements operatively associated with the actuator and differentially positioned by the simultaneous operation of two of the manipulative devices.

66. In a machine of the class described, manipulative devices arrestable and depressible, an actuator, a main operating mechanism, locking means therefor, means operated by some of said manipulative devices for releasing the locking mechanism, and two elements operatively associated with the actuator and differentially positioned by the simultaneous operation of one of the releasing and one of the other manipulative devices.

67. In a machine of the class described, a combined type carrier and gear, a manipulative device capable of controlling the positioning of said type carrier, a bevel crown gear transmitting the motion of the manipulative device to the combined type carrier and gear.

68. In a machine of the class described, the combination of a type carrier, a main operating mechanism, manipulative devices controlling the extent of movement of the type carrier, a printer control member operated by the main operating mechanism, a manually operated impression control device, and means operated by the main operating mechanism for taking a single impression upon one printing medium, a variable number of impressions upon a second printing medium under the control of the printer control member and a variable number of impressions upon a third printing medium under the control of the manually operated impression control device.

69. In a machine of the class described, the combination of a type carrier, a main operating mechanism, manipulative means controlling the extent of movement of the type carrier, a printer control member, a manually operated impression control device, and means operated by the main operating mechanism for taking a single impression upon one printing medium and a variable number of impressions upon two other printing mediums, the variable number of impressions upon one of the two printing mediums being under the control of the printer control member and the variable number of impressions upon the other of the two printing mediums being under the control of the manually operated control device.

70. In a machine of the class described, the combination of a plurality of type carriers, a main operating mechanism, means operated by the main operating mechanism for moving the type carriers differentially, manipulative means controlling the extent of movement of the differential means, a printer control member, a manually operated impression control device, and means operated by the main operating mechanism for taking impressions upon three printing mediums during an operation of the main operating mechanism, one of which is always a single impression another of which may be double impressions at will under the influence of the printer control member and a third may be a single or double impression depending upon the position of the manually operated impression control device.

71. In a machine of the class described, the combination of a plurality of type carriers, a main operating mechanism, means operated by the main operating mechanism for moving the type carriers differentially, manipulative means controlling the extent of movement of the differential means, a printer control member, a manually operated impression control device and impression means actuated by the main operating mechanism for taking an impression upon one printing medium and an impression upon each of two other printing mediums in accordance with the position of the printer control member and the manually operated impression control device, said last two impressions being varied at will under the influence of their respective controlling means to become other than single impressions.

72. In a machine of the class described, the combination of a plurality of type carriers, manipulative means controlling the extent of movement of the type carriers, a printer control member, a manually operated impression control device, and means operated by the main operating mechanism for taking at certain times one impression and at other times more than one impression upon each of two printing mediums during an operation of the main operating mechanism, the impressions on one printing medium being under the influence of the printer control member and the impressions on the other printing medium being under the influence of the said manually operated device.

73. In a machine of the class described, the combination of a main operating mechanism, differential mechanism actuated thereby, manipulative means controlling the extent of movement of the differential mechanism, type carriers set by the differential mechanism, an impression means actuated by the main operating mechanism for taking from said type carriers an impression on one printing medium and a variable number of impressions upon another printing medium, a manipulative printer control means for controlling the variable number of printing impressions upon the second printing medium, and means controlled by the differential mechanism for changing the control of the control means so as to effect a different number of impressions than that for which the control means is set.

74. In a machine of the class described, the combination of a plurality of accounting devices each containing a plurality of totalizers, an actuator therefor, manipulative means for controlling the actuator, means for selecting one of the totalizers for actuation by the actuator, and automatic means comprising a plurality of independently and differentially adjustable members controlled by said selecting means for controlling engagement between the selected totalizer and the actuator.

75. In a machine of the class described, the combination of a plurality of accounting devices, an actuator therefor, manipulative means controlling the actuator, means for engaging the accounting devices with the actuator, automatic means comprising a plurality of independently and differentially adjustable members for determining which of the accounting devices will be operated by the engaging means, and means controlling the adjustment of said members.

76. In a machine of the class described, the combination of a plurality of accounting devices, an actuator therefor, manipulative means controlling the actuator, means for engaging the accounting devices with the actuator, automatic means comprising two independently and differentially adjustable members for determining which of the accounting devices will be operated by the engaging means, and means controlling the differential adjustment of said members.

77. In a machine of the class described, the combination of a plurality of accounting devices, an actuator therefor, manipulative means controlling the actuator, means for engaging the accounting devices with the actuator, automatic means comprising a plurality of independently and differentially adjustable members having projections thereon for determining which of the accounting devices will be operated by the engaging means.

78. In a machine of the class described, the combination of a plurality of accounting devices each containing a plurality of totalizers, a common actuator therefor, means for positioning said accounting devices to bring any desired totalizer into operative relation with the common actuator, manipulative means controlling said positioning means, means for engaging the selected totalizers with the actuator, and a plurality of independently and differentially adjustable members for controlling the engagements between the selected totalizer and the actuator.

79. In a machine of the class described, the combination of a plurality of accounting devices each containing a plurality of totalizers, a common actuator therefor, means for positioning said accounting devices to bring any desired totalizer into operative relation with the common actuator, manipulative means controlling said positioning means, means for engaging the selected totalizer with the actuator and a plurality of independently and differentially adjustable members controlled as to adjustment by said manipulative means for controlling the engagement between the selected totalizer and the actuator.

80. In a machine of the class described, the combination of a plurality of accounting devices each containing a plurality of totalizers, a common actuator therefor, means for positioning said accounting devices to bring a totalizer of each device into operative relation with the common actuator, manipulative means controlling said positioning means, means for normally engaging all of said selected totalizers with the actuator, and a plurality of differentially adjustable members controlled as to adjustment by said manipulative means for controlling the engagement between the selected totalizers and the actuator so that only certain ones of the selected totalizers will be engaged with the actuator.

81. In a machine of the class described, the combination of a plurality of accounting devices each comprised of a plurality of totalizers, a common actuator therefor, means for engaging the totalizers with the actuator, differential mechanism for positioning the accounting devices to bring any desired totalizer in position to be engaged with the common actuator, manipulative devices controlling said differential mechanism, and a plurality of members adapted to be moved different extents by the differential mechanism for determining which of the selected totalizers will be operated by said engaging means.

82. In a machine of the class described, the combination of a plurality of accounting devices each comprised of a plurality of totalizers, a common actuator therefor, means for engaging the totalizers with the actuator, differential mechanism for positioning the accounting devices to bring any desired totalizer in position to be engaged with the common actuator, manipulative devices controlling said differential mechanism, a plurality of members adapted to be moved different extents by the differential mechanism for determining which of the selected totalizers will be operated by said engaging means, and manipulative means for rendering said members ineffective.

83. In a machine of the class described, the combination of a plurality of sets of depressible keys, a differentially adjustable element adapted to be adjusted to a plurality of positions, and means controlled by the said differentially adjustable element and common to all of said sets of keys for selecting any one or all of said sets of keys for operation.

84. In a machine of the class described, the combination of a plurality of sets of depressible keys of different classes, a differentially adjustable element having a normal position common to all of said classes, and a plurality of positions of adjustment each appropriate to one of said classes, and means controlled by said differentially adjustable element and common to all of said sets of keys for selecting any one or all of said classes of keys for operation.

85. In a machine of the class described, the combination with a plurality of sets of depressible keys of different classes, a differentially adjustable element having a normal position appropriate to all of the classes of sets of keys and positions of adjustment each appropriate to one of said classes, and means controlled by said element and common to all of said sets of keys whereby a key in each set may be operated when said element is in its normal position but only one of said sets of keys may be operated when the lever is out of its normal position determined by the position of the lever.

86. In a machine of the class described, the combination of manipulative devices, actuators controlled thereby, printing elements controlled adjustably by said actuators, printing mechanism for feeding record material relative to said printing elements whereby an impression may be taken from said printing elements on said record material, a main actuator, operating connections intermediate the main actuator and said printing mechanism for driving the latter upon an operation of the former, clutch mechanism intermediate the main actuator and said operating connections, manipulative means and means controlled thereby for disabling said clutch mechanism.

87. In a machine of the class described, the combination of a printing element; a device having side arms and a cross head comprising a writing table forming a support for record material and a holding means for a platen located beneath the writing table, a platen supported thereby, and guide means supported by the device adjacent the writing table and platen to permit the free passage of record material beneath the platen and over the writing table; and means for actuating the device to take an impression from the printing element.

88. In a machine of the class described the combination of a printing element, a rocking device therefor having side arms and a crosshead comprising a writing table and a holding means for a platen located beneath the writing table, a platen supported thereby, and a plurality of rotatable guide means supported by the frame adjacent the writing table and platen, the construction of the impression frame being such as to permit the passage of a strip of record material between the side arms of the frame, then beneath the platen, upward over the guide means and then over the writing table; and means for rocking the device to take an impression from the printing element.

89. In a machine of the class described, the combination of printing mechanism, an impression device adapted to support a record strip, means comprising a movable frame carrying a pair of guides for moving the record strip independently of the impression device to position it to be printed upon by the printing mechanism and then back toward its original position, feeding means for also giving the record strip a feed in the last mentioned direction, and means for moving said frame.

90. In a machine of the class described, the combination of type carriers, record strip supporting mechanism comprising a supply roll, a pair of guide rollers and a receiving roll, impression means for taking an impression from said type carriers on the record strip, said record strip passing from the supply roll over one of said guide rollers between the type carriers and the impression means over the other guide roller to the receiving roll, a pivoted frame supporting both of said guide rollers, and means for rocking said frame at each operation of the machine to give said record strip a backward and forward movement relative to the type carriers.

91. In a machine of the class described, the combination of type carriers, means for differentially adjusting the same, impression means for taking an impression on a record strip from the type carriers, a pivoted frame comprising a writing table forming a support for record material in writing position and a support for said impression means, means for giving said frame a reciprocation at each operation of the machine to cause an impression to be taken from the type carriers, a pair of guides over which the record strip passes in its travel, a common means for supporting both of said guides, and means for moving said common means at each operation of the machine for moving that part of the record strip at the writing point to a point adjacent the printing position to receive an impression and then moving said strip toward its original position, and strip feeding means coöperating with said moving means whereby a new portion of record strip will be presented at the writing position.

92. In a machine of the class described, the combination of manipulative means, type carrying means differentially adjustable under the control of the manipulative means, an impression member for taking an impression from the type means and comprising a platen and a writing table, supply and receiving rolls for a strip of record material which passes from the supply roll between the type means and platen and over the writing table to the receiving roll, a guide roll over which the record strip passes at a point intermediate the supply roll and platen, a second guide roll over which the record strip passes at a point intermediate the writing table and receiving roll, a frame supporting both of said guide rolls, means for moving said frame at each operation of the machine to give the record strip backward and forward movements relative to the type means, means for actuating the impression member at a time intermediate said backward and forward movements, and feeding means coöperating with the receiving roll for giving said record strip a feed in a forward direction.

93. In a machine of the class described the combination of a printing mechanism, an impression device adapted to support a record strip, a cover for the record strip having an opening some distance from the printing mechanism through which the record strip may be written upon, means comprising a pair of guides carried by a movable frame for moving the record strip independently of the impression device to shift that portion adjacent the opening toward a position to be printed upon by the printing mechanism and then return it toward original position, means for feeding the record strip in the last mentioned direction, and means for moving the frame.

94. In a machine of the class described the combination of manipulative means, type carrying means differentially adjustable under the control of the manipulative means, an inclosing casing having a protected sight opening beneath which a strip of record material passes so as to be visible but inaccessible and having a writing opening adjacent the protected sight opening through which written entries may be made on a portion of the record material, an impression device for taking an impression from the type means and comprising a frame carrying a platen and a writing table located above the platen and beneath said writing opening, supply and receiving rolls for the strip of record material which passes from the supply roll between the type means and platen and over the writing table beneath the writing opening and protected sight opening to the receiving roll, a guide roll over which the record strip passes at a point intermediate the supply roll and platen, a second guide roll over which the record strip passes at a point intermediate the writing table and receiving roll, a frame supporting both of said guide rolls, means for moving said frame at each operation of the machine to give the record strip backward and forward movements relative to the type means, and feeding means coöperating with the receiving roll for also giving said record strip a feed in a forward direction, all of said movements combining to carry the portion of record strip beneath the writing opening to a point adjacent the type means and platen and then forward beyond the writing opening to a point beneath the protected sight opening.

In testimony whereof I affix my signature.

FREDERICK L. FULLER.